United States Patent
Hiroe

(10) Patent No.: US 8,358,563 B2
(45) Date of Patent: Jan. 22, 2013

(54) SIGNAL PROCESSING APPARATUS, SIGNAL PROCESSING METHOD, AND PROGRAM

(75) Inventor: Atsuo Hiroe, Kanagawa (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 12/480,194

(22) Filed: Jun. 8, 2009

(65) Prior Publication Data

US 2009/0310444 A1 Dec. 17, 2009

(30) Foreign Application Priority Data

Jun. 11, 2008 (JP) ................................ P2008-153483

(51) Int. Cl.
*G01S 3/80* (2006.01)
(52) U.S. Cl. ....................................................... 367/125
(58) Field of Classification Search .................... 367/125
See application file for complete search history.

(56) References Cited

U.S. PATENT DOCUMENTS

| | | | | |
|---|---|---|---|---|
| 5,444,443 | A * | 8/1995 | Umeda et al. ................. | 340/933 |
| 2002/0121890 | A1* | 9/2002 | Levitt .......................... | 324/76.36 |
| 2003/0112983 | A1* | 6/2003 | Rosca et al. ................... | 381/103 |
| 2004/0030500 | A1* | 2/2004 | Struzinski ..................... | 701/302 |
| 2004/0039464 | A1* | 2/2004 | Virolainen et al. ............. | 700/94 |
| 2004/0267533 | A1* | 12/2004 | Hannigan et al. ............. | 704/273 |
| 2005/0034537 | A1* | 2/2005 | Henry et al. ............. | 73/861.355 |
| 2005/0073371 | A1* | 4/2005 | Brett et al. ....................... | 331/74 |
| 2005/0190098 | A1* | 9/2005 | Bridgelall et al. ............ | 342/118 |
| 2005/0203981 | A1 | 9/2005 | Sawada et al. | |
| 2006/0029239 | A1* | 2/2006 | Smithers ....................... | 381/119 |
| 2006/0056647 | A1* | 3/2006 | Ramakrishnan et al. ..... | 381/119 |

(Continued)

FOREIGN PATENT DOCUMENTS

| | | |
|---|---|---|
| JP | 3069663 | 5/2000 |
| JP | 2005-49153 | 2/2005 |
| JP | 2005-77205 | 3/2005 |

OTHER PUBLICATIONS

Mori, Y.; Takatani, T.; Saruwatari, H.; Hiekata, T.; Morita, T.;, "Blind Source Separation Combining Simo-Ica and Simo-Model-Based Binary Masking," Acoustics, Speech and Signal Processing, 2006. ICASSP 2006 Proceedings. 2006 IEEE International Conference on , vol. 5, no., pp. V, May 14-19, 2006.*

(Continued)

*Primary Examiner* — Isam Alsomiri
*Assistant Examiner* — James Hulka
(74) *Attorney, Agent, or Firm* — Finnegan, Henderson, Farabow, Garrett & Dunner, L.L.P.

(57) ABSTRACT

A signal processing apparatus includes: a learning processing unit that finds a separating matrix for separating mixed signals in which outputs from a plurality of sound sources are mixed, by a learning process that applies ICA (Independent Component Analysis) to observed signals including the mixed signals; a separation processing unit that applies the separating matrix to the observed signals to separate the mixed signals and generate separated signals corresponding to each of the sound sources; and a sound source direction estimating unit that computes a sound source direction of each of the generated separated signals. The sound source direction estimating unit calculates cross-covariance matrices between the observed signals and the separated signals in corresponding time segments in time-frequency domain, computes phase differences between elements of the cross-covariance matrices, and computes a sound source direction corresponding to each of the separated signals by applying the computed phase differences.

14 Claims, 51 Drawing Sheets

U.S. PATENT DOCUMENTS

| | | | |
|---|---|---|---|
| 2006/0206315 A1 | 9/2006 | Hiroe et al. | |
| 2006/0233389 A1* | 10/2006 | Mao et al. | 381/92 |
| 2007/0025556 A1* | 2/2007 | Hiekata | 381/17 |
| 2007/0025564 A1* | 2/2007 | Hiekata et al. | 381/94.2 |
| 2007/0133811 A1* | 6/2007 | Hashimoto et al. | 381/22 |
| 2007/0160230 A1* | 7/2007 | Nakagomi | 381/97 |
| 2007/0185705 A1* | 8/2007 | Hiroe | 704/200 |
| 2007/0189427 A1* | 8/2007 | Haghighat | 375/350 |
| 2007/0223731 A1* | 9/2007 | Togami et al. | 381/92 |
| 2007/0223732 A1* | 9/2007 | Mao | 381/92 |

OTHER PUBLICATIONS

Saruwatari, H.; Mori, Y.; Takatani, T.; Ukai, S.; Shikano, K.; Hiekata, T.; Morita, T.; , "Two-stage blind source separation based on ICA and binary masking for real-time robot audition system," Intelligent Robots and Systems, 2005. (IROS 2005). 2005 IEEE/RSJ International Conference on , vol., no., pp. 2303-2308, Aug. 2-6, 2005.*

Ukai, S.; Takatani, T.; Nishikawa, T.; Saruwatari, H.; , "Blind source separation combining SIMO-model-based ICA and adaptive beamforming," Acoustics, Speech, and Signal Processing, 2005. Proceedings. (ICASSP '05). IEEE International Conference on , vol. 3, no., pp. iii/85-iii/88 vol. 3, Mar. 2005.*

Karst, Otto J., "Linear Curve Fitting Using Least Deviations" Journal of the American Statistical Association. vol. 53, No. 281 (Mar. 1958), pp. 118-132 (1st page provided).*

European Search Report and Opinion for European Application No. 09162379.3 dated Sep. 5, 2011 (6 pages).

* cited by examiner

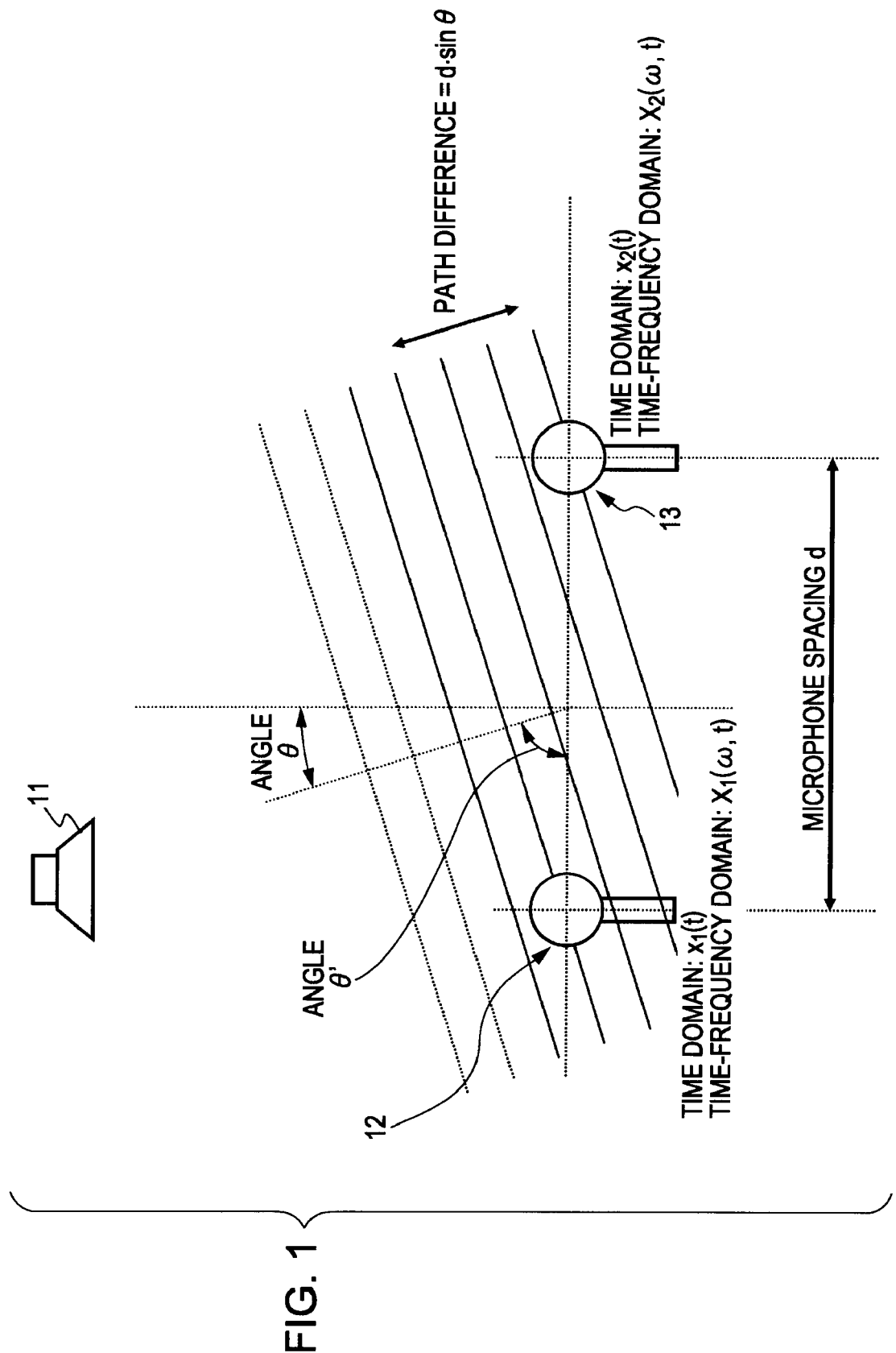

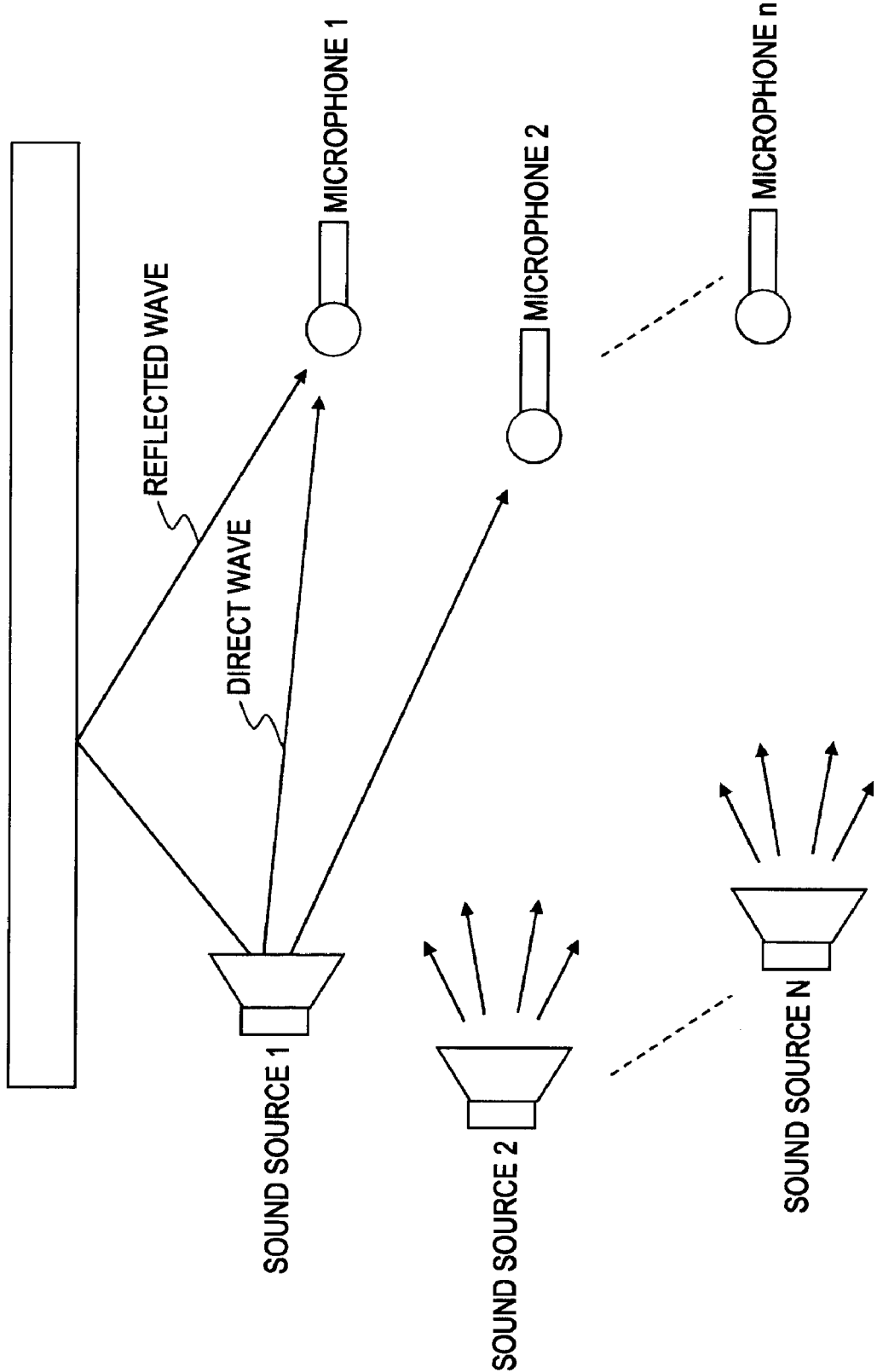

SEPARATION IN EACH FREQUENCY BIN

SEPARATION IN ALL FREQUENCY BINS

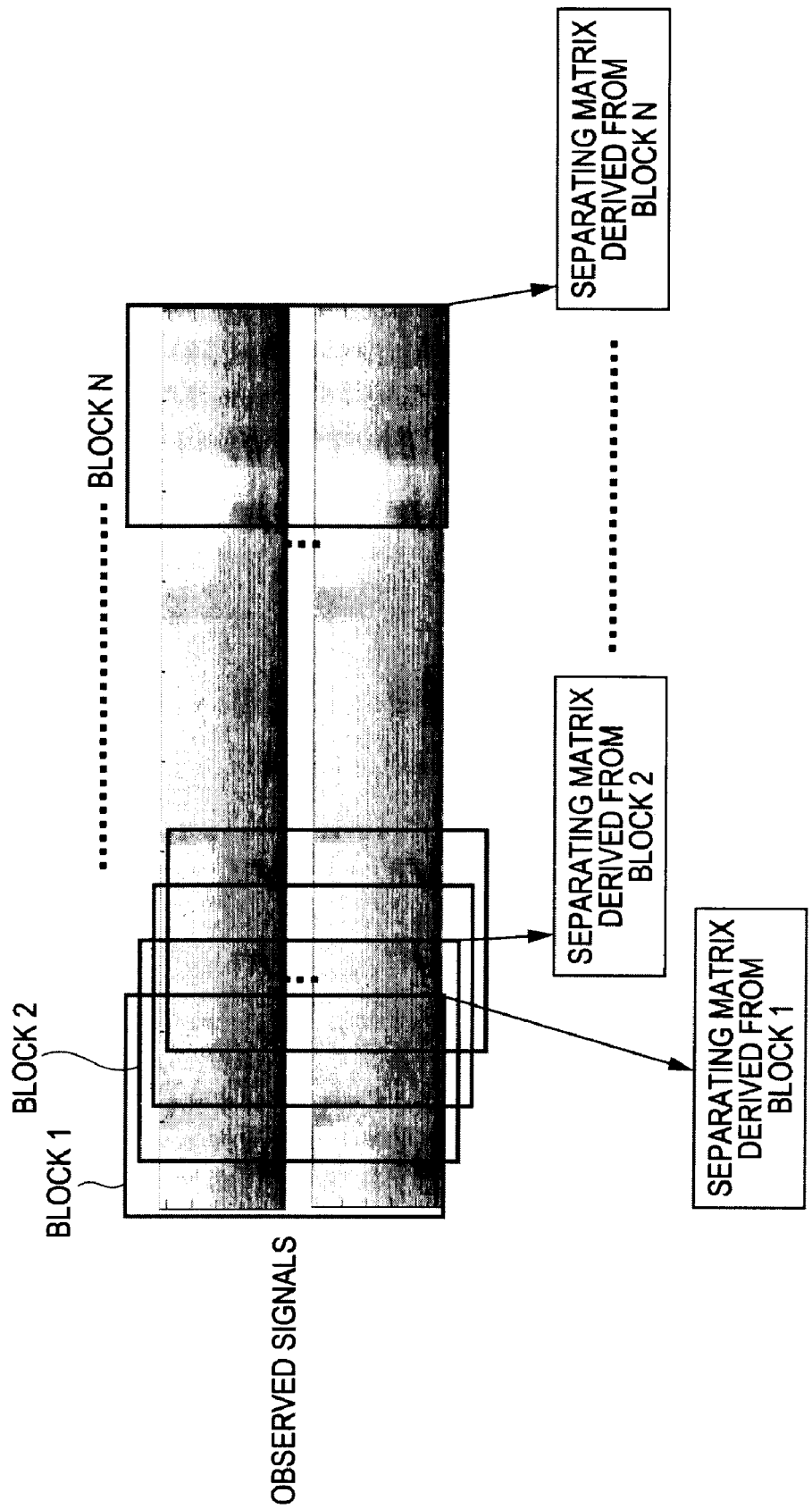

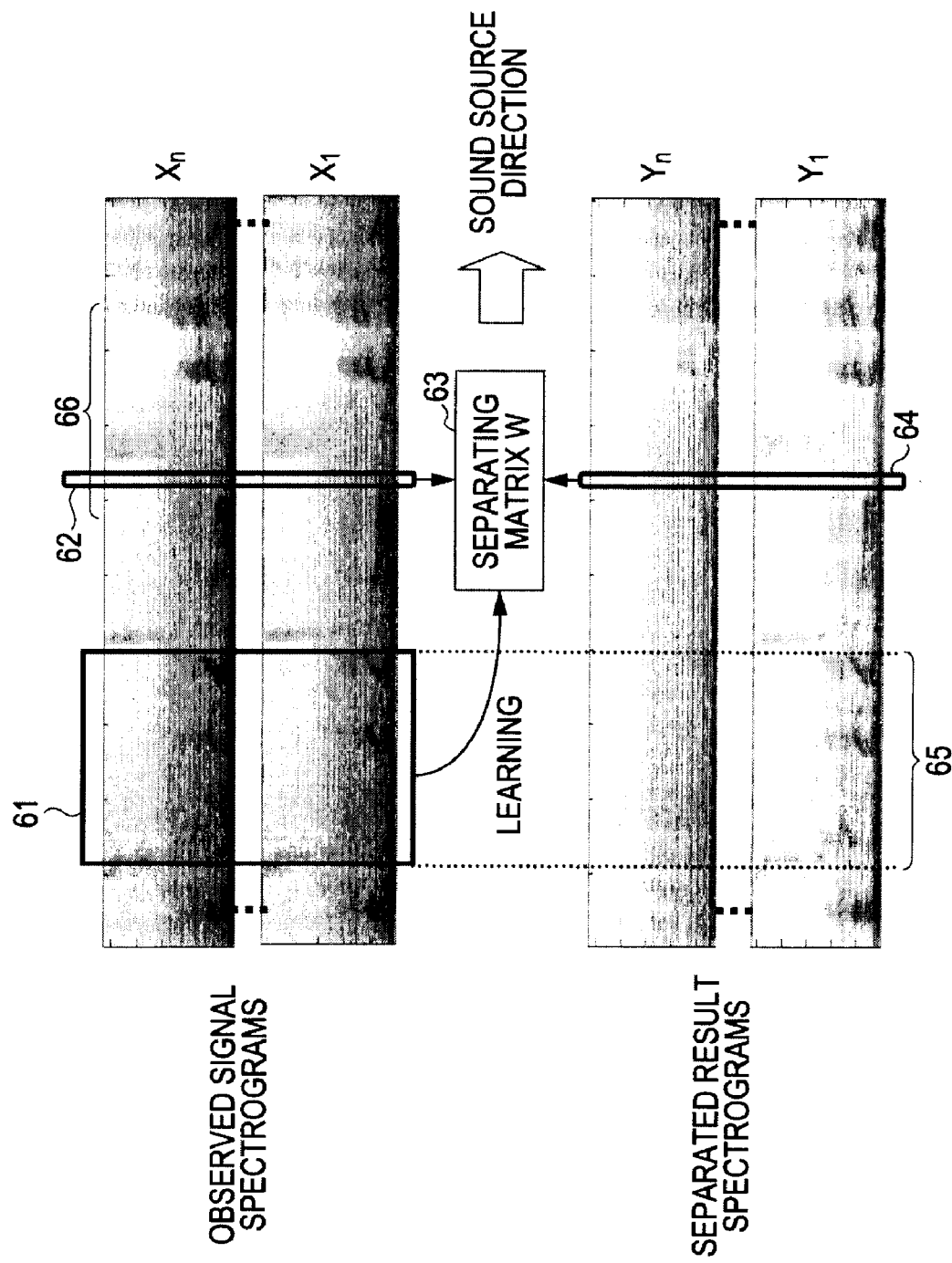

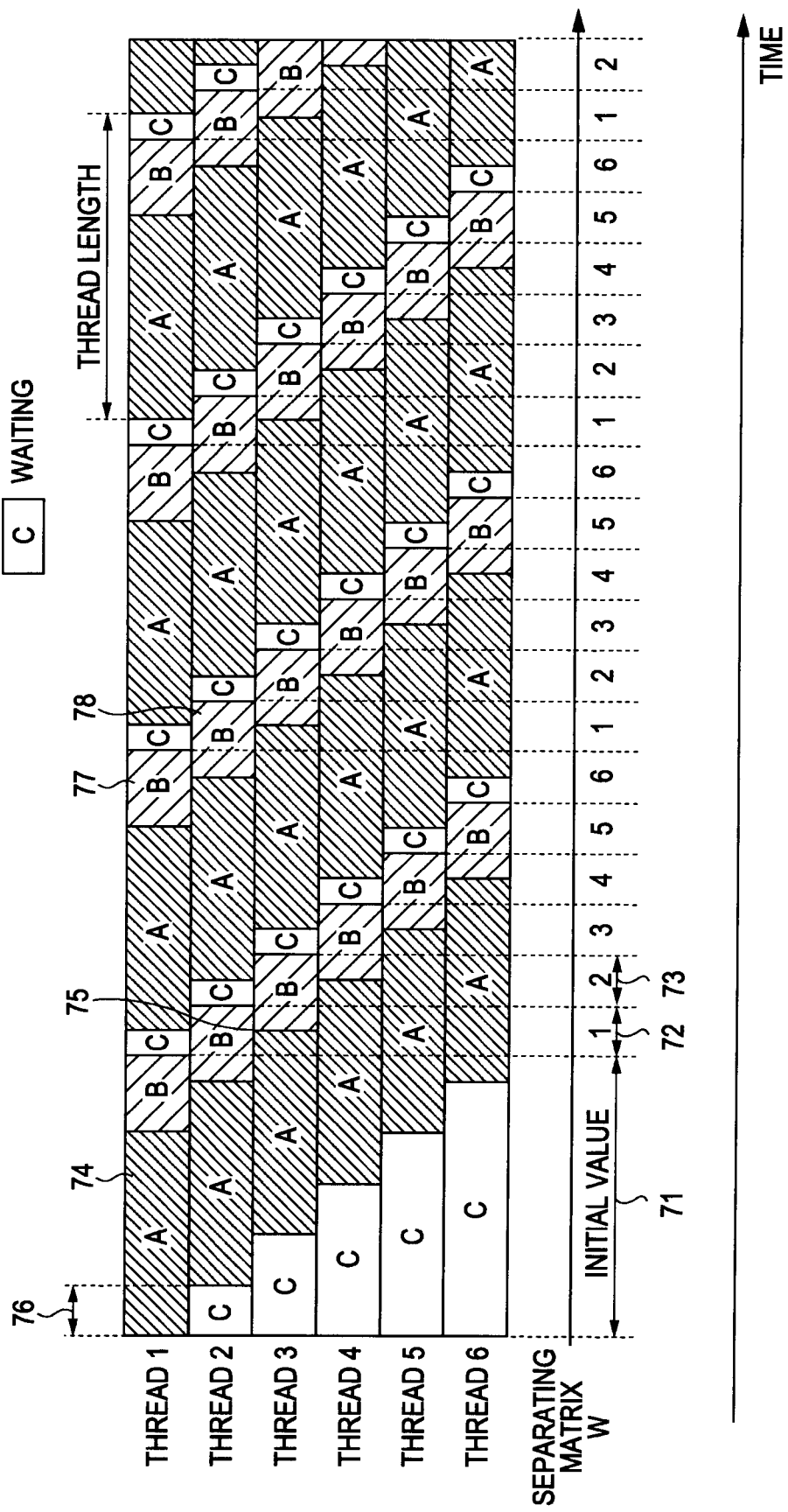

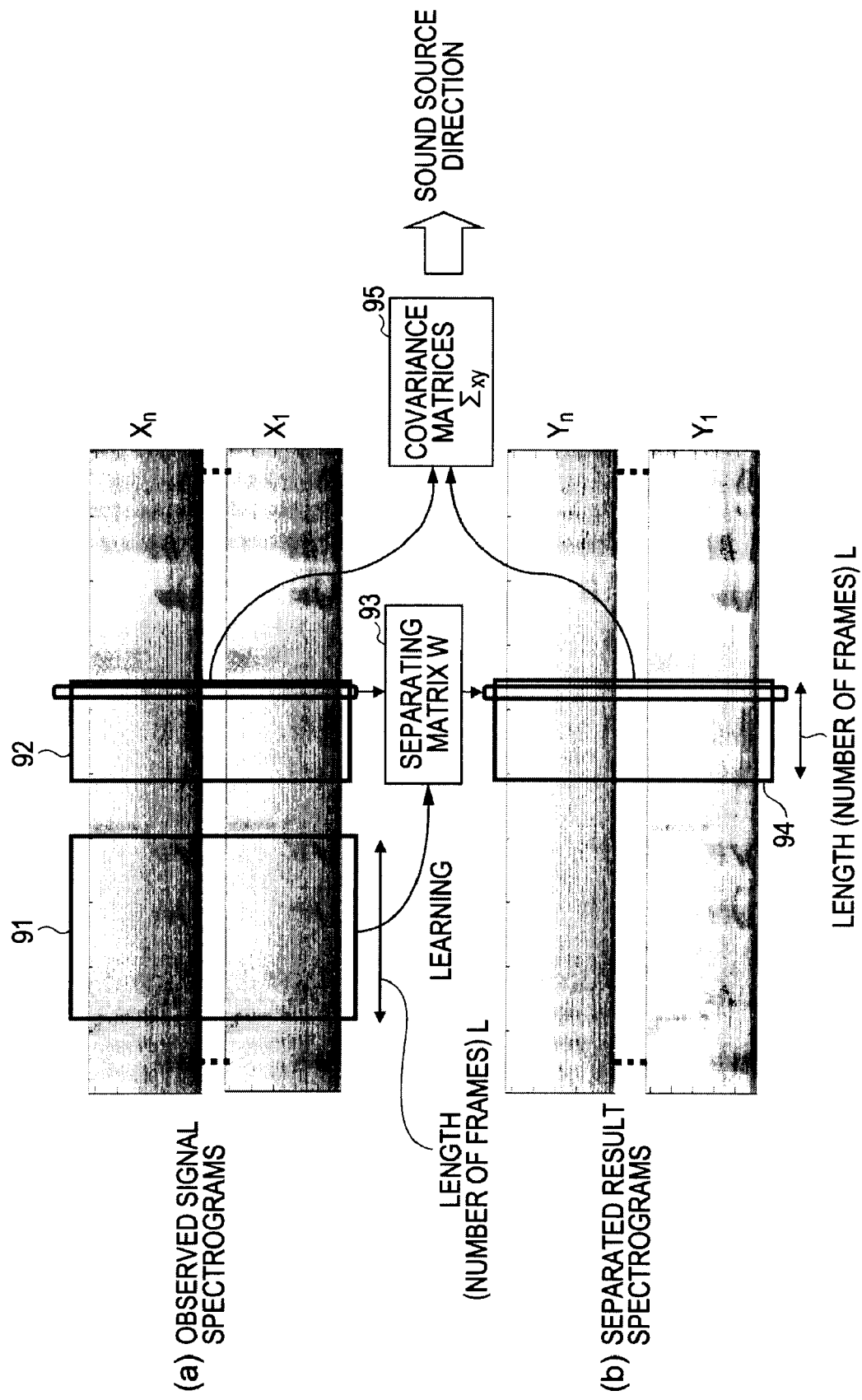

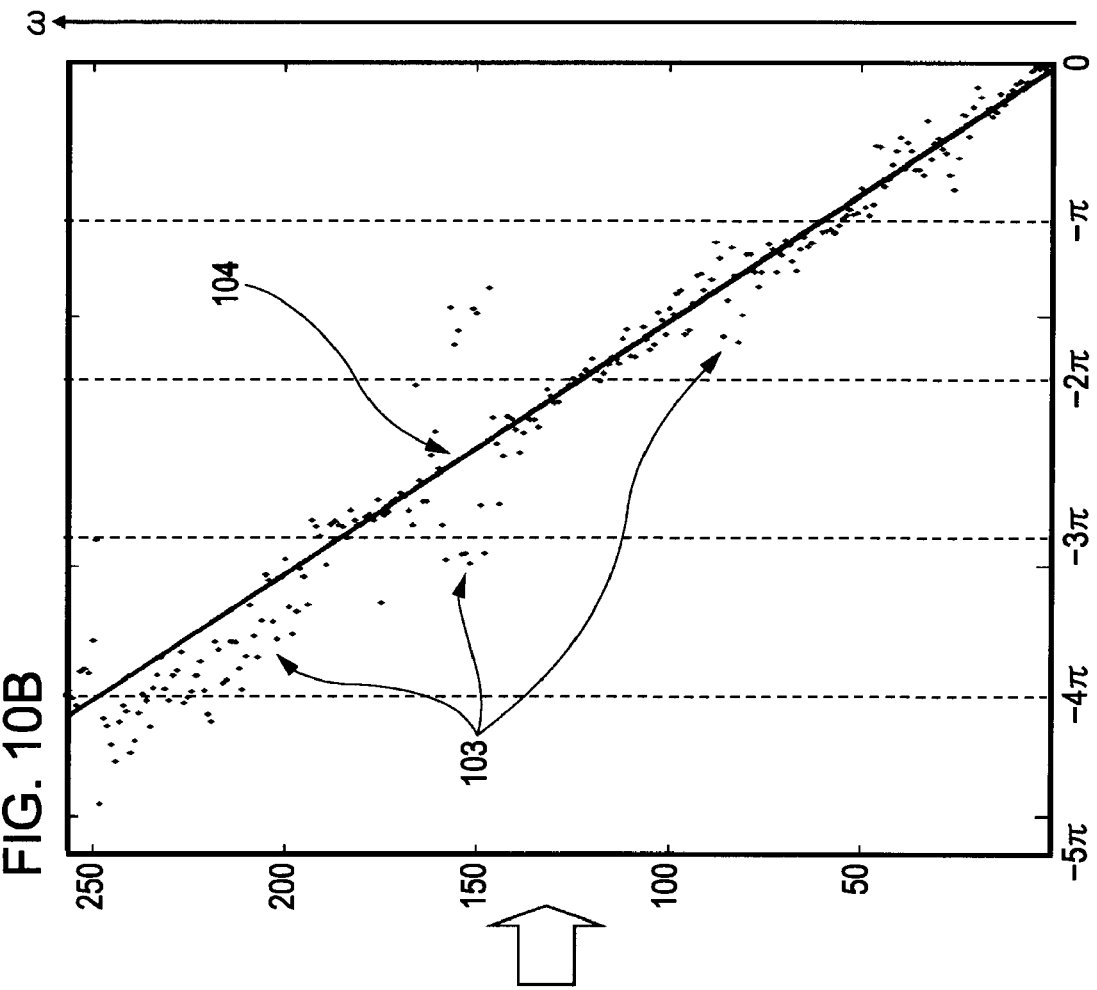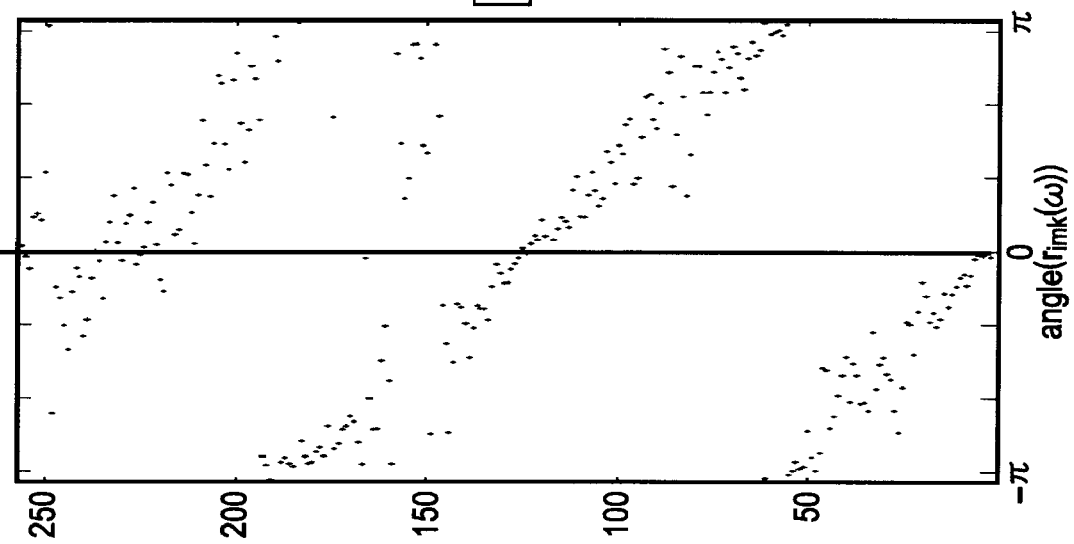

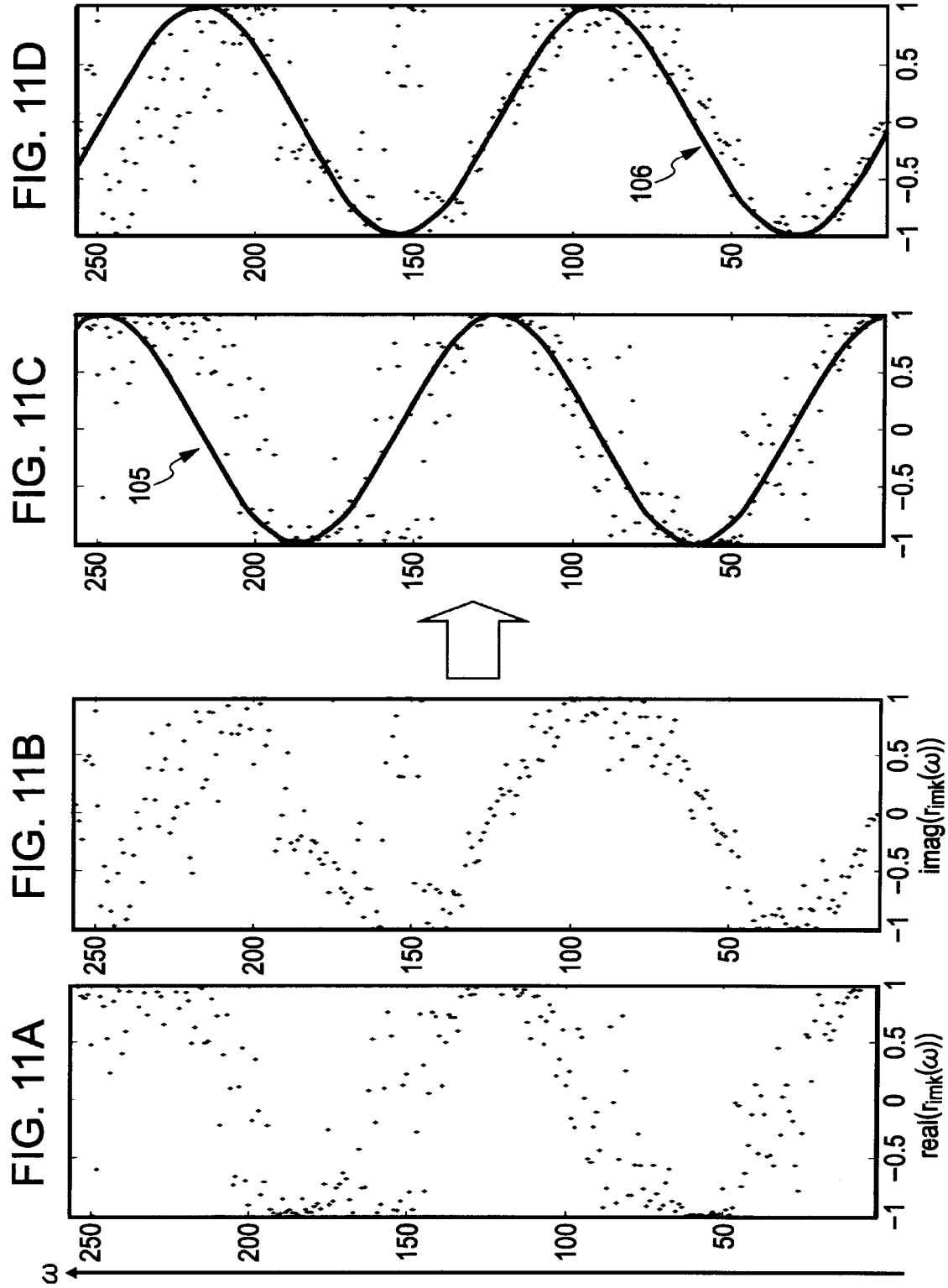

SIGNAL PROCESSING APPARATUS, SIGNAL PROCESSING METHOD, AND PROGRAM

BACKGROUND OF THE INVENTION

1. Field of the Invention

The present invention relates to a signal processing apparatus, a signal processing method, and a program. More specifically, the present invention relates to a signal processing apparatus, a signal processing method, and a program, which separate signals in which a plurality of signals are mixed by using Independent Component Analysis (ICA), and further estimate the sound source direction.

2. Description of the Related Art

The present invention relates to a technique for estimating the sound source direction (the direction from which a sound arrives as viewed from a microphone; also referred to as Direction Of Arrival (DOA)). In particular, the present invention relates to a technique for estimating the sound source direction in real-time by using Independent Component Analysis (ICA).

Since the present invention concerns both sound source direction estimation and ICA, the both will be described as the related art in the following order. Then, problems associated with incorporating sound source direction estimation into real-time ICA will be described. The description will be given in the order of A and B below.

A. Description of the Related Art
B. Problems of the Related Art

[A. Description of the Related Art]

First, a description will be given of A1 to A4 below as the related art.

A1. Sound Source Direction Estimation Using Phase Difference Between Microphones
A2. Description of ICA
A3. Sound Source Direction Estimation Using ICA
A4. Real-Time Implementation of ICA

[A1. Sound Source Direction Estimation Using Phase Difference Between Microphones]

The most basic scheme for estimating the sound source direction is to exploit the arrival-time difference, phase difference, or the like by using a plurality of microphones. This scheme is introduced as the related art also in Japanese Unexamined Patent Application Publication No. 2005-77205, Japanese Unexamined Patent Application Publication No. 2005-49153, and Japanese Patent No. 3069663.

This basic sound source direction estimation scheme will be described with reference to FIG. 1. As shown in FIG. 1, an environment is considered in which there is a single sound source 11, and two microphones 12 and 13 are installed at a spacing d. If the distance from each of the microphones 12 and 13 to the sound source 11 is sufficiently large relative to the microphone spacing d, sound waves can be approximated by plane waves, in which case it can be assumed that sound arrives at the two microphones at the same angle θ. In FIG. 1, the angle θ is defined with the direction orthogonal to the line connecting the two microphones (microphone-pair direction) taken as 0.

Comparing the path from the sound source 11 to the microphone 1, 12 with the path from the sound source 11 to the microphone 2, 13, the latter can be approximated as being longer by [d·sin θ], so the signal observed at the microphone 2, 13 lags in phase by an amount proportional to [d·sin θ] relative to the observed signal at the microphone 1, 12.

In FIG. 1, the angle θ is defined with the direction orthogonal to the line connecting the two microphones (microphone-pair direction) taken as 0. However, when an angle [θ'] formed by the microphone-pair direction and the sound wave propagation direction is used, the difference in distance to the sound source between the two microphones can be represented as [d·cos θ'].

Letting the observed signals at the microphone 1 and the microphone 2 be $x_1(t)$ and $x_2(t)$, respectively, and the path difference from the sound source 11 to the microphones 1 and 2 be [d·sin θ], the resulting relational expression is represented by Equation [1.1] below.

$$x_2(t) = x_1\left(t - \frac{d\sin\theta}{C}F\right) \quad [1.1]$$

t: sample index d: microphone spacing

C: sound velocity

F: sampling frequency

In the above-mentioned equation, t denotes the discrete time, and indicates the sample index. Since the observed signal at the microphone 2: $x_2(t)$ lags in phase by an amount corresponding to the greater distance from the sound source than $x_1(t)$, ignoring attenuation, $x_2(t)$ can be represented as Equation [1.1]

Therefore, if a phase lag can be detected on the basis of the observed signals at the respective microphones, the angle [θ] that determines the sound source direction can be computed in accordance with the above-mentioned equation. In the following, a description will be given of a method of computing the sound source direction by transforming observed signals into the time-frequency domain.

Let $X_1(\omega, t)$ and $X_2(\omega, t)$ represent the results of applying a Short-time Fourier Transform (STFT) described later to a plurality of observed signals $x_1$ and $x_2$, respectively, where ω and t denote the frequency bin index and the frame index, respectively. The observed signals [$x_1$, $x_2$] before undergoing the transform are referred to as time domain signals, and the signals [$X_1$, $X_2$] after undergoing the short-time Fourier transform are referred to as time-frequency domain (or STFT domain) signals.

Since a phase lag in the time domain corresponds to a complex number multiple in the time-frequency domain, the relational expression [1.1] in the time domain can be represented as Equation [1.2] below.

$$X_2(\omega, t) = \exp\left(-j\pi\frac{\omega-1}{M-1}\frac{d\sin\theta}{C}F\right)X_1(\omega, t) \quad [1.2]$$

t: frame index

ω: frequency bin index

M: total number of frequency bins j: imaginary unit

To extract the term containing the angle [θ] indicating the sound source direction, an operation represented as Equation [1.3] may be performed.

$$\text{angle}\left(\frac{X_1(\omega, t)}{X_2(\omega, t)}\right) = \text{angle}(X_1(\omega, t)\overline{X_2(\omega, t)}) \quad [1.3]$$

$$= \pi\frac{\omega-1}{M-1}\frac{d\sin\theta}{C}F$$

In the above-mentioned equation, angle( ) denotes a function for finding the argument of a complex number within the range of $-\pi$ to $+\pi$, and $X_2$ with an overline denotes a complex conjugate of $X_2$. Lastly, the sound source direction can be estimated by Equation [1.4] below.

$$\hat{\theta}(\omega) = \operatorname{asin}\left(\frac{(M-1)C}{\pi(\omega-1)dF} \operatorname{angle}(X_1(\omega,t)\overline{X_2(\omega,t)})\right) \quad [1.4]$$

In this equation, a sin denotes the inverse function of sin.

Also, hat($\theta(\omega)$)) means that the angle $\theta$ in the frequency bin $\omega$ is a value estimated from an observed value. It should be noted that hat as used herein means symbol (^).

While Equation [1.4] mentioned above is for a given specific $\omega$ (frequency bin index) and t (frame index), by calculating the sound source directions with respect to a plurality of $\omega$'s and t's and then taking the mean, a stable value of $\theta$ can be obtained. In addition, it is also possible to prepare n (n>2) microphones, and calculate the sound source direction with respect to each of n(n+1)/2 pairs.

Equations [1.5] to [1.7] below are equations for cases in which a plurality of microphones and a plurality of frames are used.

$$X(\omega, t) = \begin{bmatrix} X_1(\omega, t) \\ \vdots \\ X_n(\omega, t) \end{bmatrix} \quad [1.5]$$

$$E_t[X(\omega, t)] = \begin{bmatrix} E_t[X_1(\omega, t)] \\ \vdots \\ E_t[X_n(\omega, t)] \end{bmatrix} \quad [1.6]$$

$$E_t[X_k(\omega, t)] = \frac{1}{T_1 - T_0 + 1} \sum_{t=T_0}^{T_1} X_k(\omega, t) \quad [1.7]$$

A vector whose elements are the observed signals at individual microphones is defined as Equation [1.5], and the mean of the vector is defined by Equation [1.6]. It should be noted that $E_t[\ ]$ in this equation denotes the mean based on a frame in a given segment, and is defined by Equation [1.7] In Equation [1.4], by using $E_t[X_i((\omega, t)]$ and $E_t[X_m(\omega, t)]$ in Equation [1.6] instead of $X_1(\omega, t)$ and $X_2(\omega, t)$, the mean of source direction corresponding to t0-th to t1-th frames, which is calculated from a pair of i-th microphone and m-th microphone, is found.

Since this sound source estimation method using a phase difference involves less processing cost than that in the case of a scheme using ICA described later, the sound source direction can be computed in real-time (with a delay of less than one frame) and with high frequency (frame by frame).

On the other hand, in environments in which a plurality of sound sources are playing simultaneously, it is not possible to find the sound source direction. In addition, even when a single sound source is present, in environments where large reflections and reverberations exist, the accuracy of the direction decreases.

[A2. Description of ICA]

Now, before describing a sound source estimation method using Independent Component Analysis (ICA), the ICA itself will be described first.

ICA refers to a type of multivariate analysis, and is a technique for separating multidimensional signals by exploiting statistical properties of the signals. For details on ICA itself, reference should be made to, for example, "Introduction to the Independent Component Analysis" (Noboru Murata, Tokyo Denki University Press).

Hereinbelow, a description will be given of ICA for sound signals, in particular, ICA in the time-frequency domain.

As shown in FIG. 2, a situation is considered in which different sounds are being played from N sound sources, and those sounds are observed at n microphones. The sounds (source signals) produced from the sound sources are subject to time lags, reflections, and so on before arriving at the microphones. Therefore, signals observed at a microphone j (observed signals) can be represented as an equation that sums up convolutions between source signals and transfer functions with respect to all sound sources as indicated by Equation [2.1] below. Hereinafter, these mixtures will be referred to as "convolutive mixtures".

$$x_k(t) = \sum_{j=1}^{N} \sum_{l=0}^{L} a_{kj}(l) s_j(t-l) = \sum_{j=1}^{N} \{a_{kj} * s_j\} \quad [2.1]$$

Observed signals for all microphones can be represented by a single equation as in Equation [2.2] below.

$$x(t) = A^{[0]} s(t) + \ldots + A^{[L]} s(t-L) \quad [2.2]$$

where $$s(t) = \begin{bmatrix} s_1(t) \\ \vdots \\ s_N(t) \end{bmatrix},$$

$$x(t) = \begin{bmatrix} x_1(t) \\ \vdots \\ x_n(t) \end{bmatrix},$$

$$A^{[l]} = \begin{bmatrix} a_{11}(l) & \ldots & a_{1N}(l) \\ \vdots & \ddots & \vdots \\ a_{n1}(l) & \ldots & a_{nN}(l) \end{bmatrix}$$

Here, x(t) and s(t) are column vectors having $x_k(t)$ and $s_k(t)$ as elements, respectively. $A^{[l]}$ is an n×N matrix having $a^{[l]}_{kj}$ as elements. In the following description, it is assumed that n=N.

It is a common knowledge that convolutive mixtures in the time domain are represented by instantaneous mixtures in the time-frequency domain. An analysis that exploits this characteristic is ICA in the time-frequency domain.

Concerning the time-frequency domain ICA itself, reference should be made to, for example, Japanese Unexamined Patent Application Publication No. 2005-49153 "19. 2. 4 Fourier Transform Methods" of "Explanation of Independent Component Analysis" and Japanese Unexamined Patent Application Publication No. 2006-238409 "AUDIO SIGNAL SEPARATING APPARATUS/NOISE REMOVAL APPARATUS AND METHOD").

Hereinbelow, features that are relevant to the present invention will be mainly described.

Application of a short-time Fourier transform on both sides of Equation [2.2] mentioned above yields Equation [3.1] below.

$$X(\omega, t) = A(\omega)S(\omega, t) \quad [3.1]$$

$$X(\omega, t) = \begin{bmatrix} X_1(\omega, t) \\ \vdots \\ X_n(\omega, t) \end{bmatrix} \quad [3.2]$$

$$A(\omega) = \begin{bmatrix} A_{11}(\omega) & \cdots & A_{1N}(\omega) \\ \vdots & \ddots & \vdots \\ A_{n1}(\omega) & \cdots & A_{nM}(\omega) \end{bmatrix} \quad [3.3]$$

$$S(\omega, t) = \begin{bmatrix} S_1(\omega, t) \\ \vdots \\ S_N(\omega, t) \end{bmatrix} \quad [3.4]$$

$$Y(\omega, t) = W(\omega)X(\omega, t) \quad [3.5]$$

$$Y(\omega, t) = \begin{bmatrix} Y_1(\omega, t) \\ \vdots \\ Y_n(\omega, t) \end{bmatrix} \quad [3.6]$$

$$W(\omega) = \begin{bmatrix} W_{11}(\omega) & \cdots & W_{1n}(\omega) \\ \vdots & \ddots & \vdots \\ W_{n1}(\omega) & \cdots & W_{nn}(\omega) \end{bmatrix} \quad [3.7]$$

In Equation [3.1], $\omega$ is the frequency bin index and t is the frame index.

If $\omega$ is fixed, this equation can be regarded as instantaneous mixtures (mixtures with no time lag). Accordingly, to separate observed signals, Equation [3.5] for computing the separated results [Y] is prepared, and then a separating matrix $W(\omega)$ is determined such that the individual components of the separated results: $Y(\omega, t)$ are maximally independent.

In the case of time-frequency domain ICA according to the related art, a so-called permutation problem occurs, in which "which component is separated into which channel" differs for each frequency bin. This permutation problem was almost entirely solved by the configuration disclosed in Japanese Unexamined Patent Application Publication No. 2006-238409 "AUDIO SIGNAL SEPARATING APPARATUS/NOISE REMOVAL APPARATUS AND METHOD", which is a patent application previously filed by the same inventor as the present application. Since this method is also employed in an embodiment of the present invention, a brief description will be given of the technique for solving the permutation problem disclosed in Japanese Unexamined Patent Application Publication No. 2006-238409.

In Japanese Unexamined Patent Application Publication No. 2006-238409, to find a separating matrix $W(\omega)$, Equations [4.1] to [4.3] below are iterated until the separating matrix $W(\omega)$ converges (or a predetermined number of times).

$$Y(\omega, t) = W(\omega)X(\omega, t) \quad [4.1]$$
$$(t = 1, \ldots, T \quad \omega = 1, \ldots, M)$$

$$\Delta W(\omega) = \{I + E_t[\varphi_\omega(Y(t))Y(\omega, t)^H]\}W(\omega) \quad [4.2]$$

$$W(\omega) \leftarrow W(\omega) + \eta \Delta W(\omega) \quad [4.3]$$

$$Y(t) = \begin{bmatrix} Y_1(1, t) \\ \vdots \\ Y_1(M, t) \\ \hline \vdots \\ \hline Y_n(1, t) \\ \vdots \\ Y_n(M, t) \end{bmatrix} = \begin{bmatrix} Y_1(t) \\ \vdots \\ Y_n(t) \end{bmatrix} \quad [4.4]$$

$$\varphi_\omega(Y(t)) = \begin{bmatrix} \varphi_\omega(Y_1(t)) \\ \vdots \\ \varphi_\omega(Y_n(t)) \end{bmatrix} \quad [4.5]$$

$$\varphi_\omega(Y_k(t)) = \frac{\partial}{\partial Y_k(\omega, t)} \log P(Y_k(t)) \quad [4.6]$$

$P(Y_k(t))$: probability density function (PDF) of $Y_k(t)$ [4.7]
$$P(Y_k(t)) \propto \exp(-\gamma\|Y_k(t)\|_2)$$

$$\|Y_k(t)\|_m = \left\{\sum_{\omega=1}^M |Y_k(\omega, t)|^m\right\}^{1/m} \quad [4.8]$$

$$\varphi_\omega(Y_k(t)) = -\gamma \frac{Y_k(\omega, t)}{\|Y_k(t)\|_2} \quad [4.9]$$

In the following, such iteration will be referred to as "learning". It should be noted, however, that Equations [4.1] to [4.3] are performed with respect to all frequency bins, and further, Equation [4.1] is performed with respect to all the frames of charged observed signals. In addition, in Equation [4.2], $E_t[\cdot]$ denotes the mean over all frames. The superscript H attached at the upper right of $Y(\omega, t)$ indicates the Hermitian transpose (taking the transpose of a vector or a matrix, and also transforming its elements into conjugate complex numbers).

The separated results $Y(t)$ are represented by Equation [4.4]. Also, $\phi_\omega((Y(t))$, which denotes a vector in which elements of all the channels and all the frequency bins of the separated results are arranged, is represented by Equation [4.5]. Each element $\phi_{107}(Y_k(t))$ is called a score function, and is a logarithmic derivative of the multidimensional (multivariate) probability density function (PDF) of $Y_k(t)$ (Equation [4.6]). As the multidimensional PDF, for example, a function represented by Equation [4.7] can be used, in which case the score function $\phi_\omega(Y_k(t))$ can be represented as Equation [4.9]. It should be noted, however, that $\|Y_k(t)\|_2$ is an L-2 norm (obtained by finding the square sum of all elements and then taking the square root of the resulting sum). An L-m as a generalized form of the L-2 norm is defined by Equation [4.8]. In Equation [4.7] and Equation [4.9], $\gamma$ denotes a term for adjusting the scale of $Y_k(\omega, t)$, for which an appropriate positive constant, for example, sqrt(M) (square root of the number of frequency bins) is substituted. In Equation [4.3], $\eta$ is a positive small value (for example, about 0.1) called a learning ratio or learning coefficient. This is used for gradually reflecting $\Delta W(\omega)$ calculated in Equation [4.2] on the separating matrix $W(\omega)$.

While Equation [4.1] represents separation in one frequency bin (see FIG. 3A), it is also possible to represent separation in all frequency bins by a single equation (see FIG. 3B).

This may be accomplished by using the separated results $Y(t)$ in all frequency bins represented by Equation [4.4] described above, and observed signals $X(t)$ represented by Equation [4.11] below, and further the separating matrices for all frequency bins represented by Equation [4.10]. By using those vectors and matrices, separation can be represented by Equation [4.12]. According to an embodiment of the present invention, Equation [4.1] and Equation [4.11] are used selectively as necessary.

$$W = \begin{bmatrix} W_{11}(1) & 0 & & & W_{1n}(1) & 0 & & \\ & \ddots & & \cdots & & \ddots & & \\ 0 & & W_{11}(M) & & 0 & & W_{1n}(M) & \\ \vdots & & & \ddots & \vdots & & & \\ W_{n1}(1) & 0 & & & W_{nn}(1) & 0 & & \\ & \ddots & & \cdots & & \ddots & & \\ 0 & & W_{n1}(M) & & 0 & & W_{nn}(M) & \end{bmatrix} \quad [4.10]$$

$$X(t) = \begin{bmatrix} X_1(1, t) \\ \vdots \\ X_1(M, t) \\ \vdots \\ X_n(1, t) \\ \vdots \\ X_n(M, t) \end{bmatrix} \quad [4.11]$$

$$Y(t) = WX(t) \quad [4.12]$$

$$\Delta W(\omega) = \{I - E_t[Y(\omega, t)Y(\omega, t)^H] + E_t[\varphi_\omega(Y(t))Y(\omega, t)^H] - E_t[Y(\omega, t)\varphi_\omega(Y(t))^H]\}W(\omega) \quad [4.13]$$

$$E_t[Y(\omega, t)Y(\omega, t)^H] = W(\omega)E_t[X(\omega, t)X(\omega, t)^H]W(\omega)^H \quad [4.14]$$

$$E_t[Y(\omega, t)\varphi_\omega(Y(t))^H] = E_t[\varphi_\omega(Y(t))Y(\omega, t)^H]^H \quad [4.15]$$

$$Y(\omega, t) \leftarrow \text{diag}\left(\frac{1}{\sqrt{E_t[|Y_1(\omega, t)|^2]}}, \ldots, \frac{1}{\sqrt{E_t[|Y_n(\omega, t)|^2]}}\right) Y(\omega, t) \quad [4.16]$$

$$W(\omega) \leftarrow \text{diag}\left(\frac{1}{\sqrt{E_t[|Y_1(\omega, t)|^2]}}, \ldots, \frac{1}{\sqrt{E_t[|Y_n(\omega, t)|^2]}}\right) W(\omega) \quad [4.17]$$

The diagrams of $X_1$ to $X_n$ and $Y_1$ to $Y_n$ shown in FIGS. 3A and 3B are called spectrograms, in which the results of short-time Fourier transform (STFT) are arranged in the frequency bin direction and the frame direction. The vertical direction represents the frequency bin, and the horizontal direction represents the frame. While lower frequencies are drawn at the top in Equation [4.4] and Equation [4.11], lower frequencies are drawn at the bottom in the spectrograms.

ICA is a type of Blind Source Separation (BSS), and has such characteristics that in the separation process, no knowledge about signal sources (the frequency distributions, the directions of arrival, and the like of sound sources) is necessary, and separation can be performed even without any prior knowledge about the sound velocity, microphone spacing, microphone gain, transfer function, and the like. Further, an assumption other than independence (for example, sparseness or the like) is also unnecessary, and separation is possible even when a plurality of sound sources keep playing and mixtures are occurring in the frequency domain (that is, even when the assumption of sparseness does not hold). These characteristics prove advantageous for the scheme that involves "sound source separation after direction estimation" described later.

[A3. Sound Source Estimation Using ICA]

A scheme for estimating the sound source direction by using ICA is described in, for example, Japanese Patent No. 3881367.

Hereinbelow, a description will be given of a method of finding the sound source direction from the separating matrix $W(\omega)$ disclosed in Japanese Patent No. 3881367 mentioned above. The separating matrix $W(\omega)$ obtained after learning has converged represents a process reverse to a mixing matrix $A(\omega)$. Therefore, if $W(\omega)^{-1}$ as the inverse matrix of $W(\omega)$ is found, this can be considered as indicating a transfer function corresponding to a frequency bin $\omega$.

As shown in Equation [5.1] below, let the inverse matrix of the separating matrix $W(\omega)$ be $B(\omega)$, and further, individual elements of $B(\omega)$ be defined as follows.

$$B(\omega) = W(\omega)^{-1} \quad [5.1]$$

$$B(\omega) = \begin{bmatrix} B_{11}(\omega) & \cdots & B_{1n}(\omega) \\ \vdots & \ddots & \vdots \\ B_{n1}(\omega) & \cdots & B_{nn}(\omega) \end{bmatrix} \quad [5.2]$$

$$X_{mk}(\omega, t) = B_{mk}(\omega)Y_k(\omega, t) \quad [5.3]$$

$$\hat{\theta}_{imk}(\omega) = a\sin\left(\frac{(M-1)C}{\pi(\omega-1)d_{im}F} \text{angle}(B_{ik}(\omega)\overline{B_{mk}(\omega)})\right) \quad [5.4]$$

Here, directing attention to the k-th row (horizontal array) of the separating matrix $W(\omega)$ and the k-th column (vertical array) of the inverse matrix $B(\omega)$ (see FIG. 4A), the k-th row of the separating matrix $W(\omega)$ is a vector that yields the separated results (=estimated sound sources) $Y_k(\omega, t)$ for the k-th channel from a vector $X(\omega, t)$ of observed signals, whereas the k-th column of an estimated transfer function matrix $B(\omega)$ as its inverse matrix $B(\omega)$ represents transfer functions (see FIG. 4B) from the estimated sound sources $Y_k(\omega, t)$ to individual microphones.

That is, of observed signals $X_m(\omega, t)$ observed at the m-th microphone, letting components derived from the sound sources $Y_k(\omega, t)$ be written as component signals $X_{mk}(\omega, t)$, the component signals $X_{mk}(\omega, t)$ can be represented as Equation [5.3] below.

$$X_{mk}(\omega,t) = B_{mk}(\omega)Y_k(\omega,t) \quad [5.3]$$

By using the inverse matrix $B(\omega)$ of the separating matrix $W(\omega)$, components of observed signals derived from individual sound sources can be found. Therefore, the sound source direction can be computed by the same method as in the case of "1. Sound Source Estimation using Phase Difference between Microphones" described at the beginning of this specification.

For example, to find hat($\theta_{imk}(\omega)$) as the sound source direction of the separated results $Y_k(\omega, t)$ by using the i-th microphone and the m-th microphone, component signals $X_{ik}(\omega, t)$ and $X_{mk}(\omega, t)$ computed from Equation [5.3] mentioned above may be substituted into the short-time Fourier transformed observed signals $x_1(\omega, t)$ and $X_2(\omega, t)$ corresponding to the observed signals at two microphones in Equation [1.4] described above. As a result, Equation [5.4] below is obtained.

$$\hat{\theta}_{imk}(\omega) = a\sin\left(\frac{(M-1)C}{\pi(\omega-1)d_{im}F} \text{angle}(B_{ik}(\omega)\overline{B_{mk}(\omega)})\right) \quad [5.4]$$

In this equation, $d_{im}$ denotes the distance between the i-th microphone and the m-th microphone.

It should be noted that in Equation [5.4] mentioned above, the frame index [t] has disappeared. That is, as long as the separated results $Y(\omega, t) = W(\omega)X(\omega, t)$ are calculated using the same separating matrix $W(\omega)$, the same sound source direction is computed for any frame t.

Unlike in the case of "1. Sound Source Estimation using Phase Difference between Microphones", the above-described method of computing the sound source direction from the inverse matrix of a separating matrix of ICA has an advantage in that even when a plurality of sound sources are simultaneously playing, the directions of individual sound sources can be found.

In addition, there is also an advantage in that since the separated results and the sound source direction are both calculated from the separating matrix $W(\omega)$, the correspondence in terms of which channel of the separated results is associated with which direction is established from the beginning. That is, in a case where sound source separation means and sound source direction estimating means other than ICA are used in combination as multiple-source direction estimating means, depending on the combination of schemes, it is necessary to establish the correspondence between channels separately in subsequent stages, and there is a possibility that an error may occur at that time. In schemes using ICA, however, it is unnecessary to establish such correspondence in subsequent stages.

As for the sound velocity C, microphone spacing $d_{im}$, and the like which appear in Equation [5.4], their values on the equation differ from those in the actual environment in some cases. In such cases, in schemes using ICA, although an estimation error occurs in the sound source direction itself, the error in direction does not affect the accuracy of sound source separation. In addition, microphone gain is subject to individual differences among microphones, and depending on the sound source separation or direction estimation scheme, such variations in gain adversely affect the accuracy of separation or estimation in some cases. In schemes using ICA, however, variations in microphone gain affect neither the separation performance nor direction estimation.

[A4. Real-Time Implementation of ICA]

The learning process descried in the section "A2. Description of ICA", in which Equation [4.1] to Equation [4.3] are iterated until the separating matrix $W(\omega)$ converges (or a predetermined number of times), is performed in batch. That is, as described above, the iteration process of Equation [4.1] to Equation [4.3], in which Equation [4.1] to Equation [4.3] are iterated after charging the whole of observed signals, is referred to as learning.

This batch process can be applied to real-time (low-delay) sound source separation through some contrivance. As an example of a sound source separation process realizing a real-time processing scheme, a description will be given of the configuration disclosed in "Japanese Patent Application No. 2006-331823: REAL-TIME SOUND SOURCE SEPARATION APPARATUS AND METHOD", which is a patent application previously filed by the same inventor as the present application.

As shown in FIG. 5, the processing scheme disclosed in Japanese Patent Application No. 2006-331823 splits observed signal spectrograms into a plurality of overlapped blocks 1 to N, and learning is performed for each block to find a separating matrix. The reason why the blocks are overlapped is to achieve both the accuracy and the frequency of updates of the separating matrix.

In the case of real-time ICA (blockwise ICA) disclosed prior to Japanese Patent Application No. 2006-331823, blocks are not overlapped. Therefore, to shorten the update interval of the separating matrix, it is necessary to shorten the block length (=the time for which observed signals are charged). However, there is a problem in that a shorter block length results in lower separation accuracy.

A separating matrix found from each block is applied to subsequent observed signals (not applied to the same block) to generate the separated results. Herein, such a scheme will be referred to as "staggered application".

FIG. 6 illustrates the "staggered application". Suppose that at the current time, observed signals in the t-th frame $X(t)$62 are inputted. At this point, the separating matrix corresponding to the block containing the observed signals $X(t)$ (for example, an observed signal block 66 containing the current time) has not been obtained yet. Accordingly, instead of the block 66, the observed signals $X(t)$ are multiplied by the separating matrix learned from a learning data block 61 that is a block preceding the block 66, thereby generating the separated results corresponding to $X(t)$, that is, separated results $Y(t)$64 at the current time. It is assumed that the separating matrix learned from the learning data block 61 is already obtained at the point in time of the frame t.

As described above, a separating matrix is considered to represent a process reverse to a mixing process.

Hence, if the mixing process is the same (for example, if the positional relation between sound sources and microphones has not changed) between the observed signals in the learning data block setting segment 61 and the observed signals 62 at the current time, signal separation can be performed even when a separating matrix learned in a different segment is applied, thereby making it possible to realize separation with little delay.

A process of obtaining a separating matrix from overlapped blocks can be executed, for example, on a general PC by a computation according to a predetermined program. The configuration disclosed in Japanese Patent Application No. 2006-331823 proposes a scheme in which a plurality of processing units called threads for finding a separating matrix from overlapped blocks are run in parallel at staggered times. This parallel processing scheme will be described with reference to FIG. 7.

FIG. 7 shows the transitions of processing over time of individual threads serving as the units of processing. FIG. 7 shows six threads, Threads 1 to 6. Each thread repeats three states of A) Charging, B) Learning, and C) Waiting. That is, the thread length corresponds to the total time length of the three processes of A) Charging, B) Learning, and C) Waiting. Time progresses from left to right in FIG. 7.

The "A) Charging" is the segment of dark gray in FIG. 7. When in this state, a thread charges observed signals. The overlapped blocks in FIG. 5 can be expressed by staggering the charging start times between threads. Since the charging start time is staggered by ¼ of the charging time in FIG. 7, assuming that the charging time in one thread is, for example, four seconds, the staggered time between threads equals one second.

Upon charging observed signals for a predetermined time (for example, four seconds), each thread transitions in state to "B) Learning". The "B) Learning" is the segment of light gray in FIG. 7. When in this state, Equations [4.1] and [4.3] described above are iterated with respect to the charged observed signals.

Once the separating matrix W has sufficiently converged (or simply upon reaching a predetermined number of iterations) by learning (iteration of Equations [4.1] to [4.3]), the learning is ended, and the thread transitions to the "C) Waiting" state (the white segment in FIG. 7). The "Waiting" is provided for keeping the charging start time and the learning start time at a constant interval between threads. As a result, the learning end time (=the time at which the separating matrix is updated) is also kept substantially constant.

The separating matrix W obtained by learning is used for performing separation until learning in the next thread is finished. That is, the separating matrix W is used as a separating matrix 63 shown in FIG. 6. A description will be given of the separating matrix used in each of applied-separating-matrix specifying segments 71 to 73 along the progression of time shown at the bottom of FIG. 7.

In the applied-separating-matrix specifying segment 71 from when the system is started to when the first separating matrix is learned, an initial value (for example, a unit matrix) is used as the separating matrix 63 in FIG. 6. In the segment 72 from when learning in Thread 1 is finished to when learning in Thread 2 is finished, a separating matrix derived from an observed-signal charging segment 74 in Thread 1 is used as the separating matrix 63 shown in FIG. 6. The numeral "1" shown in the segment 72 in FIG. 7 indicates that the separating matrix W used in this period is obtained through processing in Thread 1. The numerals on the right from the applied-separating-matrix specifying segment 72 also each indicate from which thread the corresponding separating matrix is derived.

If a separating matrix obtained in another thread exists at the point of starting learning, the separating matrix is used as the initial value of learning. This will be referred to as "inheritance of a separating matrix". In the example shown in FIG. 7, at learning start timing 75 at which the first learning is started in Thread 3, the separating matrix 72 derived from Thread 1 is already obtained, so the separating matrix 72 is used as the initial value of learning.

By performing such processing, it is possible to prevent or reduce the occurrence of permutation between threads. Permutation between threads refers to, for example, a problem such that in the separating matrix obtained in the first thread, speech is outputted on the first channel and music is outputted on the second channel, whereas the reverse is true for the separating matrix obtained in the second thread.

As described above with reference to FIG. 7, permutation between threads can be reduced by performing "inheritance of a separating matrix" so that when a separating matrix that has been obtained in another thread exists, the separating matrix is used as the initial value of learning. In addition, even when a separating matrix has not sufficiently converged by learning in Thread 1, the degree of convergence can be improved as the separating matrix is inherited by the next thread.

By running a plurality of threads at staggered times in this way, the separating matrix is updated at an interval substantially equal to a shift between threads, that is, a block shift width 76.

[B. Problems of the Related Art]

When the "A3. Sound Source Direction Estimation using ICA" and "A4. Real-time Implementation of ICA" described above are combined, real-time sound source estimation adapted to multiple sound sources can be performed.

That is, it is possible to find the sound source direction by applying Equations [5.1] to [5.4] described above to each of separating matrices obtained from individual threads (such as the separating matrices used in the segments 72, 73, and so on shown in FIG. 7).

However, simply combining the two processes will give rise to several problems. Hereinbelow, these problems will be described from the following five viewpoints.

B1. Delay
B2. Tracking Lag
B3. Singularity of Separating Matrix and Zero Elements
B4. Difference in Purpose
B5. Flexibility of Parameter Settings Hereinbelow, a description will be given with respect to each of the above viewpoints.

[B1. Delay]

Although a delay in sound source separation can be almost entirely eliminated by employing the "staggered application" described above with reference to FIG. 6, a delay in sound source direction estimation still remains as long as the direction is computed from a separating matrix. That is, in FIG. 6, the separated results corresponding to the observed signals X(t) 62 at the current time are obtained by multiplying X(t) by the separating matrix 63. That is, as the separated results 64 at the current time in FIG. 6, the following separated results are obtained.

$$Y(t) = WX(t)$$

However, the sound source direction computed from the separating matrix 63 corresponds to the learning data block 61 that is a preceding segment. In other words, the sound source direction corresponding to the observed signals 62 at the current time is obtained at the point in time when a new separating matrix is learned from the block 66 containing the current time.

Assuming that the sound source direction is the same between the segment of the learning data block 61 and the current time, and employing the sound source direction computed from the separating matrix 63 as the sound source direction of Y(t), it appears that no delay occurs (this process will be referred to as "shifting of time point"). However, when the sound sources have changed between the segment of the learning data block 61 and the current time (when the sound sources have moved or started playing suddenly), a mismatch occurs between the separating matrix and the observed signals, and thus an inaccurate sound source direction is given. Moreover, it is not possible to determine if such a mismatch has occurred from the separating matrix alone.

In addition, when the "staggered application" is performed, for the same reason as that for the occurrence of a delay, strict correspondence is no longer established between the sound source direction and the separated results. For example, the separated results strictly corresponding to the sound source direction computed from the separating matrix (63) are generated by multiplying the observed signals in the segment of the learning data block 61 used for learning of the separating matrix, by the separating matrix 63. However, in the case of "staggered application", multiplication between the separating matrix 63 and the observed signals in the learning data block 61 is not performed. Neither the separated results 64 at the current time, which are obtained as the product of the separating matrix 63 and the observed signals at the current time, nor data in a separated result spectrogram segment 65 having the same start and end times on the separated result side as those of the learning data block 61 strictly corresponds to the sound source direction computed from the separating matrix 63.

[B2. Tracking Lag]

When "staggered application" is employed, a mismatch occurs temporarily if the sound sources have changed (if the sound sources have moved or started playing suddenly) between the segment used for learning of a separating matrix (for example, the learning data block 61) and the observed signals 62 at the current time. Thereafter, as a separating matrix corresponding to the changed sound sources is obtained by learning, such a mismatch disappears eventually. This phenomenon will be herein referred to as "tracking lag". Although tracking lag does not necessarily exert an adverse influence on the performance of sound source separation, even in that case, tracking lag sometimes exerts an adverse influence on the performance of direction estimation. Hereinbelow, a description will be given in this regard.

FIG. 8 is a conceptual diagram of tracking lag. Suppose that one sound source starts playing at given time (t) (for example, when someone suddenly starts talking). Other sound sources may either keep playing or remain silent before and after the time at which the sound source starts playing. With respect to the segments before and after the start of play, the degree of convergence of learning is shown in (a) Graph 1.

The degree of mismatch between the observed signals and the separating matrix is shown in (b) Graph 2.

First, (a) Graph 1 will be described. Provided that an inactive segment in which a sound source of interest is inactive (silent) has continued for a while, observed signals in that segment (for example, the separating matrix learned from an observation segment 81a) have converged sufficiently. This degree of convergence corresponds to convergence degree data 85a in (a) Graph 1.

Even when a sound source starts playing at time (t), due to the "staggered application", a separating matrix learned in the "inactive" segment is used for some time. For example, a separating matrix learned in the "inactive" segment is used in a data segment 85b in (a) Graph 1 as well. The length of the data segment 85b is longer than the learning time (for example, the time length indicated at 77 in FIG. 7) and shorter or equal to the sum total of the block shift width (for example, the time length indicated at 76 in FIG. 7) and the learning time, and is determined by the balance between the timing at which learning starts and the timing at which a sound starts playing.

Thereafter, a separating matrix learned from an observation segment including the "sound-source active" segment begins to be used. For example, in a data segment 85c of the convergence degree data in (a) Graph 1, the separating matrix learned from the observation segment 81b is used. It should be noted, however, that if the number of learning loops is set small (for example, if learning is aborted in 20 loops to shorten the learning time, even through learning converges in 100 loops), the separating matrix has not converged completely. Therefore, the degree of convergence in the data segment 85c in (a) Graph 1 is low.

Thereafter, the separating matrix converges as the "inheritance of a separating matrix" (see "4. Real-time Implementation of ICA" described above) is repeated between threads. This occurs in the sequence of data segments 85c, 85d, 85e, and 85f of the convergence degree data in (a) Graph 1. It is assumed that the separating matrix has converged sufficiently in the data segment 85f and thereafter.

Next, a description will be given of (b) Graph 2 showing the degree of mismatch between the observed signals and the separating matrix. This is a conceptual graph indicating how much mismatch there is between a separating matrix and observed signals at the current time. The degree of mismatch becomes high in one of the following two cases.

(1) There has been a change in sound source between the segment used for learning of the separating matrix and the current time.

(2) The separating matrix has not completely converged.

Although the separating matrix has converged in a data segment 88b of the mismatch degree data, the degree of mismatch becomes high due to the reason (1). As the separating matrix gradually converges in data segments 88c to 88f, the degree of mismatch also decreases.

Even when a mismatch occurs, this does not necessarily exert an adverse influence on sound source separation. For example, when only one major sound source is playing, that is, when only about background noise is present in the observation segment 81 that is a sound-source inactive segment, there is no mixing of sounds in the first place, so even if a mismatch occurs in the separating matrix, this does not affect sound source separation. In addition, in cases where observed signals are separated into a target sound and an interference sound and only the target sound is used, if the interference sound is a continuously playing sound and the target sound is an intermittent sound (sound that starts playing suddenly), there is no influence on the separated results of the target sound. Specifically, the continuous sound keeps being outputted to only one of channels, irrespective of the presence/absence of another sound. On the other hand, when another sound source suddenly starts playing, although the sound is outputted to all output channels in the segment 88d, as the degree of mismatch becomes lower, the sound comes to be outputted to only one channel different from the channel of continuous sound. Therefore, if the interference sound is continuous, an output channel in which the interference sound is suppressed exists throughout the time both before and after the target sound plays, and if such a channel is selected, removal of interference sound succeeds.

On the other hand, with respect to sound source direction estimation, the mismatch between a separating matrix and observed signals exerts an adverse influence. For example, in the data segment 88b shown in FIG. 8, if the "shifting of time point" described in "2. Tracking Lag" is performed, an inaccurate direction (direction computed not from the sound-source active segment but the sound-source inactive segment) is given. In addition, since the separating matrix has not converged yet in the data segments 88c and 88d, there is a possibility that a separating matrix calculated from those segments is also inaccurate.

If only those cases are considered in which there is a single sound source, the sound source can be computed without tracking lag in the case of "1. Sound Source Estimation using Phase Difference between Microphones" described above. That is, employing "Real-time ICA plus Sound Source Estimation from Separating Matrix" in an environment where there is only a single sound source presents more problems than "1. Sound Source Estimation using Phase Difference between Microphones".

[B3. Singularity of Separating Matrix and Zero Elements]

In the system disclosed in Japanese Patent No. 3881367 described in [A3. Sound Source Estimation using ICA", the inverse matrix of a separating matrix is used. Thus, if the separating matrix is close to singular, that is, the determinant of the separating matrix is a value close to 0, an inverse matrix is not obtained properly, and there is a possibility of divergence. In addition, even if an inverse matrix exists, if any one of the elements of the matrix is 0, it is not possible for the function [angle( )] to return a valid value in Equation [5.4] described above.

For example, suppose that at system start-up, a unit matrix is substituted for the separating matrix (that is, a unit matrix is used in the segment 71 shown in FIG. 7). While an inverse matrix exists for a unit matrix (the unit matrix itself), all elements except the diagonal elements of the inverse matrix are 0. Thus, the sound source direction is not found from Equation [5.4] described above. Therefore, in the case of the scheme that finds the sound source direction from the inverse matrix of a separating matrix, the sound source direction is not found for the segment 71 in which a unit matrix is substituted for the separating matrix.

At times other than immediately after start-up as well, if the separating matrix becomes close to singular or if its inverse matrix contains zero elements, a correct sound source direction can no longer be found. In addition, if the number of channels (the number of microphones) increases, the complexity of the inverse matrix also increases. Thus, it would be desirable if a similar operation could be performed without using an inverse matrix.

[B4. Difference in Purpose]

In Japanese Patent No. 3881367 described in [A3. Sound Source Estimation using ICA" above, the direction is found from a separating matrix of ICA. The main purpose of this process is to overcome the permutation problem between frequency bins. That is, sound source directions are computed for individual frequency bins, and from those sound source directions, channels having substantially the same sound source direction are grouped between frequency bins, thereby aligning permutation between frequency bins.

After Japanese Patent No. 3881367, for example, in Japanese Unexamined Patent Application Publication No. 2006-238409, a scheme that is relatively permutation-free was introduced. However, combining this scheme with Japanese Patent No. 3881367 does not improve the accuracy of direction estimation.

[B5. Flexibility of Parameter Settings]

When computing the sound source direction from a separating matrix of ICA, the update frequency of direction and the corresponding segment coincide with the update frequency of the separating matrix and the learning data segment, and separate settings are not allowed. That is, the direction update interval substantially coincides with the block shift width 76 shown in FIG. 7, and the direction thus obtained is the mean of observed signals within the block (for example, the data segment 71 shown in FIG. 7).

It is necessary to determine the block shift width, the charging segment length, and further the number of learning loops (which affect the learning time) and the like by taking the separation performance, CPU power, and the like into account. Thus, what is optimal from the viewpoint of separation may not necessarily be optimal from the viewpoint of direction estimation.

The above-mentioned sound source direction estimation using ICA is a scheme which performs direction estimation after performing sound source separation (that is, ICA). On the other hand, in some schemes according to the related art, the above-mentioned order is reversed, that is, after performing sound source direction estimation, the resulting value is used to perform sound source separation. In the latter method, it is easy to establish correspondence between channels, and the separation itself can be performed with low delay. However, a problem common to schemes that perform "sound source separation after direction estimation" is that the accuracy of direction estimation affects the separation accuracy. Further, even if the direction itself can be estimated correctly, there is a possibility that separation accuracy may decrease due to other factors at the point of sound source separation.

An example in which sound source separation based on frequency masking is performed after direction estimation is disclosed in Japanese Unexamined Patent Application Publication No. 2004-325284 "METHOD OF ESTIMATING SOUND SOURCE DIRECTION AND SYSTEM FOR THE SAME, AND METHOD OF SEPARATING SOUND SOURCES AND SYSTEM FOR THE SAME". In this scheme, after performing direction estimation on a per-frequency bin basis, signals in frequency bins where a target sound is dominant are left out to thereby extract the target sound. However, since this method assumes sparseness in the frequency domain (mixing of a target sound and an interference sound is rare at the same frequency), for mixing of signals for which that assumption does not hold, both the accuracy of direction estimation and the accuracy of sound source separation decrease.

An example in which sound source separation based on beamforming is performed after direction estimation is disclosed in Japanese Unexamined Patent Application Publication No. 2008-64892 "VOICE RECOGNITION METHOD AND VOICE RECOGNITION APPARATUS USING THE SAME". In this system, after estimating the directions of arrival from sound sources at long distances or the positions of sound sources at short distances by using the MUSIC method (a technique in which signal and noise subspaces are obtained from eigenvalue decomposition of a correlation matrix, and the inverse of the dot product of an arbitrary sound source position vector and the noise subspace is obtained to examine the sound wave arrival direction and position of the sound source), a target sound is extracted by using the minimum variance beamformer (or the Frost beamformer). In the case of the minimum variance beamformer, it is necessary that the transfer function from the sound source of a target sound to each microphone be previously found. In Japanese Unexamined Patent Application Publication No. 2008-64892, the transfer function is estimated from the direction and position of the sound source. However, since a model with no reverberation is assumed, and values such as the sound velocity and microphone position are used in the estimation of the transfer function, the accuracy of separation decreases if such an assumption or values differ from those in the actual environment.

Summarizing the foregoing discussion, although several schemes have existed for sound source direction estimation in the related art, no system exists which combines the following advantage of the "Sound Source Estimation using Phase Difference Between Microphones":

Both tracking lag and delay are small, and the following advantages of the "Sound Source Estimation Using ICA":

Allows blind separation

Adapted to multiple sound sources

Easy to establish correspondence between the separated results and the sound source direction.

Further, no system exists in which, in the sound source estimation using ICA, under the assumption that there is no permutation between frequency bins in the separated result, the relationship between the frequency bins is exploited to improve the accuracy of direction estimation.

SUMMARY OF THE INVENTION

It is desirable to provide a signal processing apparatus, a signal processing method, and a program, which achieve a high-accuracy separation process and real-time sound source direction estimation on a signal-by-signal basis by using Independent Component Analysis (ICA).

According to an embodiment of the present invention, for example, in the time-frequency domain, cross-covariance matrices are calculated between observed signals and the separated results, and the sound source direction is computed from the phase differences between elements of the cross-covariance matrices. In addition, when computing the sound source direction from the phase differences, the proportionality factor between phase difference and frequency is estimated with good accuracy. The process configuration according to an embodiment of the present invention has the following advantages over the method according to the related art in which the sound source direction is estimated from the inverse matrix of a separating matrix. (1) Calculation can be performed with less delay than in the case of the separating matrix-based method. (2) Direction can be computed with the frequency of every single frame. (3) Direction can be computed even in cases where the inverse matrix of a separating matrix does not exist, and cases where 0 is included in the elements of the inverse matrix.

According to an embodiment of the present invention, there is provided a signal processing apparatus including: a learning processing unit that finds a separating matrix for separating mixed signals in which outputs from a plurality of sound sources are mixed, by a learning process that applies ICA (Independent Component Analysis) to observed signals including the mixed signals; a separation processing unit that applies the separating matrix to the observed signals to separate the mixed signals and generate separated signals corresponding to each of the sound sources; and a sound source direction estimating unit that computes a sound source direction of each of the separated signals generated in the separation processing unit, in which the sound source direction estimating unit calculates cross-covariance matrices between the observed signals and the separated signals in corresponding time segments in time-frequency domain, computes phase differences between elements of the cross-covariance matrices, and computes a sound source direction corresponding to each of the separated signals by applying the computed phase differences.

Further, in the signal processing apparatus according to an embodiment of the present invention, the separation processing unit executes a short-time Fourier transform (STFT) on the mixed signals in which outputs from a plurality of sound sources are mixed, to generate observed signal spectrograms in time-frequency domain, and applies the separating matrix to the observed signal spectrograms to generate separated signal spectrograms in time-frequency domain, and the sound source direction estimating unit calculates cross-covariance matrices between the observed signal spectrograms and the separated signal spectrograms in corresponding time segments in time-frequency domain, computes phase differences between elements of the cross-covariance matrices, and compute a sound source direction corresponding to each of the separated signals by applying the computed phase differences.

Further, in the signal processing apparatus according to an embodiment of the present invention, the sound source direction estimating unit computes covariance matrices of the observed signals in time-frequency domain, and computes the cross-covariance matrices between the observed signals and the separated signals by applying the computed cross-covariance matrices, and Hermitian transpose matrices of the separating matrices computed by the learning processing unit.

Further, in the signal processing apparatus according to an embodiment of the present invention, the sound source direction estimating unit computes, in a process of computing the phase differences, phase differences corresponding to a pair of microphones that are signal input devices put at different positions, individually with respect to each of the sound sources (channels).

Further, in the signal processing apparatus according to an embodiment of the present invention, the sound source direction estimating unit executes a straight-line fitting process which computes a proportionality constant (slope of a straight line) between a phase angle and a frequency, by using information on the phase differences between the elements of the cross-covariance matrices, and computes a sound source direction corresponding to each of the separated signals by using the proportionality constant.

Further, in the signal processing apparatus according to an embodiment of the present invention, the sound source direction estimating unit computes the proportionality constant (slope of a straight line) by executing a recursive method as the straight-line fitting process, the recursive method including executing an unwrap process of correspondence information between the phase angle and the frequency in order from the lowest frequency to perform an updating process of the proportionality constant.

Further, in the signal processing apparatus according to an embodiment of the present invention, the sound source direction estimating unit computes the proportionality constant (slope of a straight line) by executing a linear search method as the straight-line fitting process, the linear search method including gradually changing a value of the proportionality constant (slope of a straight line) from preset minimum to maximum values, calculating an error with respect to the information on the phase differences, and selecting a proportionality constant with small error.

Further, in the signal processing apparatus according to an embodiment of the present invention, the sound source direction estimating unit computes the proportionality constant (slope of a straight line) by executing, as the straight-line fitting process, a linear search method that includes gradually changing a value of the proportionality constant (slope of a straight line) from preset minimum to maximum values, calculating an error with respect to the information on the phase differences, and selecting a proportionality constant with small error, and a recursive method that includes executing, by using the proportionality constant obtained by the linear search method as an initial value, an unwrap process of correspondence information between phase angle and frequency in order from the lowest frequency to perform an updating process of the proportionality constant.

Further, in the signal processing apparatus according to an embodiment of the present invention, the sound source direction estimating unit computes a plurality of proportionality constants (slopes of straight lines) corresponding to each pair of microphones that are signal input devices put at different positions, selects pieces of data with small fitting error from the computed plurality of proportionality constants (slopes of straight lines), and computes a mean (average) of the selected pieces of data to compute a final value of the proportionality constant (slope of a straight line).

Further, in the signal processing apparatus according to an embodiment of the present invention, the signal processing apparatus further executes, by using the proportionality constant (slope of a straight line) acquired as a result of the straight-line fitting process, frequency masking which suppresses a frequency component of signal separation results which has phase angle data that deviates largely from the straight line.

Further, in the signal processing apparatus according to an embodiment of the present invention, the signal processing apparatus further generates the separating matrix by using the proportionality constant (slope of a straight line) acquired as a result of the straight-line fitting process, and uses the generated separating matrix in the learning processing unit.

Further, in the signal processing apparatus according to an embodiment of the present invention, the sound source direction estimating unit computes a matrix $[P_k]$ generated by horizontally arranging vectors $[p_{im}]$ connecting individual microphones within individual pairs of microphones after normalizing their length to 0, and a vector $[D_k]$ generated by horizontally arranging path differences $[D_{imk}]$ with respect to the individual pairs of microphones after normalization by microphone spacing, and computes an angle of a sound source direction, or a vector indicating a sound source direction, as seen from each of the pairs of microphones, by applying the computed matrix $[P_k]$ and the computed vector $[D_k]$.

Further, according to an embodiment of the present invention, there is provided a signal processing method which is executed in a signal processing apparatus, including the steps of: a learning processing unit finding a separating matrix for separating mixed signals in which outputs from a plurality of sound sources are mixed, by a learning process that applies ICA (Independent Component Analysis) to observed signals including the mixed signals; a separation processing unit applying the separating matrix to the observed signals to separate the mixed signals and generate separated signals corresponding to each of the sound sources; and a sound source direction estimating unit computing a sound source direction of each of the generated separated signals, in which the computing of a sound source direction includes calculating cross-covariance matrices between the observed signals and the separated signals in corresponding time segments in time-frequency domain, computing phase differences between elements of the cross-covariance matrices, and computing a sound source direction corresponding to each of the separated signals by applying the computed phase differences.

Further, according to an embodiment of the present invention, there is provided a program for causing a signal processing apparatus to execute signal processing, the signal processing including the steps of: a learning processing unit finding a separating matrix for separating mixed signals in which outputs from a plurality of sound sources are mixed, by a learning process that applies ICA (Independent Component Analysis) to observed signals including the mixed signals; a separation processing unit applying the separating matrix to the observed signals to separate the mixed signals and generate separated signals corresponding to each of the sound sources; and a sound source direction estimating unit computing a sound source direction of each of the generated separated signals, in which the computing of a sound source direction includes calculating cross-covariance matrices between the observed signals and the separated signals in corresponding time segments in time-frequency domain, computing phase differences between elements of the cross-covariance matrices, and computing a sound source direction corresponding to each of the separated signals by applying the computed phase differences.

With the configuration according to an embodiment of the present invention, a separating matrix for separating mixed signals in which outputs from a plurality of sound sources are mixed is found by a learning process that applies Independent Component Analysis (ICA) to observed signals including the mixed signals, the separating matrix is applied to the observed signals to generate separated signals, and a sound source direction estimating process of computing the sound source direction of each separated signal is executed. In the sound source direction estimating process, cross-covariance matrices are calculated between the observed signals and the separated signals in corresponding time segments in time-frequency domain, the phase differences are computed between elements of the cross-covariance matrices, and the sound source direction corresponding to each of the separated signals is computed by applying the computed phase differences. Specifically, a proportionality constant (slope of a straight line) between phase angle and frequency is computed by using information on the phase difference between the elements of the cross-covariance matrices, and the sound source direction corresponding to each of the separated signals is computed by using the proportionality constant. Through this processing, high-accuracy signal separation and sound source estimation process is realized.

It should be noted that the program according to an embodiment of the present invention is a program that can be provided to a general-purpose system capable of executing a variety of program codes, via a recording medium or communication medium that is provided in a computer-readable format. By providing such a program in a computer-readable format, processes corresponding to the program are realized on the computer system.

Other objects, features, and advantages of the present invention will become apparent from the following detailed description of embodiments of the present invention and the accompanying drawings. It should be noted that the term system as used in this specification refers to a logical assembly of a plurality of devices, and is not limited to one in which the constituent devices are located within the same housing.

BRIEF DESCRIPTION OF THE DRAWINGS

FIG. 1 is a diagram illustrating the basic estimation scheme for the sound source direction;

FIG. 2 is a diagram illustrating a situation in which different sounds are being played from N sound sources, and those sounds are observed at n microphones;

FIG. 5 is a diagram illustrating a processing example in which observed signal spectrograms are split into a plurality of overlapped blocks 1 to N, and learning is performed for each block to find a separating matrix;

FIG. 6 is a diagram illustrating "staggered application" which applies a separating matrix found from each block to subsequent observed signals;

FIG. 7 is a diagram illustrating a scheme in which a plurality of processing units each called a thread for obtaining a separating matrix from overlapped blocks are run in parallel at staggered times;

FIG. 9 is a diagram illustrating cross-covariance matrices in a segment containing the current time;

FIGS. 10A and 10B are diagrams illustrating the plotted data of phase angle $(r_{imk}(\omega))$ of data $r_{imk}(\omega)$ obtained by taking the ratio between an element in the i-th row and an element in the m-th row of the k-th column of cross-covariance matrices and further normalizing their magnitude to 1, and acquisition of the slope $[K_{imk}]$ of a straight line obtained by a straight-line approximation process and a sound source direction computing process for each microphone pair;

FIGS. 11A to 11D are diagrams illustrating a straight-line fitting process using the plotted data of real and imaginary parts of $r_{imk}(\omega)$;

DESCRIPTION OF THE PREFERRED EMBODIMENTS

Figure 3A:
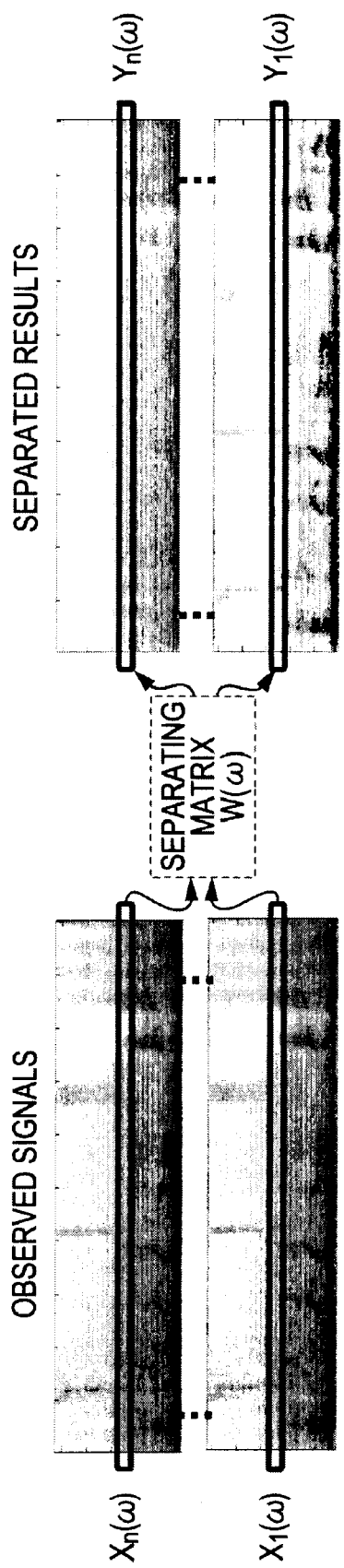
FIGS. 3A and 3B are diagrams respectively illustrating separation in a frequency bin, and separation in all frequency bins.
Figure 3B:
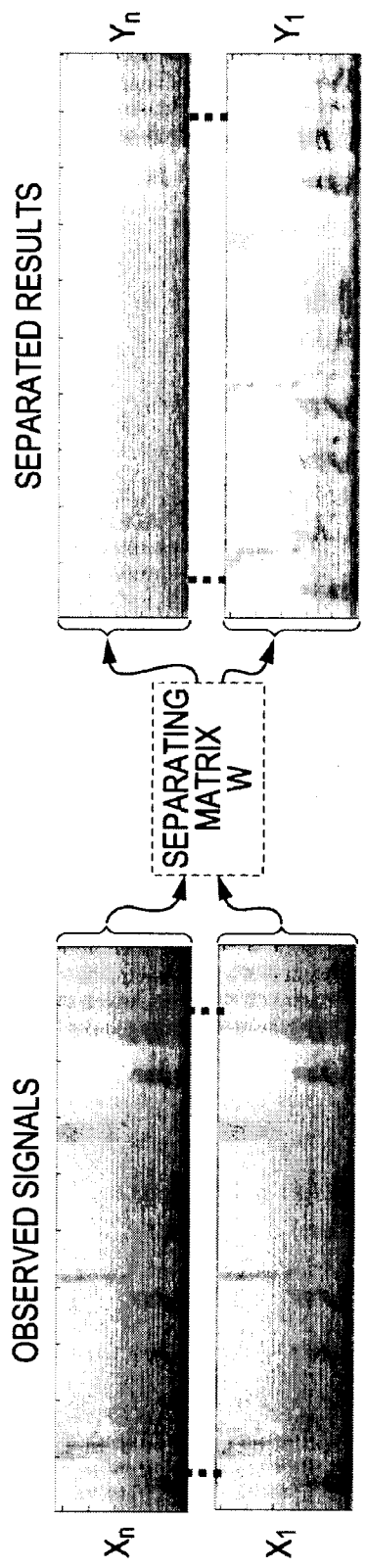
Figure 4A:
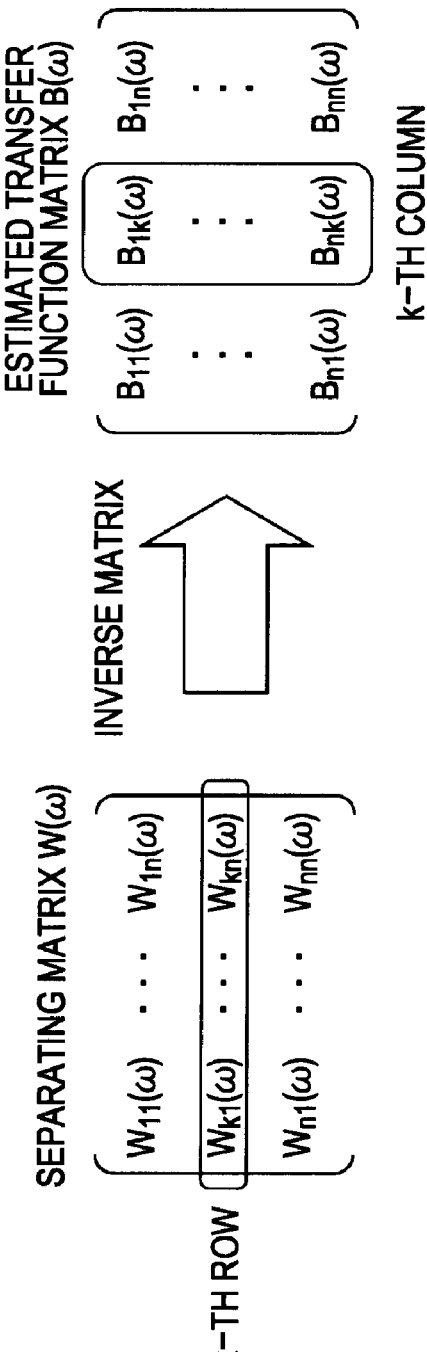
FIGS. 4A and 4B are diagrams illustrating an estimated transfer function matrix as the inverse matrix of a separating matrix $W(\omega)$.
Figure 4B:
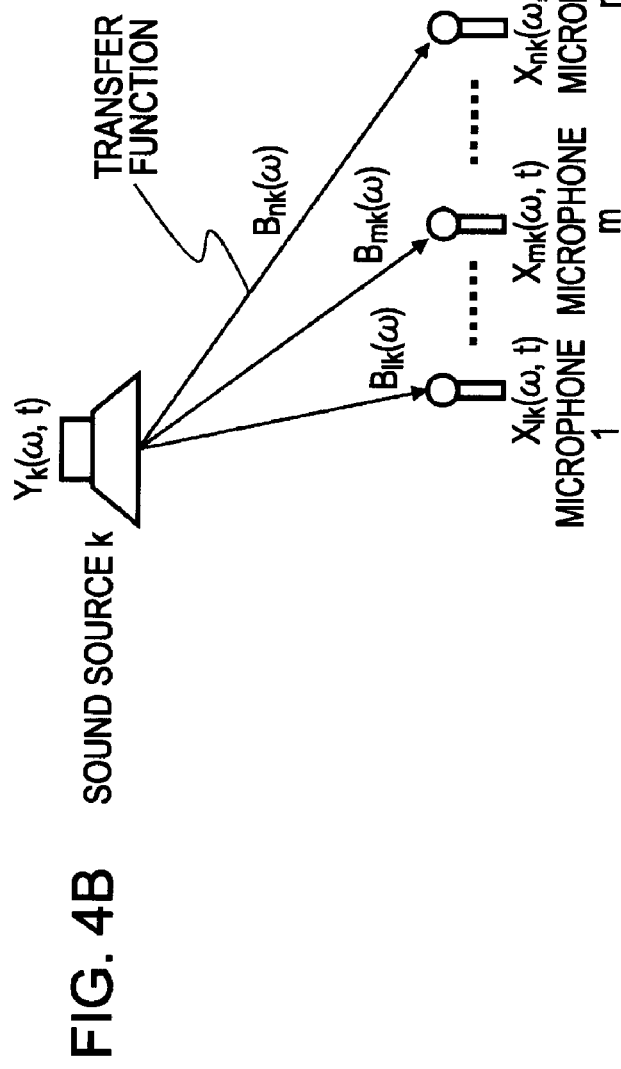

Hereinbelow, a signal processing apparatus, a signal processing method, and a program according to an embodiment of the present invention will be described in detail with reference to the drawings.

According to an embodiment of the present invention, signals in which a plurality of signals are mixed are separated by using Independent Component Analysis (ICA) to estimate the sound source direction.

As described above, although several sound source direction estimation schemes have existed in the related art, no system exists which combines all of the following advantages, namely, the advantage of the "Sound Source Estimation Using Phase Difference between Microphones": "Both tracking lag and delay are small", and the advantages of the "Sound Source Estimation using ICA": "Allows blind separation"; "Adapted to multiple sound sources"; and "Easy to establish correspondence between the separated results and the sound source direction". In addition, there is also a problem in that no system exists in which, in the "Sound Source Estimation using ICA", under the assumption that there is no permutation between frequency bins in the separated results, the relationship between the frequency bins is exploited to improve the accuracy of direction estimation.

To overcome the above-mentioned problems, according to an embodiment of the present invention, the following two novel features are introduced.

1. Cross-Covariance Matrices

In a segment containing the current time, cross-covariance matrices are calculated between observed signals and the separated results, and the sound source direction is calculated by using the cross-covariance matrices instead of a separating matrix.

2. Straight-Line Fitting

When calculating the sound source direction, a plot of phase difference in all frequencies is approximated by a straight line, and the sound source direction is calculated from the slope of the straight line.

First, a description will be given of the following points.

1. Cross-Covariance Matrices
2. Straight-Line Fitting

[1. Cross-Covariance Matrices]

Cross-covariance in a segment containing the current time will be described with reference to FIG. 9. FIG. 9 is a diagram in which novel features according to an embodiment of the present invention are added to FIG. 6 described above.

A segment containing the current time is set in both (a) observed signals and (b) separated results. For example, let the current frame index be [t], the start time of the segment be the [t−L+1]-th frame, and the end time be the [t]-th frame. Data of the segment containing the current time includes observed signal data 92 on the observed signal side, and separated result data 94 on the separated result side.

Between the observed signals and the separated results in this segment, cross-covariance matrices $\Sigma_{XY}(\omega)$ represented by Equation [6.1] below are calculated for each frequency bin.

$$\Sigma_{XY}(\omega) = E_t[\{X(\omega, t) - \mu_X(\omega)\}\{Y(\omega, t) - \mu_Y(\omega)\}^H] \quad [6.1]$$

$$= \frac{1}{L-1}\sum_{t=0}^{L-1}\{X(\omega, t) - \mu_X(\omega)\}\{Y(\omega, t) - \mu_Y(\omega)\}^H \quad [6.2]$$

$$\mu_X(\omega) = \frac{1}{L}\sum_{t=0}^{L-1}X(\omega, t) \quad [6.3]$$

$$\mu_Y(\omega) = \frac{1}{L}\sum_{t=0}^{L-1}Y(\omega, t) \quad [6.4]$$

$$\Sigma_{XY}(\omega) \cong \Sigma_{XX}(\omega)W(\omega)^H \quad [6.5]$$

$$\Sigma_{XX}(\omega) = E_t[X(\omega, t)X(\omega, t)^H] \quad [6.6]$$

$$\Sigma_{XX}(\omega) = \begin{bmatrix} E_t[X_1(\omega, t)\overline{X_1(\omega, t)}] & \cdots & E_t[X_1(\omega, t)\overline{X_n(\omega, t)}] \\ \vdots & \ddots & \vdots \\ E_t[X_n(\omega, t)\overline{X_1(\omega, t)}] & \cdots & E_t[X_n(\omega, t)\overline{X_n(\omega, t)}] \end{bmatrix} \quad [6.7]$$

$$\Sigma_{XX}(\omega)W(\omega)^H = W(\omega)^{-1}\Sigma_{YY}(\omega) \quad [6.8]$$

$$\Sigma_{YY}(\omega) = E_t[Y(\omega, t)Y(\omega, t)^H] \quad [6.9]$$

-continued $$\Sigma_{XY}(\omega) \leftarrow \Sigma_{XY}(\omega) - \frac{1}{L-1}X(\omega, t-L)Y(\omega, t-L)^H + \frac{1}{L-1}X(\omega, t)Y(\omega, t)^H \quad [6.10]$$

$$\Sigma_{XX}(\omega) \leftarrow \Sigma_{XX}(\omega) - \frac{1}{L-1}X(\omega, t-L)X(\omega, t-L)^H + \frac{1}{L-1}X(\omega, t)X(\omega, t)^H \quad [6.11]$$

$$C_{XY}(\omega) = \begin{bmatrix} \sqrt{\sigma_{11}(\omega)} & & 0 \\ & \ddots & \\ 0 & & \sqrt{\sigma_{nn}(\omega)} \end{bmatrix}^{-1} \quad [6.12]$$

$$\begin{bmatrix} \sigma_{11}(\omega) & \cdots & \sigma_{1n}(\omega) \\ \vdots & \ddots & \vdots \\ \sigma_{n1}(\omega) & \cdots & \sigma_{nn}(\omega) \end{bmatrix} \begin{bmatrix} \sqrt{\sigma_{11}(\omega)} & & 0 \\ & \ddots & \\ 0 & & \sqrt{\sigma_{nn}(\omega)} \end{bmatrix}^{-1}$$

$$\Sigma'_{XY}(\omega) = \Sigma_{XY}(\omega)\begin{bmatrix} h_1 & & 0 \\ & \ddots & \\ 0 & & h_n \end{bmatrix} \quad [6.13]$$

In this equation, Et[ ] denotes the mean over the segment. Specifically, Et[ ] is calculated by Equation [6.2]. $\mu_X(\omega)$ and $\mu_Y(\omega)$ denote the means of $X(\omega, t)$ and $Y(\omega, t)$ over the segments, and are calculated by Equation [6.3] and Equation [6.4], respectively. The operation of subtracting $\mu_X(\omega)$ and $\mu_Y(\omega)$ can be omitted in cases where the mean of the signals can be expected to be close to 0.

In this way, a sound source direction estimating unit of the signal processing apparatus according to an embodiment of the present invention calculates cross-covariance matrices between observed signal spectrograms and separated signal spectrograms in corresponding time segments in the time-frequency domain.

Instead of directly calculating the cross-covariance matrices between observed signals and the separated results, it is also possible to calculate cross-covariance matrices from the covariance matrices of the observed signals themselves and the separating matrix. That is, substantially the same value can be calculated also by calculating the covariance matrices of the observed signals by Equation [6.6] (the mean $\mu_X(\omega)$ is subtracted from $X(\omega, t)$ as necessary), and then multiplying the covariance matrices from the right with the Hermitian transpose of the separating matrix $W(\omega)^H$. (When the separating matrix $W(\omega)$ is constant within the segment, both sides of Equation [6.5] become the same value.)

The sound source direction can be obtained by using the cross-covariance matrices $\Sigma_{XY}(\omega)$ calculated in this way in the same manner as the separating matrix $W(\omega)$. In addition, the sound source direction estimated from the cross-covariance matrices $\Sigma_{XY}(\omega)$ combines the characteristics of that obtained by the separating matrix and that obtained by the [A1. Sound Source Direction Estimation using Phase Difference between Microphones] described above. Hereinbelow, a description will be given in this regard.

By using Equation [3.5] for computing the separated results described above, that is, the inverse operation $$X(\omega,t)=W^{-1}(\omega)Y(\omega,t)$$

of $$Y(\omega,t)=W(\omega)X(\omega,t),$$

the right-hand side of Equation [6.5] can be transformed as Equation [6.8], that is, into a form in which the inverse matrix of the separating matrix is multiplied by the covariance matrices of the separated results themselves. Equation [6.8] represents a transformation for illustrative purpose, and it is not necessary to calculate the inverse matrix in the actual processing.

If separation has been performed completely, that is, if no mismatch occurs between the separating matrix and the observed signals, and further if the separating matrix has sufficiently converged, then individual elements of the separated results Y(ω,t) are statistically independent. Thus, the covariance matrices of the separated results become diagonal matrices of which only the diagonal elements have positive values (off-diagonal elements are 0). Since multiplication by diagonal matrices is irrelevant to the phase of complex number element ratio, Equation [6.8] when separation is complete is equivalent to the inverse matrix of the separating matrix with respect to the sound source direction.

Therefore, when elements within the cross-covariance matrices $\Sigma_{XY}(\omega)$ are represented as Equation [7.1] below, the sound source direction is estimated by Equation [7.2] (similarly to Equation [5.4]). That is, estimation of the sound source direction is possible even without using an inverse matrix.

$$\Sigma_{XY}(\omega) = \begin{bmatrix} \sigma_{11}(\omega) & \cdots & \sigma_{1n}(\omega) \\ \vdots & \ddots & \vdots \\ \sigma_{n1}(\omega) & \cdots & \sigma_{nn}(\omega) \end{bmatrix} \quad [7.1]$$

$$\theta_{imk}(\omega) = a\sin\left(\frac{(M-1)C}{\pi(\omega-1)d_{im}F} \text{ angle}(\sigma_{ik}(\omega)\overline{\sigma_{mk}(\omega)})\right) \quad [7.2]$$

On the other hand, even when separation is insufficient, if the number of simultaneously playing sound sources is one, the sound source direction can be estimated. According to Equation [6.5], the above-described cross-covariance matrices can be also considered as the products of the covariance matrices of observed signals and the Hermitian transpose of the separating matrix. Now, a case is considered in which the separating matrix is a unit matrix. This corresponds to a state with signals are least separated (observed signals are outputted as they are).

In this case, since the above-described cross-covariance matrices become equivalent to the covariance matrices of observed signals, the sound source direction computed from Equation [7.2] is the same in value as the sound source direction computed from each of Equation [1.6] and Equation [1.4] ("A1. Sound Source Direction Estimation using Phase Difference between Microphones"). That is, the covariance matrices $\Sigma_{XY}(\omega)$ of observed signals have n×n elements, and the respective elements can be represented as in Equation [6.7] (the mean is subtracted as necessary). While $\Sigma_{XY}(\omega)$ has n columns, substantially the same value as that obtained by using Equation [1.6] is computed no matter which column is used.

The above-mentioned two cases are now summarized. When separation is complete, the sound source direction computed from cross-covariance matrices takes the same value as the sound source direction computed from the inverse matrix of a separating matrix. In the other extreme case, when separation is not performed at all, the sound source direction computed from the cross-covariance matrices takes the same value as the sound source direction computed from the phase differences between microphones. That is, the sound source direction computed from the cross-covariance matrices combines the characteristics of both the cases.

The following shows a comparison table between a sound source direction estimation process in the case where ICA according to the related art is used, and a sound source direction estimation process based on the technique according to an embodiment of the present invention which uses cross-covariance matrices.

TABLE 1

| Using ICA according to Related Art | | |
|---|---|---|
| | Separation sufficient | Separation not sufficient |
| Multiple sound sources | ⊙ | X |
| Single sound source | ⊙ | X |

| Using Cross-covariance Matrices and ICA according to Embodiment of Present Invention | | |
|---|---|---|
| | Separation Sufficient | Separation not sufficient |
| Multiple sound sources | ⊙ | X |
| Single sound source | ⊙ | ○ |

As shown in the above table, in the sound source direction estimation process in the case where ICA according to the related art is used, when the separation process is not sufficient, the accuracy of sound source estimation decreases. However, in the sound source estimation process based on the technique according to an embodiment of the present invention which uses cross-covariance matrices, good estimation is achieved in the case of a single sound source.

When multiple sound sources are playing simultaneously, and separation is not sufficient, it is not possible to estimate an accurate sound source direction even by applying the technique using cross-covariance matrices according to an embodiment of the present invention. However, by employing "straight-line fitting" described later, the occurrence of a situation in which multiple sound sources exist and the separation process is insufficient can be detected with high accuracy, so the influence on processes subsequent to direction estimation can be minimized.

Further, as compared with the case where a separating matrix is used, the scheme using cross-covariance matrices has the following advantages:

Updates with high frequency (updates are possible on a frame-by-frame basis)
Low delay (within one frame)
Tracking lag is small (or can be detected)
Calculation of covariance matrices (or cross-covariance matrices) can be performed by calculating Equation [6.10] or Equation [6.11] for computing the cross-covariance matrices $\Sigma_{XY}(\omega)$ mentioned above every time the frame index t increases (as necessary, the mean is subtracted from X(ω, t) and Y(ω, t)). The complexity of this calculation is small in comparison to calculation of an inverse matrix. In addition, the complexity is constant even if the length L (see FIG. 9) of a segment set in the separated result spectrograms shown in FIG. 9 is increased. Therefore, in the method according to an embodiment of the present invention, the sound source direction can be computed with frame-by-frame frequency and with low delay.

In addition, the segment used for computation of the sound source direction (each of the segment 92 set in the observed signal spectrograms and the segment 94 set in the separated result spectrograms shown in FIG. 9) can be set separately from the segment used for learning of the separating matrix (for example, the learning data block segment 91). Therefore, an optimum length that provides both trackability and stability may be set.

While (cross) covariance matrices are calculated in the above description, instead of the covariance matrices themselves, matrices obtained by multiplying individual elements by an appropriate positive value may be used to calculate the sound source direction. (This is because multiplication by a positive real number does not affect the phase angle. The same applies when individual elements are multiplied by different values.)

For example, in Equations [6.2.], [6.10], and [6.11] mentioned above which are equations for computing the covariance matrices, even if the coefficient 1/(L−1) is omitted, the same value is computed as the sound source direction. In addition, even if correlation matrices (Equation [6.12], where $\sigma_{ik}(\omega)$ denotes individual elements of the covariance matrices and represented by Equation [7.1]) are used instead of the covariance matrices, the same sound source direction is computed.

Further, even if the multiplier is a negative value or a complex number, as long as elements within each column of the covariance matrices are multiplied by the same value, the same value is computed as the sound source direction (as cancellation occurs when calculating the ratio between elements). For example, the same sound source direction is computed even if $\Sigma'_{XY}(\omega)$ represented by Equation [6.13] are used instead of the cross-covariance matrices $\Sigma_{XY}(\omega)$. (It should be noted that the second term on the right-hand side of Equation [6.13] is a matrix whose off-diagonal elements are 0, and its diagonal elements $h_1 \ldots, h_n$ represent arbitrary complex numbers.)

Due to this property, with respect to the separated results $Y(\omega, t)$ and the separating matrix $W(\omega)$ used for the calculation of cross-covariance matrices, the same sound source direction is computed even when those prior to resealing are used, instead of those obtained after resealing. (Rescaling refers to a process of adjusting the scale for each frequency bin of the separated results, details of which will be given later.)

2. Straight-Line Fitting

By using Equation [7.2] mentioned above, sound source directions can be estimated for individual frequency bins and individual microphone pairs, and those sound source directions are averaged to find the sound source direction. However, the method of averaging the values computed in individual frequency bins has the following problems.

(Problem 1) If a given source signal does not contain components of a frequency bin ω (for example, if the source signal is band-limited), the sound source direction in the frequency bin ω becomes an inaccurate value, which will exert an adverse influence when taking a mean.

(Problem 2) If the wavelength corresponding to the frequency bin ω becomes shorter than twice the inter-microphone distance (that is, if ω satisfies ω≧1+C/(2dF)), the sound source direction is not uniquely determined. Specifically, since θ that satisfies Equation [1.3] mentioned above exists other than that corresponding to the true direction, it becomes difficult for the function a sin to determine what value to return. (This is called spatial aliasing.) Thus, it is difficult to reflect high frequency components on the sound source direction.

(Problem 3) Since the relationship between frequency bins or the like is not taken into account, even if an ICA scheme that is relatively permutation-free is employed, this does not improve the accuracy of direction estimation.

To overcome these problems, according to an embodiment of the present invention, a technique called "straight-line fitting" is employed. This is a scheme in which a plot of phase difference against frequency bin index ω is approximated by a straight line, and the sound source direction is estimated from the slope of the straight line. Hereinbelow, a description will be given of the principle and method involved.

With regard to the right-hand side of Equation [7.1] mentioned above which represents cross-covariance matrices, attention is first focused on the k-th column of the cross-covariance matrices. Then, a value obtained by taking the ratio between elements in the i-th and m-th rows, followed by normalizing the magnitude a complex number to 1, is defined as $r_{imk}(\omega)$. $r_{imk}(\omega)$ is represented by Equation [8.1] below.

$$r_{imk}(\omega) = \frac{\text{sign}(\sigma_{ik}(\omega))}{\text{sign}(\sigma_{mk}(\omega))} = \text{sign}(\sigma_{ik}(\omega)\overline{\sigma_{mk}(\omega)}) \quad [8.1]$$

$$\text{sign}(z) = \frac{z}{|z|} \quad [8.2]$$

$$r_{imk}(\omega) \approx \exp\left(j\pi\frac{\omega-1}{M-1}\frac{F}{C}d_{im}\sin\hat{\theta}_{imk}\right) = \exp(j\hat{K}_{imk}(\omega-1)) \quad [8.3]$$

$$\hat{K}_{imk} = \pi\frac{1}{M-1}\frac{F}{C}d_{im}\sin\hat{\theta}_{imk} \quad [8.4]$$

$$err_{imk} = \frac{1}{M}\sum_{\omega=1}^{M}\left|r_{imk}(\omega) - \exp(j\hat{K}_{imk}(\omega-1))\right|^2 \quad [8.5]$$

$$\hat{K}_{imk} = \underset{\hat{K}_{imk}}{\text{argmin}}\left[\sum_{\omega=1}^{M}\left|r_{imk}(\omega) - \exp(j\hat{K}_{imk}(\omega-1))\right|^2\right] \quad [8.6]$$

$$\hat{\theta}_{imk} = a\sin\left(\hat{K}_{imk}\frac{(M-1)C}{\pi F d_{im}}\right) \quad [8.7]$$

$$a\sin(x) = \begin{cases} a\sin(x) & (-1 \le x \le 1) \\ -\pi + a\sin(x+2) & (x < -1) \\ \pi + a\sin(x-2) & (1 < x) \end{cases} \quad [8.8]$$

$$\alpha_{imk}(\omega) = \text{angle}(r_{imk}(\omega)) \quad [8.9]$$

It should be noted that sign(z) represents an operation of normalizing the magnitude of a complex number z to 1, and is defined by Equation [8.2]. In addition, with respect to sign( ), since a/b and a×conj(b) are of equal value (see Equation [8.1]), the expression "element ratio between a and b" as used in the following description is taken to represent both. (As for the order between the multiplication/division of a complex number and sign( ), the same value is computed no matter which is performed first. For example, in the expression in the middle of Equation [8.1], the same value is obtained when the ratio is calculated after taking the sign with respect to the numerator and the denominator, or when the sign is calculated after taking the ratio.)

From an examination of Equations [1.1] to [1.7] and Equations [6.1] to [6.13] described above, $[r_{imk}(\omega)]$ can be approximated by Equation [8.3] above. That is, the phase angle of $r_{imk}(\omega)$ has proportionality with [ω−1], and the relationship of Equation [8.4] holds between its proportionality constant $K_{imk}$ and the sound source direction. In other words, if the plotted phase angle ($r_{imk}(\omega)$) of $r_{imk}(\omega)$ is approximated by a straight line, the slope of the straight line is $K_{imk}$, and if $K_{imk}$ is found, then the sound source direction for each microphone pair is also found.

FIGS. 10A and 10B show a specific example. FIGS. 10A and 10B are diagrams illustrating the plotted data of phase angle ($r_{imk}(\omega)$) of data $r_{imk}(\omega)$ obtained by taking the ratio between an element in the i-th row and an element in the m-th row of the k-th column of cross-covariance matrices and further normalizing its magnitude to 1, and acquisition of the slope $[K_{imk}]$ of a straight line obtained by a straight-line approximation process and a sound source direction computing process for each microphone pair.

FIG. 10A shows a plot of phase angle with respect to $r_{imk}(\omega)$ calculated from real data, in which the vertical axis indicates the frequency bin ω, and the horizontal axis indicates the phase angle. It can be seen that points are aligned in a substantially straight line. However, since the value of phase angle angle( ) can be identified only within a range of 2π (in this drawing, –π to π), "jumps" of values exist between –π and π.

As opposed to FIG. 10A, FIG. 10B shows the result of straight-line fitting performed by taking the "jumps" into account. At the time of straight-line fitting, to minimize "jumps", an unwrap operation of adding 2Nπ (N is an appropriate integer) to the values of phase angle was executed for each frequency bin. This process was executed respect to an unwrap processing region 103 shown in FIG. 10B. This operation is referred to as "unwrap". After this unwrap, the best fitting straight line through the points, that is, a fitting straight line 104 shown in FIG. 10B is found. The specific algorithm for this process will be described later.

The proportionality coefficient $K_{imk}$ can be estimated also by using the complex number $r_{imk}(\omega)$ directly, instead of using the phase angle of $r_{imk}(\omega)$. This method will be described with reference to FIGS. 11A to 11D. In the following description, this method will be also referred to as "straight-line fitting".

FIGS. 11A and 11B show plotted data of real and imaginary parts of $r_{imk}(\omega)$, respectively. It can be seen that curves close to cosine and sine are drawn respectively. The approximation of these plots by $\exp(jK_{iml}(\omega-1))$ in Equation [8.3] mentioned above yields a proportionality constant for finding $K_{imk}$ corresponding to the best-fitting curves for both the real and imaginary parts (a curve 105 shown in FIG. 11C and a curve 106 shown in FIG. 11D). For example, an error between $r_{imk}(\omega)$ and $\exp(jK_{iml}(\omega-1))$ is defined by Equation [8.5], and the value of $K_{imk}$ that minimizes this error may be found. (See Equation [8.6]. arg min indicates an operation of finding the value of $K_{imk}$ that makes the value inside brackets minimum.)

By performing straight-line fitting mentioned above, the above-described three problems can be avoided as follows.

(Problem 1) If a given source signal does not contain components of a frequency bin ω (for example, if the source signal is band-limited), the sound source direction in the frequency bin ω becomes an inaccurate value, which will exert an adverse influence when taking a mean.

With regard to this problem, even if the phase angle of $r_{imk}(\omega)$ deviates from a straight line in several frequency bins, if the phase angle is located substantially on a straight line in most of frequency bins, then the slope $K_{imk}$ is estimated substantially correctly.

(Problem 2) If the wavelength corresponding to the frequency bin ω becomes shorter than twice the inter-microphone distance (that is, if ω satisfies $\omega \geq 1+C/(2dF)$), the sound source direction is not uniquely determined. Specifically, since θ that satisfies Equation [1.3] mentioned above exists other than that corresponding to the true direction, it becomes difficult for the function a sin to determine what value to return. (This is called spatial aliasing.) Thus, it is difficult to reflect higher frequency components on the sound source direction.

With regard to this problem, by performing unwrap at the time of straight-line fitting, spatial aliasing is eliminated. Thus, bins corresponding to higher frequencies can be also reflected on the sound source direction.

(Problem 3) Since the relationship between frequency bins or the like is not taken into account, even if an ICA scheme that is relatively permutation-free is employed, this does not improve the accuracy of direction estimation.

With regard to this problem, since the relationship that "unless permutation has occurred in the separated results, the phase angle and the frequency bin are proportional to each other" is exploited, an improvement in estimation accuracy can be expected in comparison to schemes that find the direction on a per-frequency bin basis. In other words, in schemes prior to Japanese Unexamined Patent Application Publication No. 2006-238409, since permutation occurs between frequency bins in the separated results, the plot in FIG. 10A does not become linear, and hence it is not possible to employ "straight-line fitting".

As described above, by performing straight-line fitting, the above three problems can be avoided.

Figure 8:
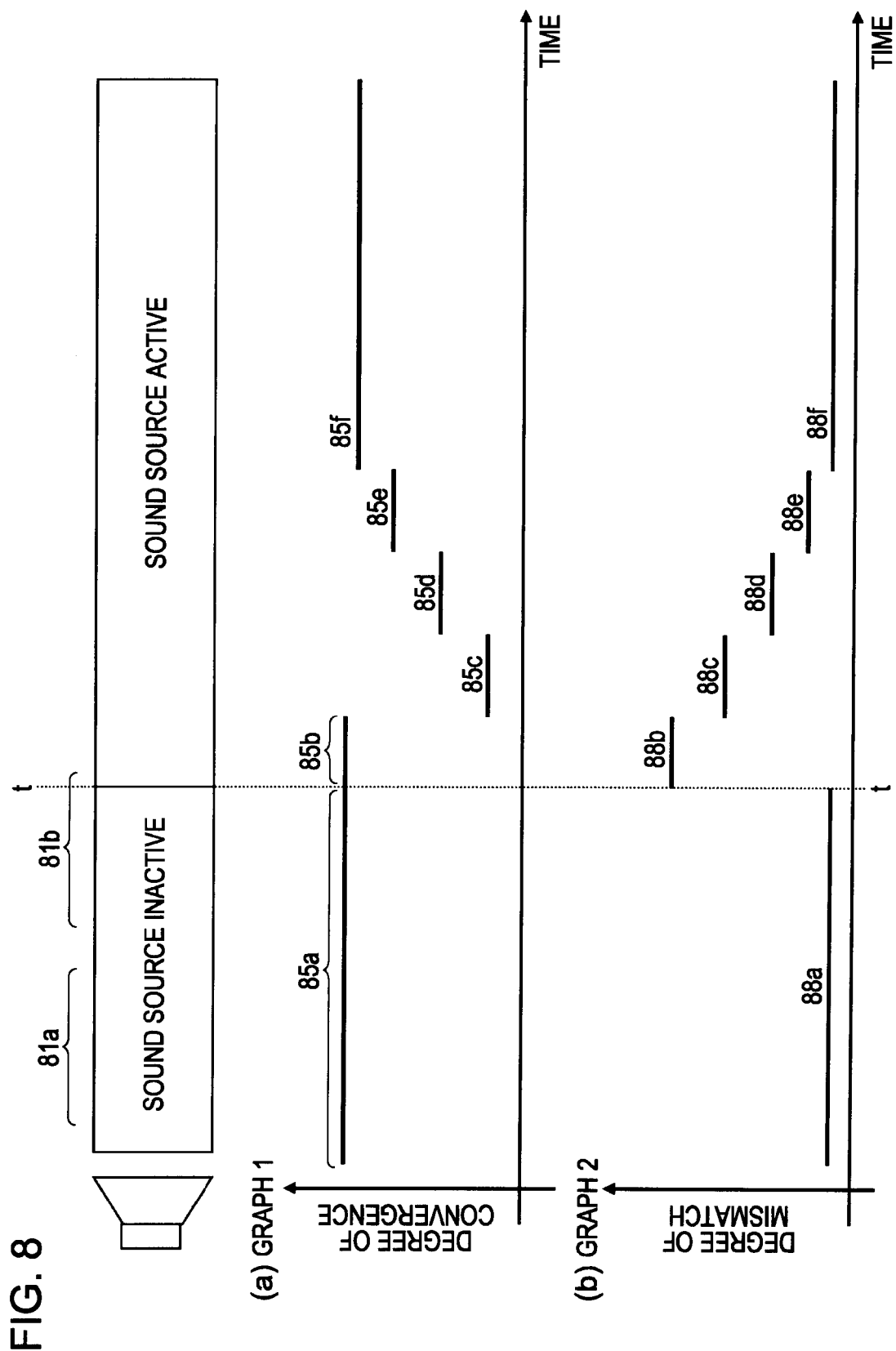
FIG. 8 is a diagram illustrating a tracking lag that occurs in parallel processing performed in units of threads.

In addition, by using a fitting error (Equation [8.5]), to what extent an estimated sound source direction is accurate can be determined. For example, in a case where the above-described tracking lag (the data 88b to 88e described above with reference to FIG. 8), and there are a plurality of simultaneously playing sound sources at that time, plotted phase angles do no align on a straight line. When straight-line fitting is forcibly performed at this time, the resulting fitting error becomes large. Accordingly, if Equation [8.5] results in a value larger than a given value (for example, 1), it is possible to regard the estimation as having failed, and discard the estimated sound source direction.

Embodiments

Next, a description will be given of specific configuration and processing examples of a signal processing apparatus according to an embodiment of the present invention which executes a sound source direction estimation process that employs the 1. Cross-covariance Matrices and 2. Straight-line Fitting described above.

(Configuration of Apparatus)

Figure 12:
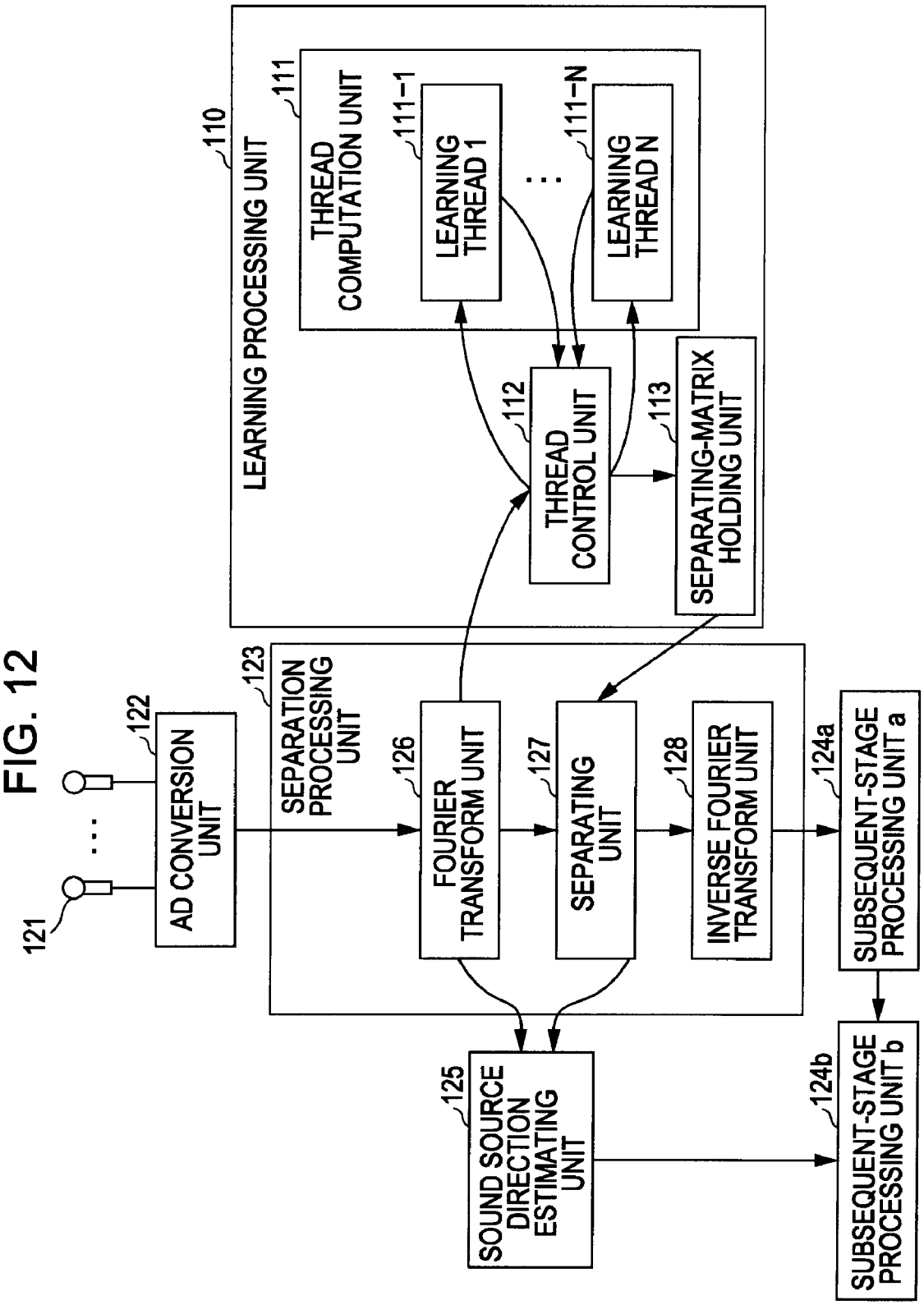
FIG. 12 is a diagram showing a configuration example of a signal processing apparatus according to an embodiment of the present invention.

The configuration of a signal processing apparatus according to an embodiment of the present invention is shown in FIG. 12. The apparatus configuration shown in FIG. 12 is based on Japanese Patent Application No. 2006-331823 "REAL-TIME SOUND SOURCE SEPARATION APPARATUS AND METHOD" previously filed by the present applicant. A sound source direction estimating unit 125 is added to the configuration disclosed in Japanese Patent Application No. 2006-331823. The signal processing apparatus shown in FIG. 12 can be specifically implemented by, for example, a PC. That is, respective processes in a separation processing unit 123, a learning processing unit 110, the sound source direction estimating unit, and a subsequent-stage processing unit 124 can be executed by, for example, a CPU that executes processes according to a pre-defined program.

The separation processing unit 123 shown at the center of FIG. 12 mainly performs separation of observed signals. The learning processing unit 110 shown on the right-hand side of FIG. 12 performs learning of a separating matrix. The process in the separation processing unit 123, and the process in the learning processing unit 110 are performed in parallel. The process in the separation processing unit 123 is a foreground process, and the process in the learning processing unit 110 is a background process.

From the perspective of the system as a whole, the separation processing unit 123 performs an operation of applying a separating matrix to audio signals inputted from an AD conversion unit 122 to generate the separated results, and also replacing the separating matrix with the latest one in accordance with the progress of processing in the learning processing unit 110.

In the sound source direction estimating unit 125, observed signals and separated results (or the relationship of Equation [6.5]) are inputted from the separation processing unit 123, and the sound source direction is computed from the observed signals and the separating matrix.

Hereinbelow, processing in individual components will be described.

Sounds recorded by a plurality of microphones 121 are converted into digital data in the AD conversion unit 122, and then sent to a Fourier transform unit 126 of the separation processing unit 123. In the Fourier transform unit 126, the digital data is transformed into frequency-domain data by a windowed short-time Fourier transform (details of which will be given later). At this time, a predetermined number of pieces of data called frames are generated. Subsequent processes are performed in these frame units. The Fourier transformed data is sent to each of the sound source direction estimating unit 125, a separating unit 127, and a thread control unit 112 of the learning processing unit 110.

In the separating unit 127, X(t) representing one frame of the Fourier transformed results of observed signals inputted from the Fourier transform unit 126, and a separating matrix W obtained before that timing are inputted from a separating-matrix holding unit 113 of the learning processing unit 110, and these inputs are multiplied together to generate Y(t) as the separated results given as $$Y(t)=WX(t),$$

where t denotes the frame index.

The separated results Y(t) are sent to an inverse Fourier transform unit 128 and the sound source direction estimating unit 125. A separating matrix may be sent to the sound source direction estimating unit 125 instead of the separated results. The separated results [Y(t)] sent to the inverse Fourier transform unit 128 are transformed into time domain signals, and sent to the subsequent-stage processing unit a 124a that executes processing at subsequent stages. Examples of processing at subsequent stages include sound recognition and speaker recognition. Depending on the subsequent-stage processing, frequency-domain data can be used as it is, in which case an inverse Fourier transform can be omitted.

On the other hand, observed signals sent to the thread control unit 112 of the learning processing unit 110 (the Fourier transformed results of observed signals inputted from the Fourier transform unit 126) are sent to a thread computation unit 111 that performs computations using a plurality of learning threads 111-1 to 111-N. After charging a predetermined amount of observed signals given to individual learning threads, the thread computation unit 111 finds a separating matrix from the observed signals by using ICA batch processing. The separating matrix thus found is sent to the separating unit 127 of the separation processing unit 123 via the thread control unit 112.

Further, observed signals sent to the sound source direction estimating unit 125 (the Fourier transformed results of observed signals inputted from the Fourier transform unit 126) are used for calculation of cross-covariance matrices together with the separated results generated in the separating unit 127 (or together with a separating matrix). Therefore, the sound source direction is calculated. (Details will be given later.)

The sound source direction thus found is sent to a subsequent-stage processing unit b 124b that executes processing at subsequent stages. Examples of processing at subsequent stages executed by the subsequent-stage processing unit b 124b include a process called diarization. That is, when combined with the results of sound recognition, speaker recognition, and the like, a set of information indicating "who made what speech at what time and from what direction (at what position)" can be generated.

Figure 13:
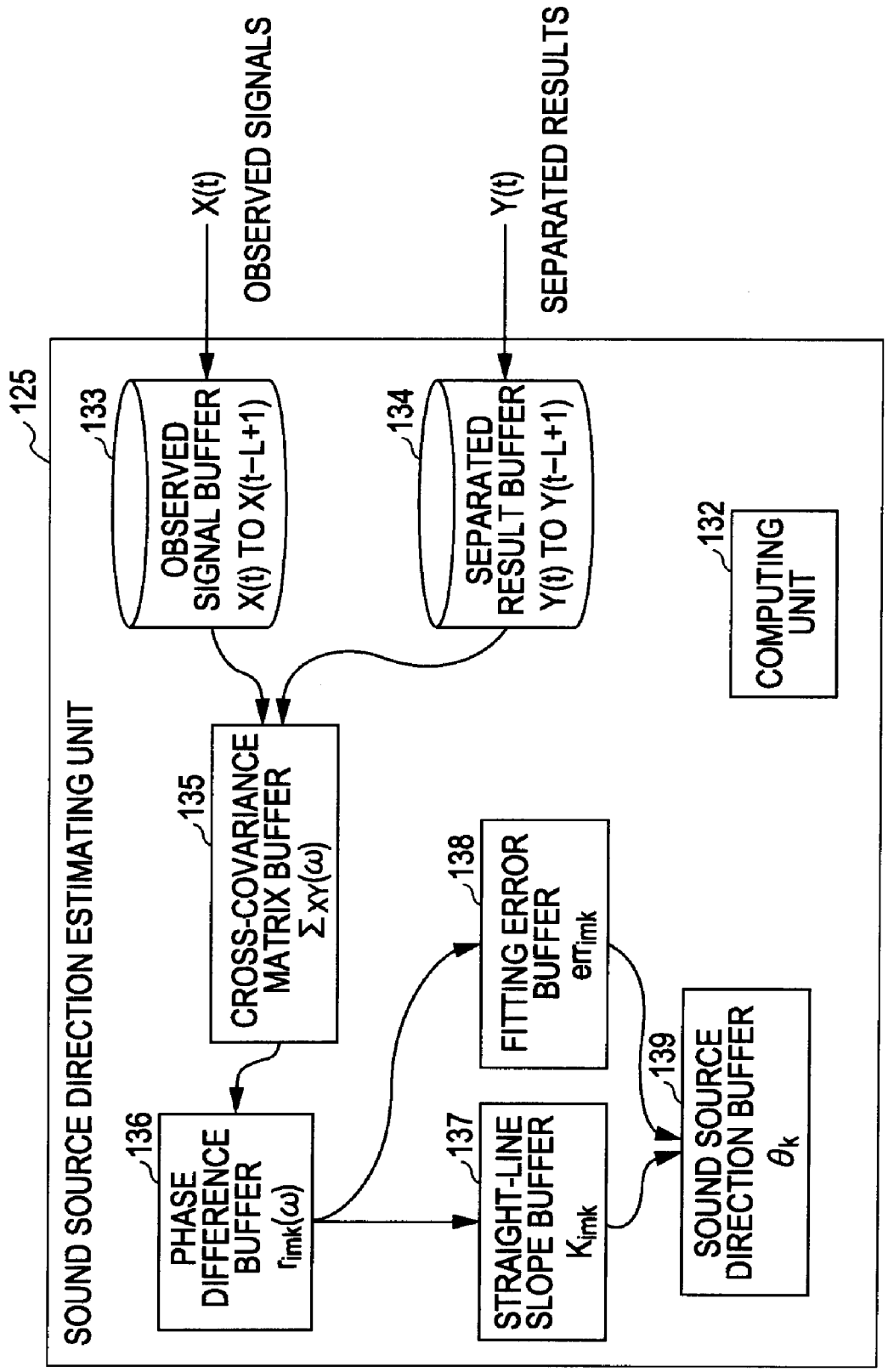
FIG. 13 is a diagram showing a configuration example of a sound source direction estimating unit that executes a sound source direction estimating process by calculating cross-covariance matrices from observed signals and the separated results.
Figure 14:
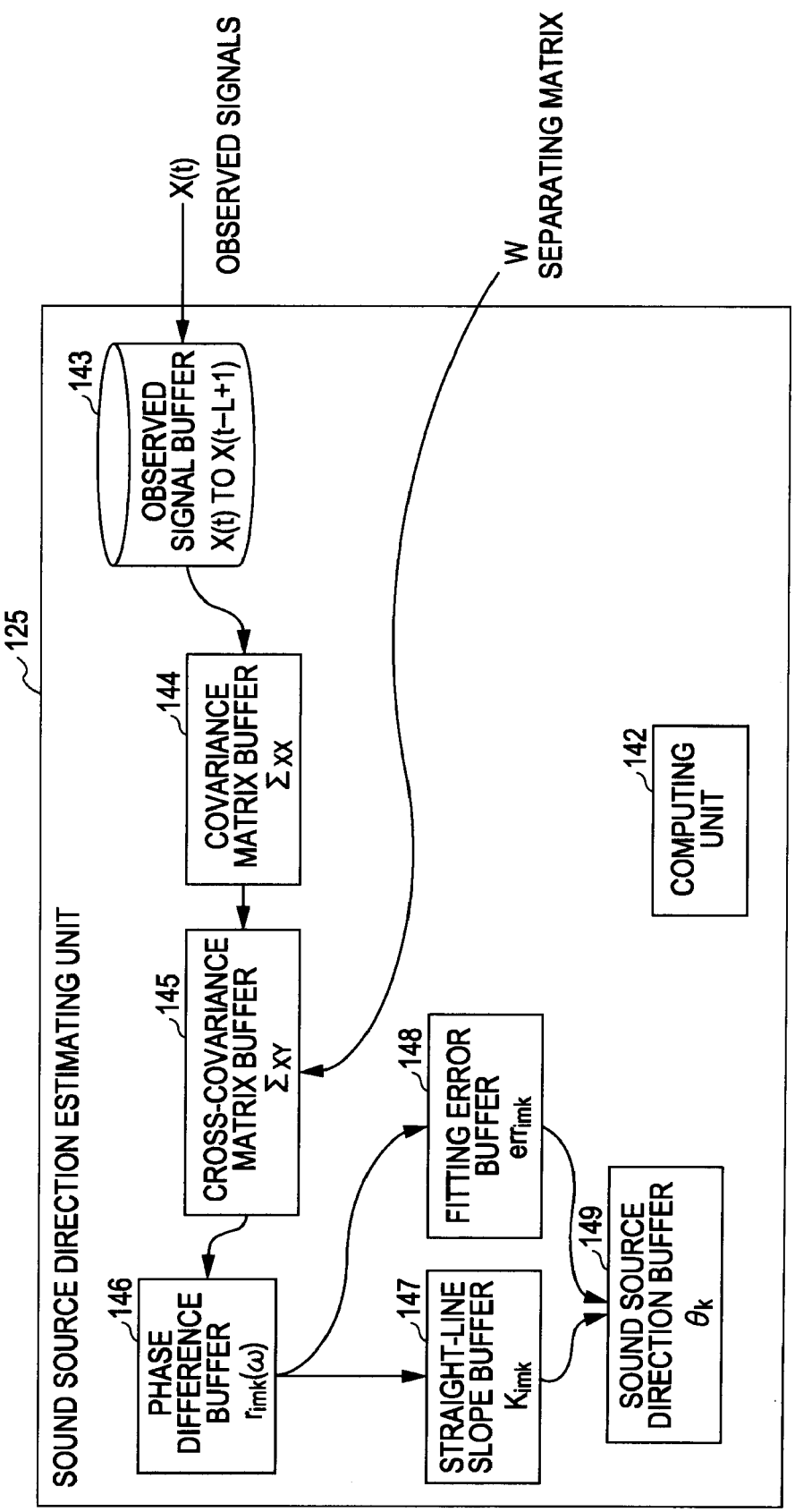
FIG. 14 is a diagram showing a configuration example of a sound source direction estimating unit that executes a sound source direction estimating process from observed signals and a separating matrix.

Next, the sound source direction estimating unit 125 will be described in detail with reference to FIGS. 13 and 14. FIG. 13 is a configuration diagram for a case in which cross-covariance matrices are calculated from observed signals and the separated results (Equation [6.1]), and FIG. 14 is a configuration diagram for a case in which cross-covariance matrices are calculated from observed signals and a separating matrix (Equation [6.5]).

First, referring to FIG. 13, a description will be given of a configuration example of the sound source direction estimating unit 125 that executes a sound source direction estimating process by calculating cross-covariance matrices from observed signals and the separated results.

Inputs to the sound source direction estimating unit 125 shown in FIG. 13 are:
one frame of observed signals x(t) supplied from the Fourier transform unit 126 configured as shown in FIG. 12; and
one frame of separated results Y(t) supplied from the separating unit 127 configured as shown in FIG. 12.

The one frame of observed signals X(t) supplied from the Fourier transform unit 126 is stored into an observed signal buffer 133. This corresponds to the observed signal data segment 92 that is a segment containing the current time on the observed signal side shown in FIG. 9. The observed signal buffer 133 is a ring buffer with a length L, and inputs from the (L+1)-th input onwards are written over the oldest signal within the buffer. For example, although inputs from X(0) up to X(L−1) are stored into the observed signal buffer 133 as they are, at the time of storing X(L), X(L) is written over the area of X(0). Of course, as necessary, all of the past observed signals may be saved.

The one frame of separated results Y(t) supplied from the separating unit 127 is stored into a separated result buffer 134. This corresponds to the separated result data segment 94 that is a segment containing the current time on the separated result side shown in FIG. 9. Like the observed signal buffer 133, the separated result buffer 134 is a ring buffer with the length L.

A computing unit 132 calculates cross-covariance matrices for each frequency bin from L frames of observed signals and separated results, and stores the results into a cross-covariance matrix buffer 135. As described above with reference to FIG. 9, the computing unit 132 calculates cross-covariance matrices between corresponding time segments of observed signal spectrograms and separated result spectrograms in the time-frequency domain, and stores the results into the cross-covariance matrix buffer 135. Further, from the cross-covariance matrices, the computing unit 132 calculates element ratios and phase differences for individual channels and microphone pairs (such as $r_{imk}(\omega)$ in Equation [8.1] and $\alpha_{imk}(\omega)$ in Equation [8.9]), and stores the calculated results into a phase difference buffer 136.

Next, the computing unit 132 finds a proportionality constant (slope of a straight line) $K_{imk}$ that best fits the phase differences stored in the phase difference buffer 136, stores the results into a straight-line slope buffer 137, and also stores a fitting error $err_{imk}$ into a fitting error buffer 138.

Lastly, the computing unit 132 calculates a sound source direction [θ$_k$] from the proportionality constant (slope of a straight line) stored in the straight-line slope buffer 137 and the fitting error err$_{imk}$, and stores the sound source direction [θ$_k$] as the calculated results into a sound source direction buffer 139.

It is also possible, as necessary, to calculate a three-dimensional (or, depending on the intended application, two-dimensional) vector indicating a direction, or three-dimensional (or, depending on the intended application, two-dimensional) coordinates indicating the position of each sound source, instead of the angle of the sound source direction.

Respective computations in the sound source direction estimating unit 125 are performed in the computing unit 132. Although omitted in this drawing, the computing unit 132 are connected to the individual buffers in this drawing so as to allow data exchange.

Next, referring to FIG. 14, a description will be given of a configuration example of the sound source direction estimating unit 125 that executes a sound source direction estimating process from observed signals and a separating matrix.

Inputs to the sound source direction estimating unit 125 shown in FIG. 14 are:

one frame of observed signals X(t) supplied from the Fourier transform unit 126 configured as shown in FIG. 12; and a separating matrix W that is being used in the separating unit 127 shown in FIG. 12 at the same time.

The one frame of observed signals X(t) supplied from the Fourier transform unit 126 is stored into an observed signal buffer 143. This corresponds to the observed signal data segment 92 that is a segment containing the current time on the observed signal side shown in FIG. 9. The observed signal buffer 143 is a ring buffer with a length L.

According to this configuration, from data stored in the observed signal buffer 143, the computing unit 142 calculates not cross-covariance matrices but covariance matrices of observed signals themselves, and stores the results into a covariance matrix buffer 144.

The computing unit 142 receives an input of the separating matrix W that is being used in the separating unit 127 shown in FIG. 12 at the same time, calculates cross-covariance matrices [Σ$_{XY}$] on the basis of Equation [6.5] described above, from the Hermitian transpose of this separating matrix and the covariance matrices stored in the covariance matrix buffer 144, and stores the calculated cross-covariance matrices into a cross-covariance matrix buffer 145.

The subsequent processes are the same as the processes described above with reference to FIG. 13. That is, from the cross-covariance matrices, the computing unit 142 calculates element ratios and phase differences for individual channels and microphone pairs (such as r$_{imk}$(ω) in Equation [8.1] and α$_{imk}$(ω) in Equation [8.9]), and stores the calculated results into a phase difference buffer 146. Next, the computing unit 142 finds a proportionality constant (slope of a straight line) K$_{imk}$ that best fits the phase differences stored in the phase difference buffer 146, stores the results into a straight-line slope buffer 147, and also stores a fitting error err$_{imk}$ into a fitting error buffer 148.

Lastly, the computing unit 142 calculates a sound source direction [θ$_k$] from the proportionality constant (slope of a straight line) stored in the straight-line slope buffer 147 and the fitting error err$_{imk}$, and stores the sound source direction [θ$_k$] as the calculated results into a sound source direction buffer 149.

The configuration shown in FIG. 14 proves advantages in terms of saving of buffer memory in comparison to the configuration shown in FIG. 13, since it is unnecessary to store L frames of signals with respect to the separated results.

Next, referring to FIG. 15, a description will be given of the detailed configuration of the thread control unit 112 of the learning processing unit 110 in the apparatus configuration shown in FIG. 12.

A current-frame-index holding counter 151 is incremented by 1 every time one frame of observed signals is supplied, and is returned to the initial value upon reaching a predetermined value. The incrementing of the counter may be synchronized with the sample index of time domain signal, instead of being synchronized with the frame index.

A learning-initial-value holding unit 152 holds the initial value of separating matrix W when executing a learning process in each thread. Although the initial value of separating matrix W is basically the same as that of the latest separating matrix, a different value may be used as well. For example, a separating matrix to which resealing (a process of adjusting power between frequency bins, details of which will be given later) has not been applied is used as the learning initial value, and a separating matrix to which resealing has been applied is used as the latest separating matrix.

A planned-charging-start-timing-specifying-information holding unit 153 holds information used for keeping the timing of starting charging at a constant interval between a plurality of threads. The planned charging start timing may be expressed using relative time, or may be managed by the frame index or by the sample index of time domain signal instead of relative time. The same applies to information for managing other kinds of "timing".

An observed-signal-charging-timing-information holding unit 154 holds information indicating on the basis of observed signals acquired at what timing the separating matrix X being currently used in the separating unit 127 is learned, that is, the relative time or frame index of observed signals corresponding to the latest separating matrix. Although both the charging start and charging end timings of corresponding observed signals may be stored in the observed-signal-charging-timing-information holding unit 154, if the block length, that is, if the charging time of the observed signals is constant, it suffices to save only one of these timings.

The thread control unit 112 has a pointer holding unit 155 that holds pointers linked to individual threads, and controls the plurality of threads 111-1 to 111-N by using the pointer holding unit 115.

Figure 16:
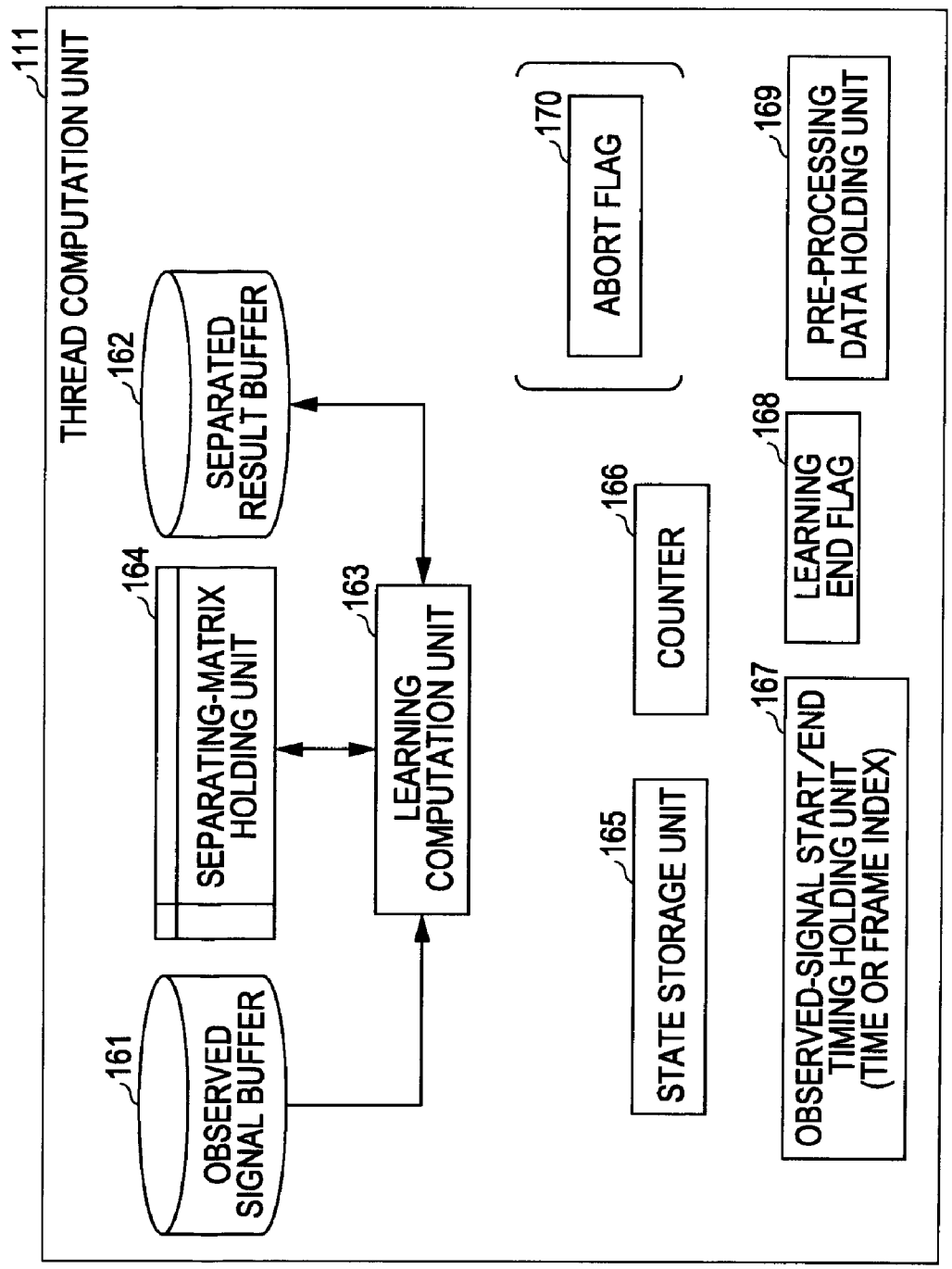
FIG. 16 is a diagram illustrating a process executed in a thread computation unit.

Next, referring to FIG. 16, a process executed in the thread computation unit 111 will be described.

Each of the threads 111-1 to 111-N executes batch ICA by using the functions of the respective modules of an observed signal buffer 161, a separated result buffer 162, a learning computation unit 163, and a separating-matrix holding unit 164.

The observed signal buffer 161 holds observed signals supplied from the thread control unit 112, and its capacity is equal to or larger than the capacity of observed signals corresponding to one block length. It should be noted, however, that if "frame thinning-out on observed signals" described later is to be performed, the size of the buffer may be reduced by an amount corresponding to the amount of thinning.

The separated result buffer 162 holds the separated results prior to separating-matrix convergence, which are computed by the learning computation unit 163.

The learning computation unit 163 executes a process of separating observed signals charged in the observed signal buffer 161, on the basis of a separating matrix W used for separation process which is held in the separating-matrix holding unit 164, charging the separated results into the separated-result buffer 162, and also updating the separating matrix being learned by using the separated results charged in the separated-result buffer 162.

A thread is a state transition machine, and the current state is stored in a state storage unit 165. The state of a thread is controlled by the thread control unit 112 on the basis of the counter value of a counter 166. The counter 166 changes in value in synchronization with supply of one frame of observed signals, and switches its state on the basis of this value. Details in this regard will be given later.

An observed-signal start/end timing holding unit 167 holds at least one of pieces of information indicating the start timing and the end timing of observed signals used for learning. As described above, information indicating timing may be the frame index or sample index, or may be relative time information. In this case as well, although both the start timing and the end timing may be stored, if the block length, that is, if the charging time of the observed signals is constant, it suffices to save only one of these timings.

A learning end flag 168 is a flag used for notifying the thread control unit 112 of the end of learning. During activation of a thread, the learning end flag 168 is set OFF (flag is not up), and at the point when learning ends, the learning end flag 168 is set ON. Then, after the thread control unit 112 recognizes that learning has ended, the learning end flag 168 is set OFF again through control of the thread control unit 112.

A pre-processing data holding unit 169 is an area that saves data that becomes necessary when observed signals to which pre-processing has been applied are returned to the original state. Specifically, for example, in cases where normalization of observed signals (adjusting the variance to 1 and the mean to 0) is executed in pre-processing, since values such as a variance (or a standard deviation or its inverse) and a mean are held in the pre-processing data holding unit 169, original signals prior to normalization can be recovered by using these values. In cases where, for example, uncorrelation (also referred to as pre-whitening) is executed as pre-processing, a matrix by which the observed signals are multiplied during the uncorrelation is held.

Values held in the state storage unit 165, the counter 166, and the observed-signal start/end timing holding unit 167 can be rewritten from an external module such as the thread control unit 112. For example, even while a learning process loop is being run in this thread, the thread control unit 112 can change the value of the counter 166.

As for the implementation of state transition, specifications may be such that each of the threads 111-1 to 111-N spontaneously changes its state on the basis of the value of the counter 166 of the thread itself, or specifications may be such that the thread control unit 112 issues a command instructing "transition to a specified state" (hereinafter, referred to as "state transition command") to the corresponding thread in accordance with the value of the counter 166 or the value of the learning end flag 168, and each thread transitions in state in response to the supplied command.

Next, state transition of the learning threads 111-1 to 111-N will be described with reference to FIGS. 17 and 18. As for its implementation, although specifications may be such that each thread changes its state by itself on the basis of the value of the counter 166, specifications may be also such that the thread control unit issues a state transition command in accordance with the value of the counter 166 or the value of the "learning end flag" 168, and each thread changes its state in response to the command. In the following description of embodiments, the latter specifications are adopted.

Figure 17:
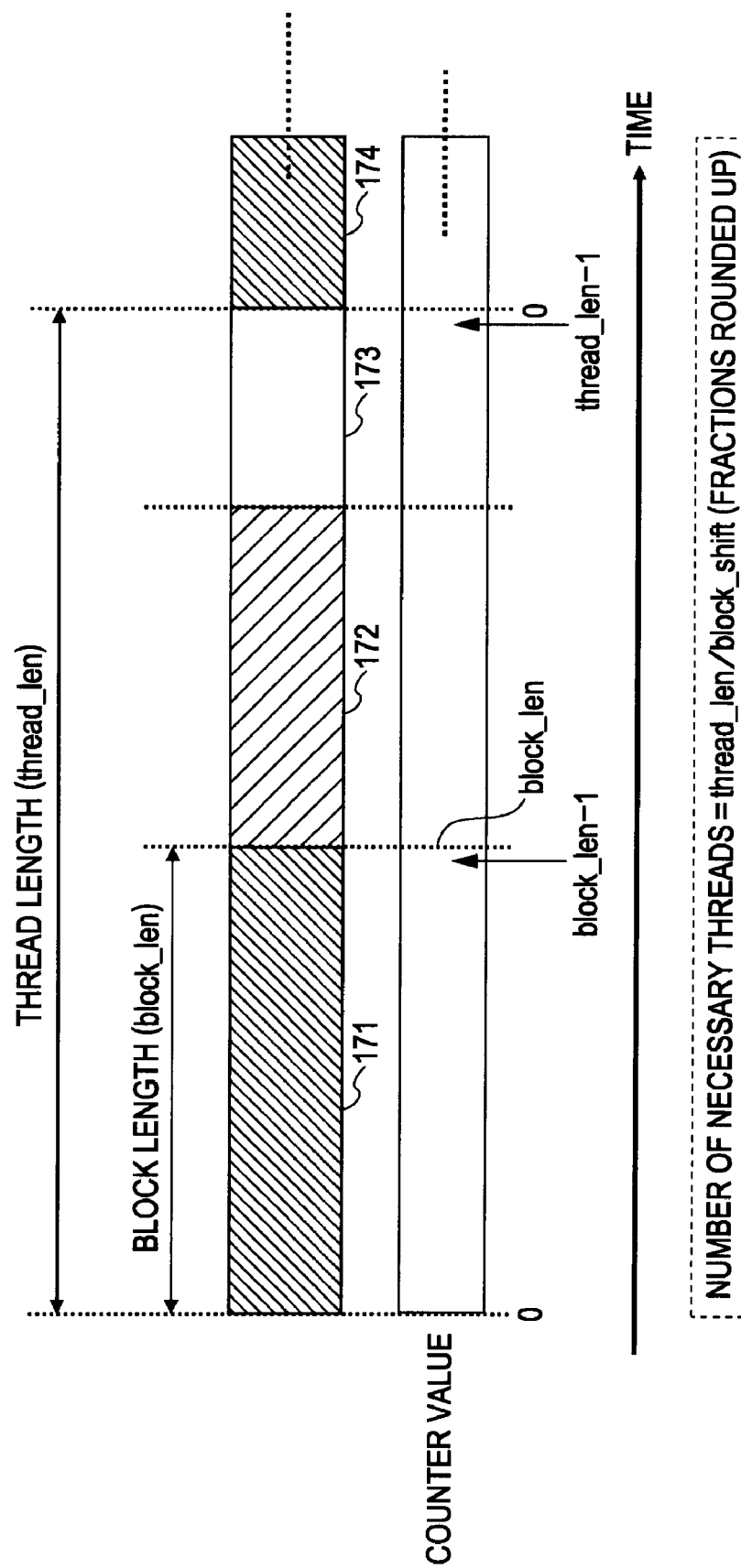
FIG. 17 is a diagram illustrating state transition of a learning thread.

FIG. 17 shows one of the threads described above with reference to FIG. 7. In each of the threads, when in the "charging" state of observed signals, observed signals for the duration of a specified time, that is, one block length are charged into the buffer. After the elapse of the specified time, the state transitions to learning.

In the learning state, a learning process loop is executed until the separating matrix W converges (or a predetermined number of times), and a separating matrix corresponding to the observed signals charged in the charging state is found. After the separating matrix converges (or after the learning process loop is executed a predetermined number of times), the state transitions to waiting.

Then, in the waiting state, charging or learning of observed signals is not executed for a specified time, and the thread is put in wait state. The time for which the waiting state is maintained is determined by the time it took for learning. That is, as shown in FIG. 17, a thread length (thread_len) as the total time width of the "charging" state, the "learning" state, and the "waiting" state is set, and basically, the time from when the "learning" state ends to the end of the thread length is set as the "waiting" state time (wait time). After the wait time elapses, the state returns to the "charging" state of observed signals.

While these times may be managed in units of milliseconds or the like, the times may be measured in units of frames that are generated by a short-time Fourier transform. In the following description, it is assumed that these times are measured (for example, counted up) in units of frames.

Figure 18:
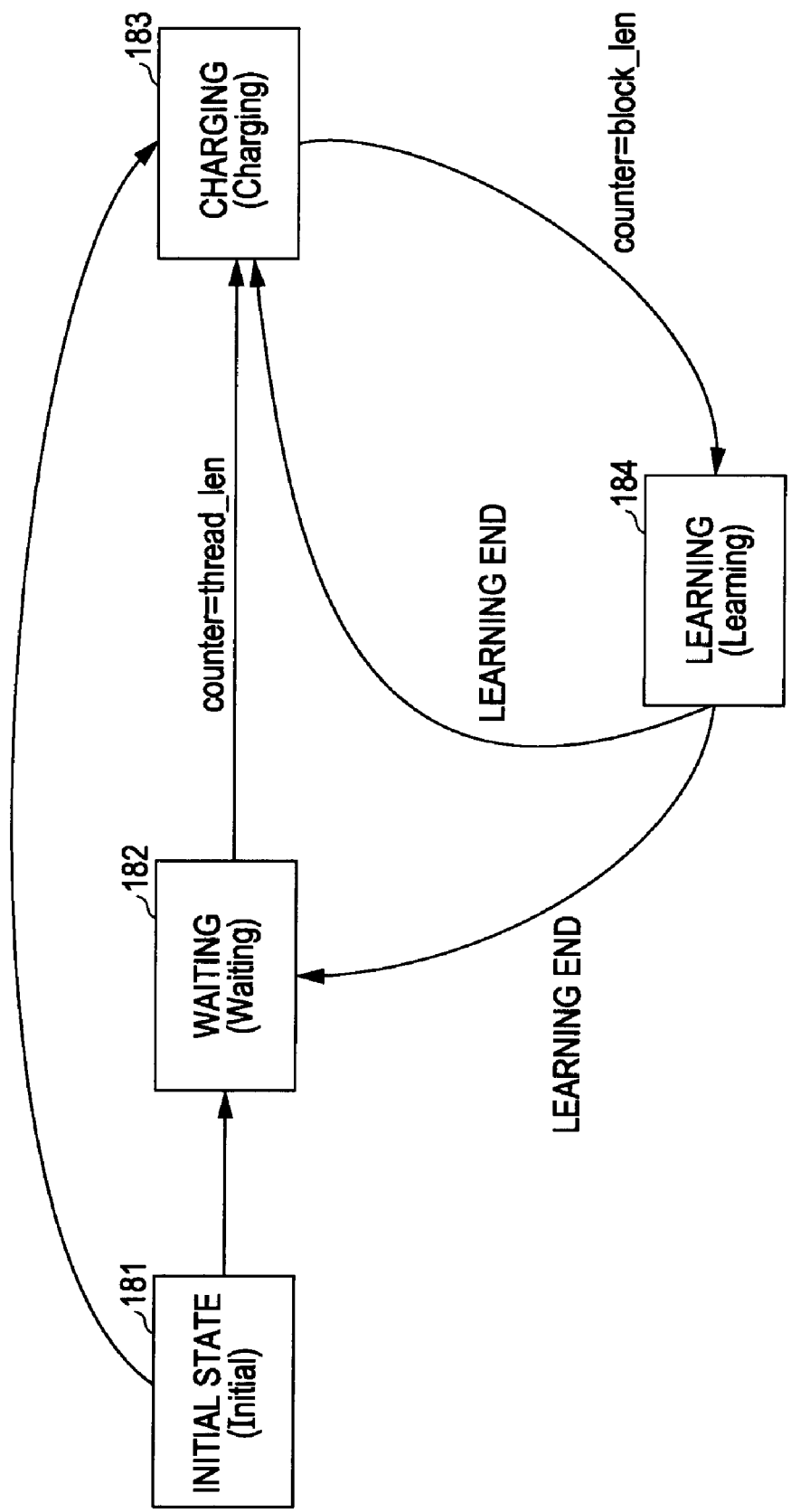
FIG. 18 is a diagram illustrating state transition of a learning thread.

Referring to FIG. 18, a further description will be given of the state transition of threads. Although the threads are in an "initial state" 181 immediately after system start-up, one of the threads is made to transition to "charging" 183, and the other threads are made to transition to "waiting" 182 (state transition commands are issued). In the example of FIG. 7 described above, Thread 1 is a thread that has transitioned to "charging", and the other threads are threads that have transitioned to "waiting".

The time necessary for charging observed signals is referred to as block length (block_len) (see FIG. 17). In addition, the time necessary for the one cycle of charging, learning, and waiting is referred to as thread length (thread_len). While these times may be managed in units of millimeters or the like, frames generated by a short-time Fourier transform may serve as units of management. In the following description, frames serve as units.

The state transitions from "charging to learning" and "waiting to charging" are made on the basis of the counter value. That is, within a thread that has started from "charging" (a charging state 171 in FIG. 17 and a charging state 183 in FIG. 18), the counter is incremented by 1 every time one frame of observed signals is supplied, and when the value of the counter becomes equal to the block length (block_len), the state is made to transition to "learning" (a learning state 172 in FIG. 17 and a learning state 184 in FIG. 18). Although learning is performed in the background in parallel with the separating process, during this learning as well, the counter is incremented by 1 in synchronization with the frame of observed signals.

When learning is finished, the state is made to transition to "waiting" (a waiting state 173 in FIG. 17 and a waiting state 182 in FIG. 18). When in the waiting state, as in the learning state, the counter is incremented by 1 in synchronization with the frame of observed signals. Then, when the counter value becomes equal to the thread length (thread_len), the state is made to transition from "charging" (the charging state 171 in FIG. 17 and the charging state 183 in FIG. 18), and the counter is returned to 0 (or an appropriate initial value).

On the other hand, as for a thread that has transitioned from the "initial state" 181 to "waiting" (the waiting state 173 in FIG. 17 and the waiting state 182 in FIG. 18), the counter is set to a value corresponding to the time for which the thread is to be put in wait state. For example, Thread 2 in FIG. 7 transitions to "charging" after waiting for a time equal to the block shift width (block_shift). Likewise, Thread 3 is made to wait for a time equal to twice the block shift width (block_shift×2). To realize these operations, the counter of Thread 2 is set as:

(thread length)−(block shift width):(thread_len)−
(block_shift).

In addition, the counter of Thread 3 is set as:

(thread length)−(2× block shift):(thread_len)−
(block_shift×2).

With these settings, after the value of the counter reaches the thread length (thread_len), the state transitions to "charging", and thereafter, as in Thread 1, the cycle of "charging, learning, and waiting" is repeated.

The number of learning threads to be prepared is determined by the thread length and the block shift width. Letting the thread length be represented as thread_len, and the block shift width be represented as block_shift, the number of necessary learning threads is found by (thread length)/(block shift width), that is, thread_length/block_shift.

The fractions are rounded up.

For example, in FIG. 7, since the settings are such that

[thread length (thread_len)]=1.5×[block length
(block_len)], and

[block shift width (block_shift)]=0.25×[block length
(block_len)], the number of necessary threads is 1.5/0.25=6.

[Processing Example of Real-Time Separation/Sound Source Direction Estimation Process]

Hereinbelow, a real-time separation/sound source direction estimation process performed by the apparatus according to an embodiment of the present invention will be described.

In the apparatus configuration shown in FIG. 12, the process in the sound source direction estimating unit 125 and the "foreground process (separation)" in the separation processing unit 123 can be both performed in synchronization with frames. Accordingly, the two processes will be collectively described with reference to the flowchart shown in FIG. 19.

Since the "background process (learning)" in the learning processing unit 110 is run in a separate unit of processing (such as a separate thread, separate process, or separate processor) from the sound source direction estimation and separation process, this will be described with reference to a separate flowchart. In addition, commands and the like exchanged between the two processes will be described in the sequence diagram shown in FIG. 22.

First, referring to the flowchart in FIG. 19, a description will be given of processing in the sound source direction estimating unit 125 and processing in the separation processing unit 123.

Upon start-up of the system, in step S101, various kinds of initialization are performed. Details of the initialization will be described later. The process from the sound input in step S103 to the transmission in step S110 is repeated until processing on the system ends (Yes in step S102).

The sound input in step S103 is a process of capturing a predetermined number of samples from an audio device (or a network, a file, or the like depending on the embodiment) (this process will be referred to as "capture"), and charging the captured samples in a buffer. This is performed for the number of microphones. Hereinafter, the captured data will be referred to as observed signal.

Figure 20:
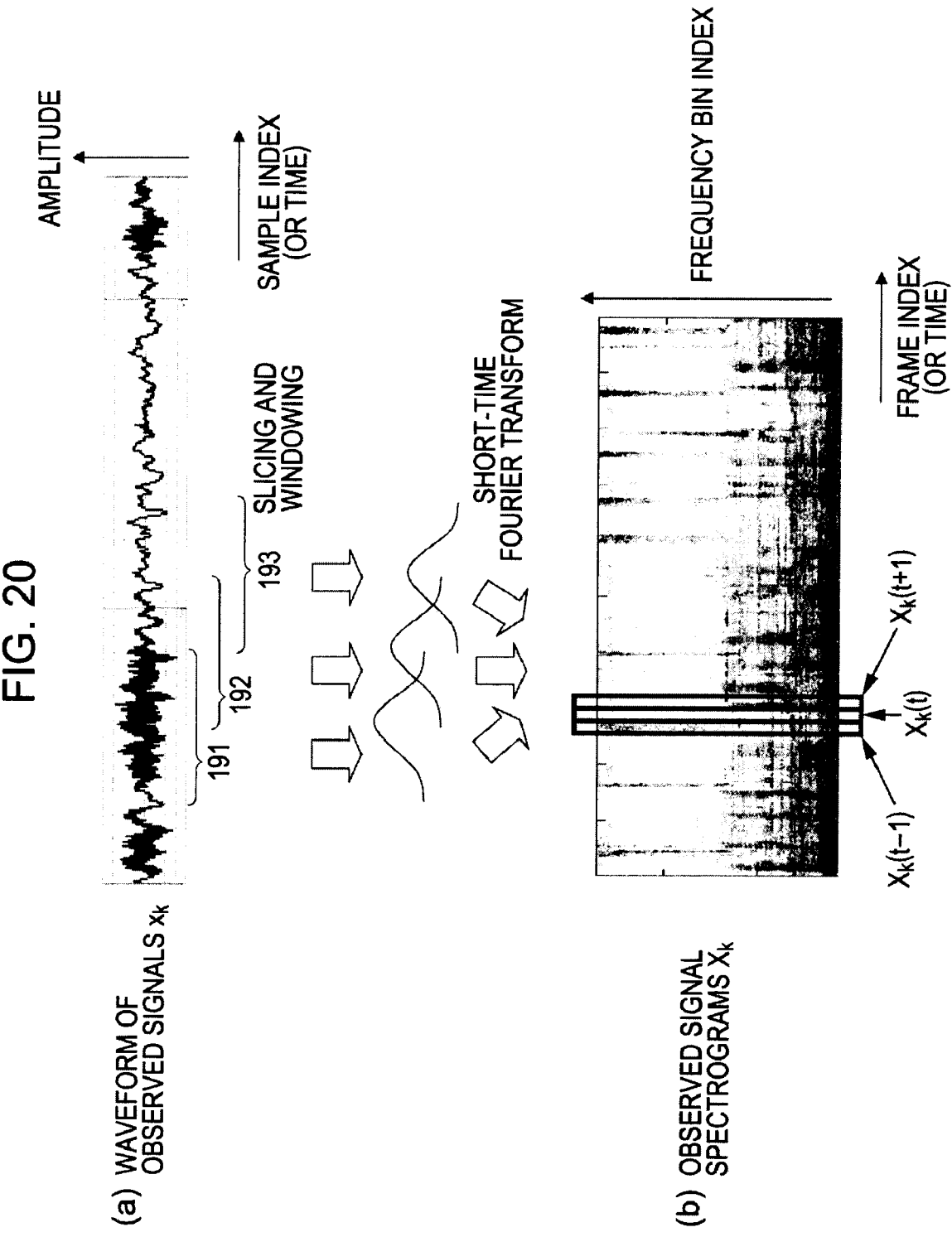
FIG. 20 is a diagram illustrating the details of a short-time Fourier transform.

Next, in step S104, the observed signal is sliced off for each predetermined length, and a short-time Fourier transform (STFT) is performed. Details of the short-time Fourier transform will be described with reference to FIG. 20.

For example, an observed signal $x_k$ recorded with the k-th microphone in the environment as shown in FIG. 2 is shown in FIG. 20(a). A window function such as a Hanning window or a sine window is applied to frames 191 to 193, which are sliced data each obtained by slicing a predetermined length from the observed signal $x_k$. The sliced units are referred to as frames. By applying a discrete Fourier transform (a Fourier transform on a finite segment, abbreviated as DFT) or a fast Fourier transform (FFT) to one frame of data, a spectrum $X_k(t)$ (t is the frame index) as frequency-domain data is obtained.

The frames to be sliced may be overlapped, like the frames 191 to 193 shown in the drawing, which makes it possible for the spectrums $X_k(t-1)$ to $X_k(t+1)$ of consecutive frames to change smoothly. Spectrums laid side by side in accordance with the frame index are referred to as spectrograms. FIG. 20(b) shows an example of spectrograms.

When frames to be sliced in the short-time Fourier transform (STFT) are overlapped, the frame-by-frame inverse transform results (waveforms) are also laid together with overlap in the inverse Fourier transform (FT). This is referred to as overlap add. A window function such as a sine window may be applied to the inverse transform results before overlap add. This is referred to as weighted overlap add (WOLA). Noise derived from discontinuity in frames can be reduced by WOLA.

Since there are a plurality of input channels (equal to the number of microphones) according to an embodiment of the present invention, the Fourier transform is also performed for the number of channels. In the following, the Fourier transformed results for all channels and for one frame are represented by a vector X(t) (Equation [4.11] described above). In Equation [4.11], n denotes the number of channels (=the number of microphones). M denotes the total number of frequency bins, and letting T represent the number of points in the short-time Fourier transform, M=t/2+1.

Figure 19:
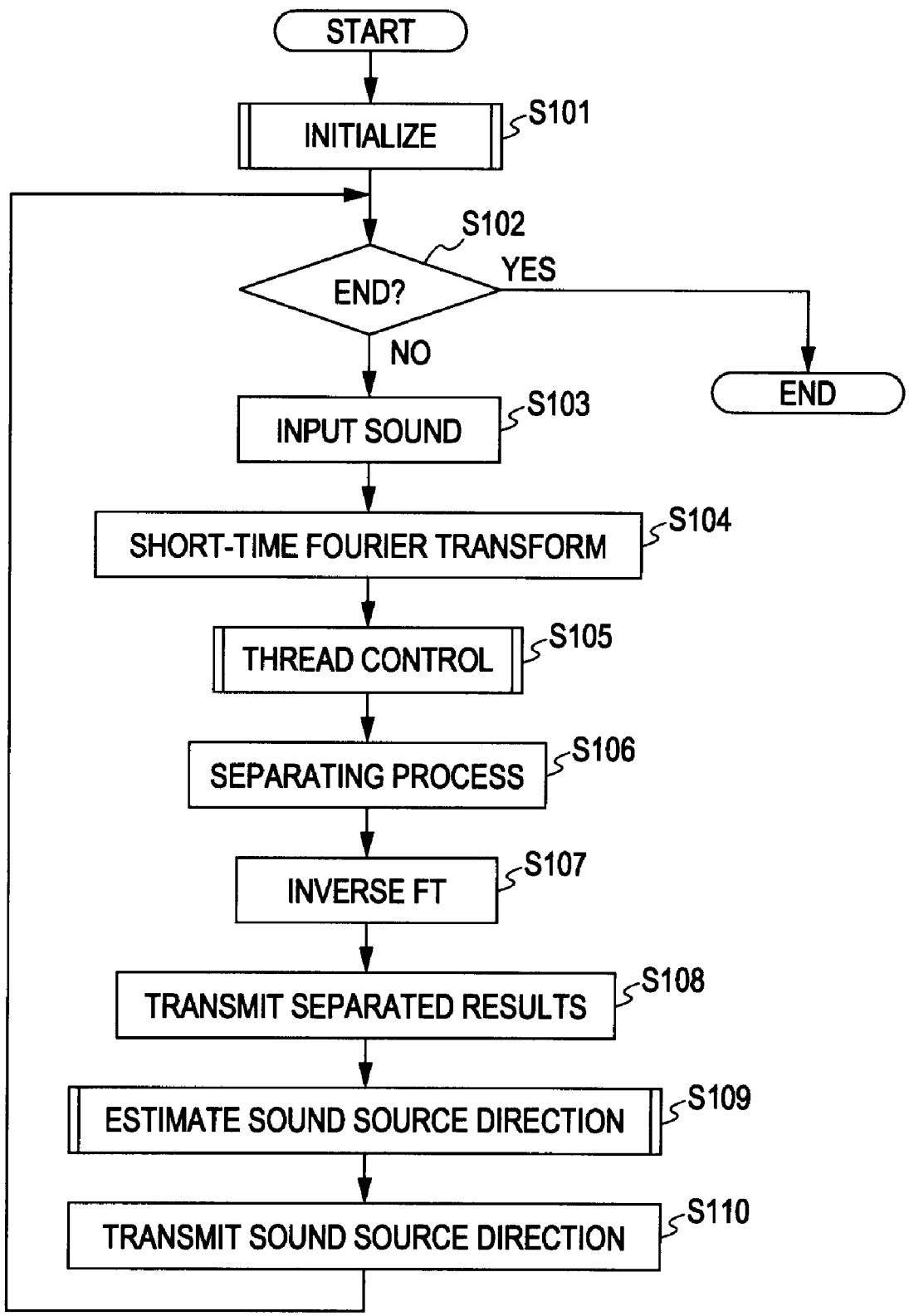
FIG. 19 is a diagram showing a flowchart illustrating a real-time separation/sound source direction estimating process.

Returning to the flow in FIG. 19, the description will be continued. In step S104, after the observed signal is sliced into each predetermined length, and a short-time Fourier transform (STFT) is performed, in step S105, control is performed with respect to each learning thread. Details in this regard will be given later.

Next, with respect to the observed signals X(t) generated in step S105, separation is performed in step S106. Letting the separating matrix be W (Equation [4.10]), the separated results Y(t) (Equation [4.4]) are found by Y(t)=WX(t) (Equation [4.12]).

Next, in step S107, an inverse Fourier transform (inverse FT) is applied to the separated results Y(t), thereby recovering the signals back to time domain signals. Thereafter, in step S108, the separated results are transmitted to subsequent-stage processing.

Next, in step S109, the sound source direction is updated by using one frame of observed signals and separated results (or by using one frame of observed signals and the latest separating matrix). Details in this regard will be given later. In step S110, the sound source direction thus found is transmitted to subsequent-stage processing. Steps S103 to S110 mentioned above are repeated until the end.

Details of the initialization process in step S101 in the flowchart shown in FIG. 19 will be described with reference to the flowchart in FIG. 21.

Figure 15:
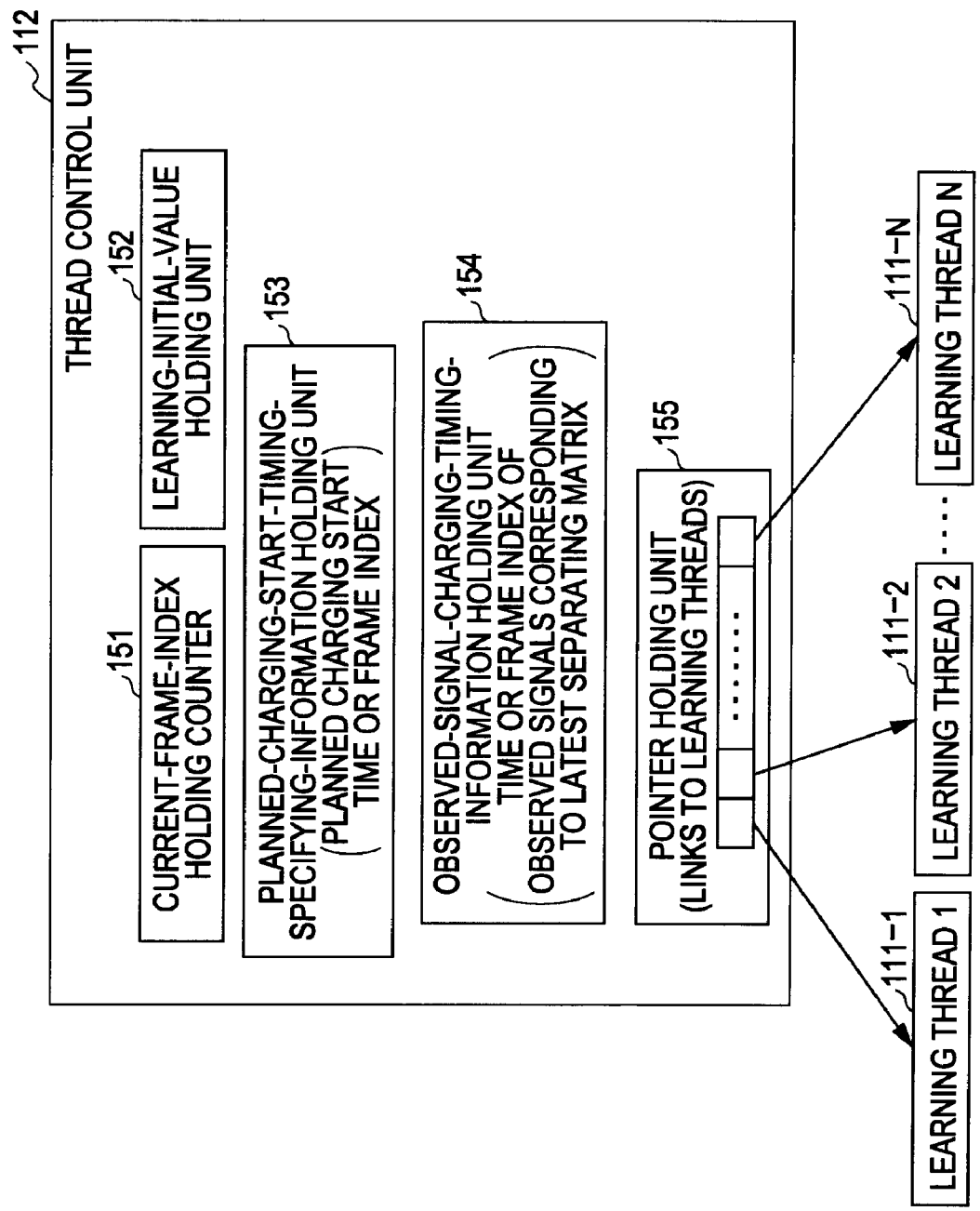
FIG. 15 is a diagram showing a detailed configuration example of a thread control unit of a learning processing unit.

In step S151, the thread control unit 112 shown in FIGS. 12 and 15 initializes itself. Specifically, in the thread control unit 112, the current-frame-index holding counter 151 (see FIG. 15) is initialized to 0, and an appropriate initial value is substituted into the learning-initial-value holding unit 152 (see FIG. 15). For example, the initial value may be a unit matrix, or if the separating matrix W at the last system termination is saved, the separating matrix W at the last system termination, or an appropriately transformed version of this separating matrix may be used. In addition, for example, in cases where the sound source direction can be estimated with some accuracy from information such as an image or a priori knowledge, an initial value may be computed and set on the basis of the sound source direction.

A value of (number of necessary threads−1)×[block shift width (block_shift)] is set in the planned-charging-start-timing-specifying-information holding unit 153. This value indicates the timing (frame index) at which charging in a thread with the largest thread index starts. Then, since timing information (frame index or relative time information) indicating observed signals corresponding to the latest separating matrix is held in the observed-signal-charging-timing-information holding unit 154, initialization is performed at this time, and 0 is held.

In the separating-matrix holding unit 113 (see FIG. 12) as well, as in case of the learning-initial-value holding unit 152 when initialized, an appropriate initial value is held. That is, the initial value to be held in the separating-matrix holding unit 113 may be a unit matrix, or if the separating matrix W at the last system termination is saved, the separating matrix W at the last system termination, or an appropriately transformed version of this separating matrix may be used. In addition, for example, in cases where the sound source direction can be estimated with some accuracy from information such as an image or a priori knowledge, an initial value may be computed and set on the basis of the sound source direction.

In step S152, the thread control unit 112 secures the number i of necessary threads to be executed in the thread computation unit 111, and sets their state to the "initial" state.

At this time, the number i of necessary threads is found by rounding up the fractional part of thread length/block shift width (thread_len/block_shift) (that is, an integer larger than and closest to the value of thread_length/block_shift).

In step S153, the thread control unit 112 starts a thread control loop, and until initialization of all threads is finished, the thread control unit 112 detects uninitialized threads and executes the processes from step S154 to step S159.

In step S154, the thread control unit 112 determines whether or not the thread index is 1.

If it is determined in step S154 that the thread index is 1, in step S155, the thread control unit 112 controls a thread with a thread index 1 (for example, the thread 111-1), and initializes its counter 166 (see FIG. 16) (for example, sets the counter 166 to 0).

In step S156, the thread control unit 112 issues to the thread with the thread index 1 (for example, the thread 111-1) a state transition command for causing the state to transition to the "charging" state, and the process proceeds to step S159.

If it is determined in step S154 that the thread index is not 1, in step S157, the thread control unit 112 sets the value of the counter 166 of the corresponding thread (one of the threads 111-2 to 111-i) to thread_len−block_shift×(thread index−1).

In step S158, the thread control unit 112 issues a state transition command for causing the state to transition to the "waiting" state.

After the process in step S156 or step S158, in step S159, the thread control unit 112 initializes information within the thread which has not been initialized yet, that is, information indicating a state stored in the state storage unit 165 (see FIG. 16), and information other than the counter value of the counter 166. Specifically, for example, the thread control unit 112 sets the learning end flag 168 (see FIG. 16) OFF, and initializes values in the observed-signal start/end timing holding unit 167 and the pre-processing data holding unit 169 (for example, set the values to 0).

When all the threads secured in the thread computation unit 111, that is, the threads 111-1 to 111-i have been initialized, in step S160, the thread loop is ended, and the initialization ends.

Through such processing, the thread control unit 112 initializes all of the plurality of threads secured in the thread computation unit 111.

While it has been described above that the process loop of step S153 to step S160 is repeated for the number i of launched threads, instead of repeating the process loop, parallel processes equal to the number i of threads may be executed. Likewise, in the subsequent portions where a process loop is repeated as well, parallel processes may be executed instead of repeating the process loop.

Figure 21:
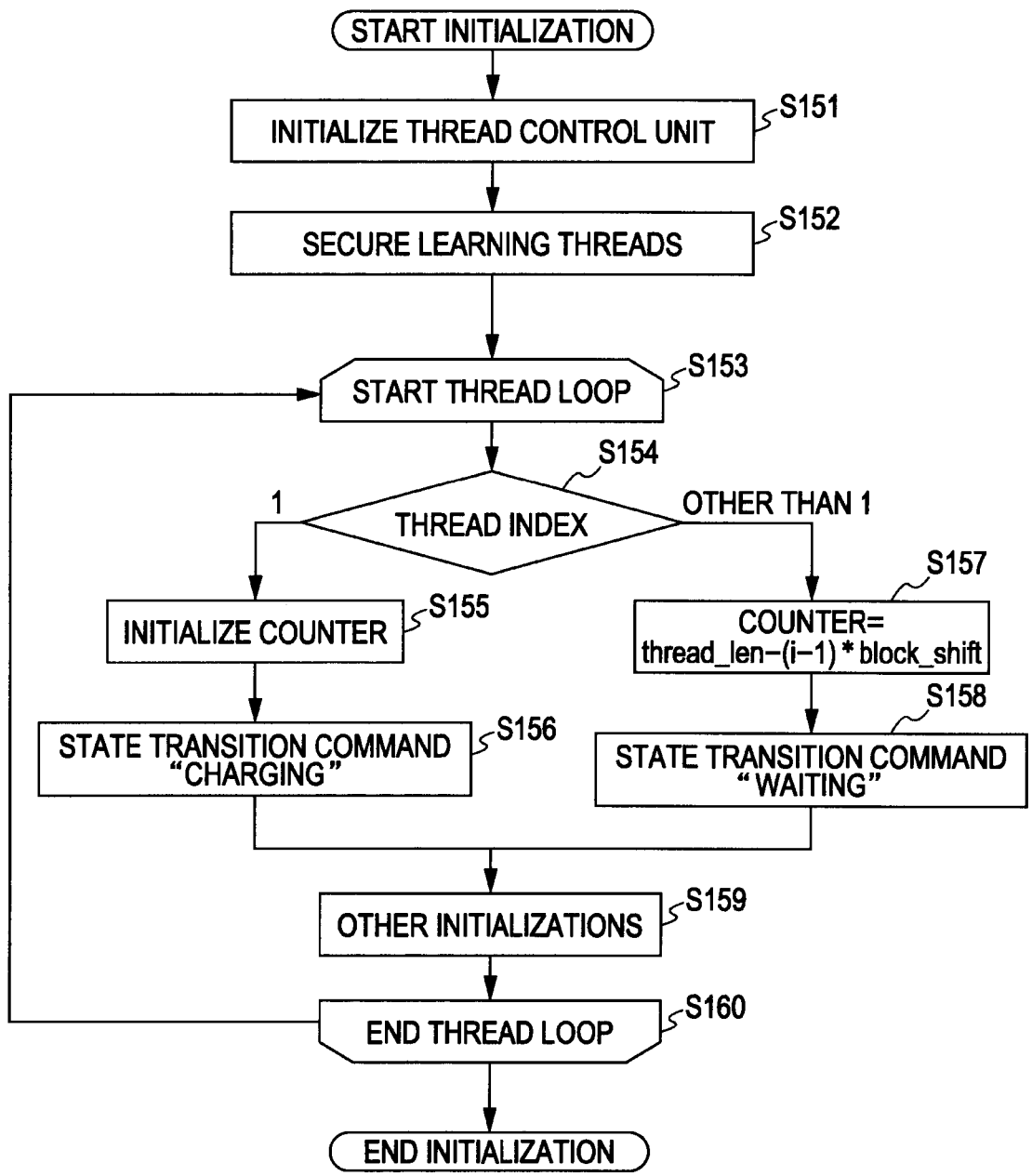
FIG. 21 is a diagram showing a flowchart illustrating the details of an initialization process in step S101 in the flowchart shown in FIG. 19.
Figure 22:
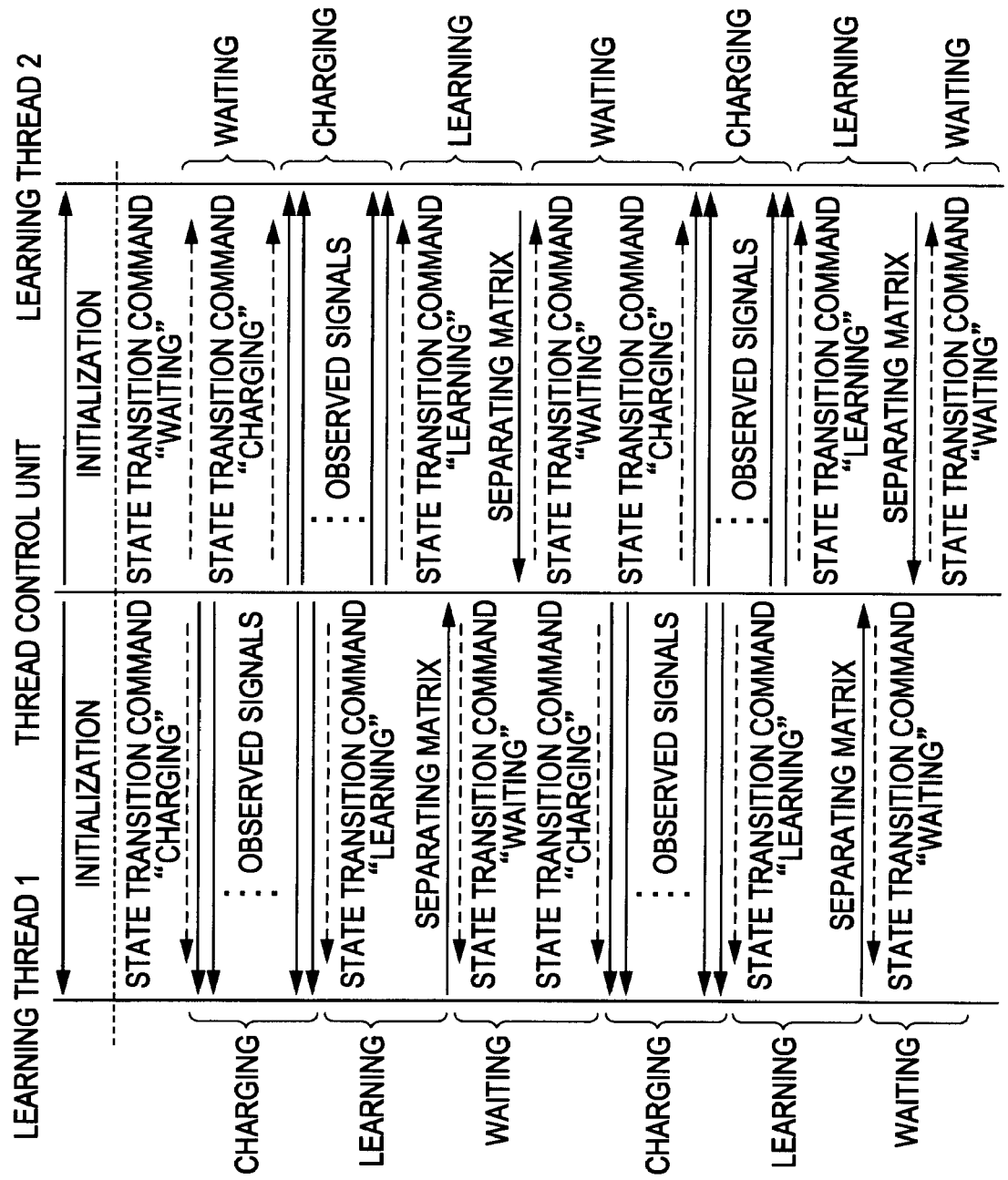
FIG. 22 is a diagram showing a sequence of control performed by a thread control unit with respect to a plurality of Learning Threads 1 and 2.

The processes in step S154 to S158 in FIG. 21 correspond to the "initialization" process at the beginning, and the transmission of a state transition command immediately after the initialization process in the sequence diagram shown in FIG. 22. FIG. 22 shows a sequence of control performed by the thread control unit 112 with respect to the plurality of Learning Threads 1 and 2. Each thread repeatedly executes the process of waiting, charging, and learning. After the thread control unit provides observed signals to each thread, and each thread charges observed data, a learning process is performed to generate a separating matrix, and the separating matrix is provided to the thread control unit.

Next, referring to the flowchart in FIG. 23, a description will be given of a thread control process, which is executed by the thread control unit 112 in step S105 in the flowchart shown in FIG. 19.

It should be noted that this flowchart represents a flow as seen from the thread control unit 112, and not from the learning threads 111-1 to 111-N. For example, "learning-state process" indicates a process performed by the thread control unit 112 when the state of a learning thread is "learning" (for the process of the learning thread itself, reference should be made to FIG. 30).

Steps S201 to S206 represent a loop with respect to a learning thread, and the loop is run for the number of threads generated in step S152 of the flow shown in FIG. 21 (parallel processes may be performed as well). In step S202, the current state of the learning thread is read from the state storage unit 165 (see FIG. 16), and one of "waiting-state process", "charging-state process", and "learning-state process" is executed in accordance with the read value. Details of the respective processes will be described later in detail.

A description will be given of individual steps in the flow. In step S201, the thread control unit 112 starts a thread loop, and with a variable "s", which indicates the thread index of a thread on which control is executed, set as s=1, the thread control unit 112 increments the variable "s" every time processing of one thread is finished, and repeats the thread loop process from steps S202 to S207 until s=i.

In step S202, the thread control unit 112 acquires information indicating the internal state of a thread having a thread index indicated by the variable "s", which is held in the state storage unit 165 for the thread. If it is detected that the state of the thread having a thread index indicated by the variable "s" is "waiting", in step S203, the thread control unit 112 executes a waiting-state process, which will be described later with reference to the flowchart in FIG. 24, and the process proceeds to step S206.

Figure 25:
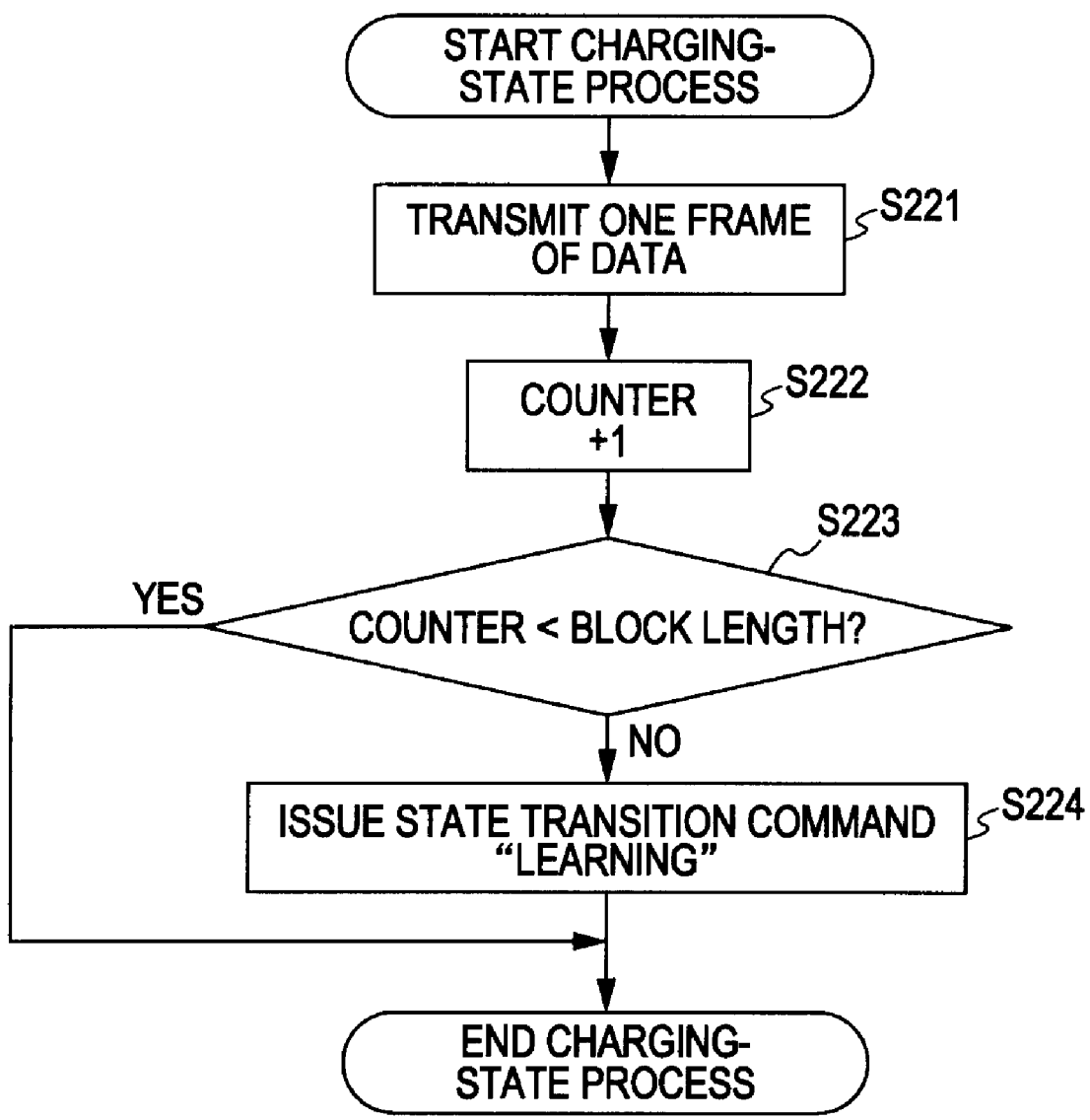
FIG. 25 is a diagram showing a flowchart illustrating a charging-state process that is executed in step S204 in the flowchart shown in FIG. 23.

If it is detected in step S202 that the state of the thread having a thread index indicated by the variable "s" is "charging", in step S204, the thread control unit 112 executes a charging-state process, which will be described later with reference to the flowchart in FIG. 25, and the process proceeds to step S206.

Figure 26:
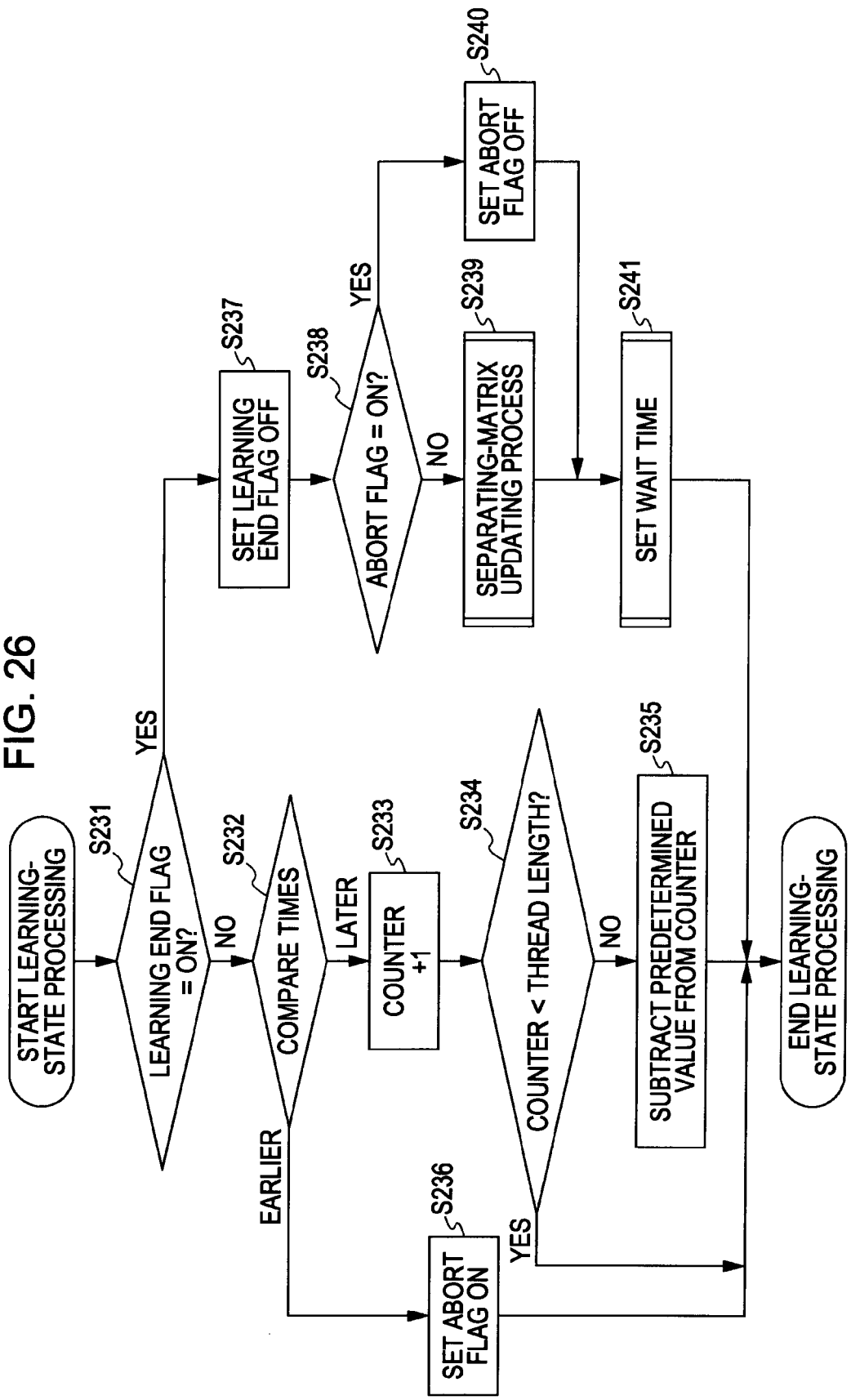
FIG. 26 is a diagram showing a flowchart illustrating a learning-state process that is executed in step S205 in the flowchart shown in FIG. 23.

If it is detected in step S202 that the state of the thread having a thread index indicated by the variable "s" is "learning", in step S205, the thread control unit 112 executes a learning-state process, which will be described later with reference to the flowchart in FIG. 26.

After finishing the process in step S203, step S204, or step S205, in step S206, the thread control unit 112 increments the variable "s" by 1. Then, when the variable "s" indicating the thread index of a thread on which control is executed has become s=i, the thread control unit 112 ends the thread loop.

In step S207, the thread control unit 112 increments the frame index held in the current-frame-index holding counter 151 (see FIG. 15) by 1, and ends the thread control process.

Through such processing, the thread control unit 112 can control all of the plurality of threads in accordance with their state.

While it has been described above that the thread loop is repeated for the number i of launched threads, instead of repeating the thread loop, parallel processes equal to the number i of threads may be executed.

Next, referring to the flowchart in FIG. 24, a description will be given of the waiting-state process, which is executed in step S203 in the flowchart shown in FIG. 23.

This waiting-state process is a process that is executed by the thread control unit 112 when the state of a thread corresponding to the variable "s" is "waiting" in the thread control process described above with reference to FIG. 23.

In step S211, the thread control unit 112 increments the counter 166 (see FIG. 16) of the corresponding thread 111 by 1.

In step S212, the thread control unit 112 determines whether or not the value of the counter 166 of the corresponding thread 111 is smaller than the thread length (thread_len). If it is determined in step S212 that the value of the counter 166 is smaller than the thread length, the waiting-state process is ended, and the process proceeds to step S206 in FIG. 23.

If it is determined in step S212 that the value of the counter 166 is not smaller than the thread length, in step S213, the thread control unit 112 issues to the corresponding thread 111 a state transition command for causing the state of the thread 111 to transition to the "charging" state.

That is, the thread control unit 112 issues a state transition command for causing a thread, which is in the "waiting" state in the state transition diagram described above with reference to FIG. 18, to "charging".

In step S214, the thread control unit 112 initializes the counter 166 (see FIG. 16) (for example, sets the counter 166 to 0) of the corresponding thread 111, and sets, in the observed-signal start/end timing holding unit 167 (see FIG. 16), observed-signal charging start timing information, that is, the current frame index held in the current-frame-index holding counter 151 (see FIG. 15) of the thread control unit 112, or equivalent relative time information or the like. Then, the thread control unit 112 ends the waiting-state process, and proceeds to step S206 in FIG. 23.

Through such processing, the thread control unit 112 can control a thread that is in the "waiting" state, and on the basis of the value of the counter 166 of the thread, cause the state of the thread to transition to "charging".

Next, referring to the flowchart in FIG. 25, a description will be given of the charging-state process, which is executed in step S204 in the flowchart shown in FIG. 23.

This charging-state process is a process that is executed by the thread control unit 112 when the state of a thread corresponding to the variable "s" is "charging" in the thread control process described above with reference to FIG. 23.

In step S221, the thread control unit 112 supplies one frame of observed frames X(t) to the corresponding thread 111 for learning. This process corresponding to the supply of observed signals from the thread control unit to the respective threads.

In step S222, the thread control unit 112 increments the counter 166 of the corresponding thread 111 by 1.

In step S223, the thread control unit 112 determines whether or not the value of the counter 166 of the corresponding thread 111 is smaller than the block length (block_len), in other words, whether or not the observed signal buffer 161 (see FIG. 16) of the corresponding thread is full. If it is determined in step S223 that the value of the counter 166 of the corresponding thread 111 is smaller than the block length, in other words, the observed signal buffer 161 of the corresponding thread is not full, the charging-state process is ended, and the process proceeds to step S206 in FIG. 23.

Figure 23:
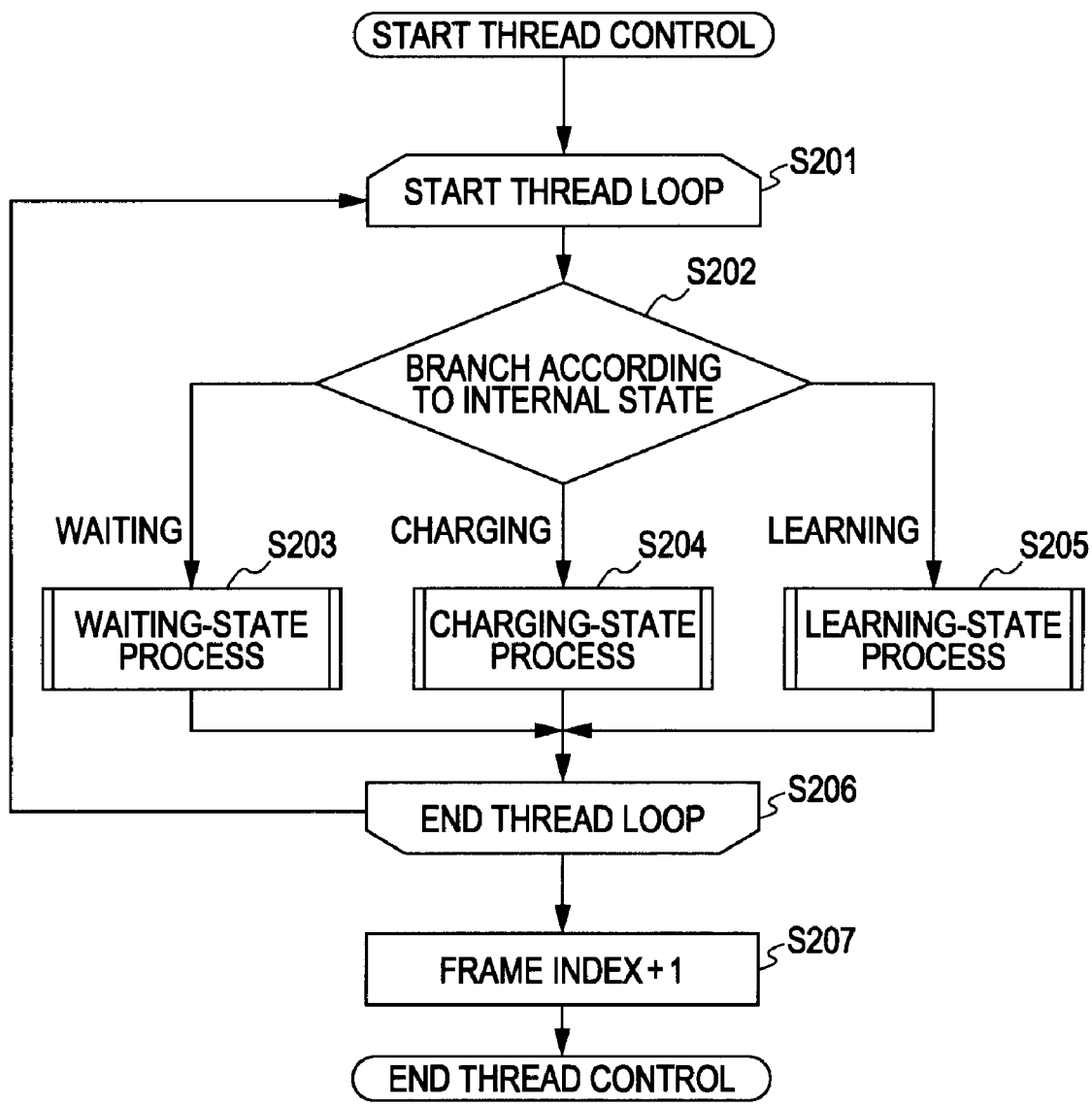
FIG. 23 is a diagram showing a flowchart illustrating the details of a thread control process executed by a thread control unit in step S105 in the flowchart shown in FIG. 19.
Figure 24:
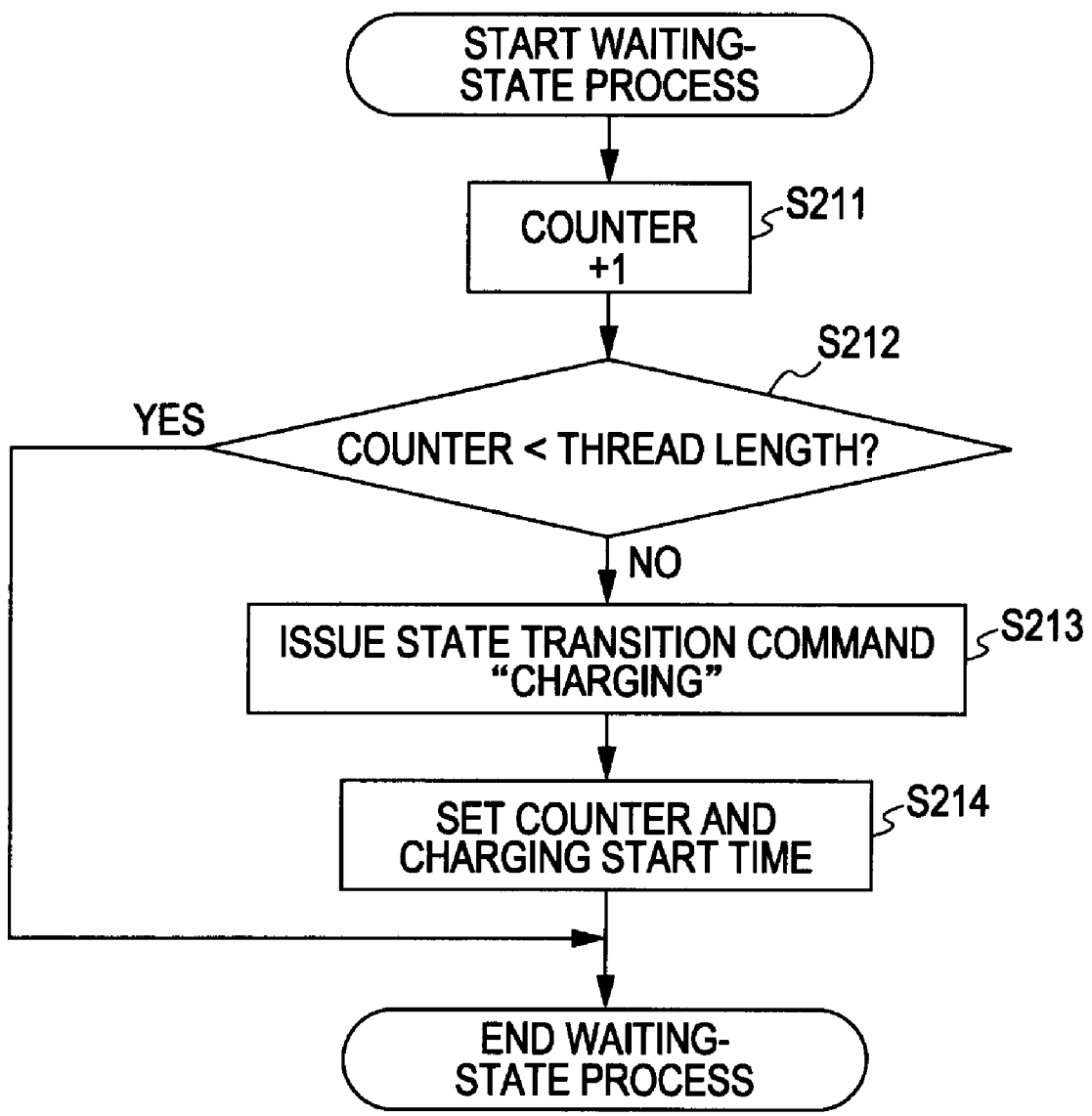
FIG. 24 is a diagram showing a flowchart illustrating a waiting-state process that is executed in step S203 in the flowchart shown in FIG. 23.

If it is determined in step S223 that the value of the counter 166 is not smaller than the block length, in other words, the observed signal buffer 161 of the corresponding thread is full, in step S224, the thread control unit 112 issues to the corresponding thread 111 a state transition command for causing the state of the thread 111 to transition to the "learning" state, ends the charging-state process, and proceeds to step S206 in FIG. 23.

That is, the thread control unit 112 issues a state transition command for causing a thread, which is in the "charging" state in the state transition diagram described above with reference to FIG. 18, to "learning".

Through such processing, the thread control unit 112 can supply observed signals to a thread that is in the "charging" state to control the charging of the observed signals, and on the basis of the value of the counter 166 of the thread, cause the state of the thread to transition from "charging" to "learning".

Next, referring to the flowchart in FIG. 26, a description will be given of the learning-state process, which is executed in step S205 in the flowchart shown in FIG. 23.

This learning-state process is a process that is executed by the thread control unit 112 when the state of a thread corresponding to the variable "s" is "learning" in the thread control process described above with reference to FIG. 23.

In step S231, the thread control unit 112 determines whether or not the learning end flag 168 (see FIG. 16) of the corresponding thread 111 is ON. If it is determined in step S231 that the learning end flag is ON, the process proceeds to step S237 described later.

If it is determined in step S231 that the learning end flag is not ON, that is, a learning process is being executed in the corresponding thread, the process proceeds to step S232 where a process of comparing times is performed. The "comparing of times" refers to a process of comparing the observed-signal start time 167 (see FIG. 16) recorded within the learning thread 111, with the charging start time 154 (see FIG. 15) corresponding to the current separating matrix which is saved in the thread control unit 112. If the observed-signal start time 167 (see FIG. 16) recorded in the thread 111 is earlier than the charging start time 154 corresponding to the current separating matrix which is saved in the thread control unit 112, the subsequent processes are skipped.

On the other hand, if the observed-signal start time 167 (see FIG. 16) recorded in the thread 111 is later than or the same as the charging start time 154 corresponding to the current separating matrix which is saved in the thread control unit 112, the process proceeds to step S233. In step S233, the thread control unit 112 increments the counter 166 of the corresponding thread 111 by 1.

Next, in step S234, the thread control unit 112 determines whether or not the value of the counter 166 of the corresponding thread 111 is smaller than the thread length (thread_len). If it is determined in step S234 that the value of the counter 166 is smaller than the thread length, the thread control unit 112 ends the learning-state process, and proceeds to step S206 in FIG. 23.

If it is determined in step S234 that the value of the counter 166 is not smaller than the thread length, in step S235, the thread control unit 112 subtracts a predetermined value from the value of the counter 166, ends the learning-state process, and proceeds to step S206 in FIG. 23.

A case where the value of the counter reaches the thread length during learning corresponds to a case where learning takes such a long time that the period of "waiting" state does not exist. In that case, since learning is still being continued, and the observed signal buffer 161 is being used, it is not possible to start the next charging. Accordingly, until learning ends, the thread control unit 112 postpones the start of the next charging, that is, issuing of a state transition command for causing the state to transition to the "charging" state. Thus, the thread control unit 112 subtracts a predetermined value from the value of the counter 166. While the value to be subtracted may be, for example, 1, the value may be larger than 1, for example, a value such as 10% of the thread length.

When the transition to the "charging" state is postponed, the interval of the charging start time becomes irregular between threads, and in the worst cases, there is even a possibility that observed signals of substantially the same segment are charged between a plurality of threads. When this happens, not only do several threads become meaningless, but depending on the multithreaded implementation of the OS executed by a CPU 21, there is a possibility that the learning time further increases as a plurality of learning processes are run on the single CPU 21, and the interval becomes further irregular.

To avoid such a situation, the wait times in other threads may be adjusted so that the interval of the charging start timing becomes regular again. This process is executed in step S241. Details of this wait-time adjusting process will be described later.

A description will be given of the process in a case when the learning end flag is determined to be ON in step S231. This process is executed once every time a learning loop within a learning thread ends. If it is determined in step S231 that the learning end flag is ON, and a learning process has ended in the corresponding thread, in step S237, the thread control unit 112 sets the learning end flag 168 of the corresponding thread 111 OFF. This process represents an operation for preventing this branch from being continuously executed.

Thereafter, the thread control unit 112 checks whether or not an abort flag 170 (see FIG. 16) of the thread is ON or OFF. If the abort flag 170 is ON, the thread control unit 112 performs a separating-matrix updating process in step S239, and performs a wait-time setting process in step S241. On the other hand, if the abort flag 170 (see FIG. 16) of the thread is OFF, the separating-matrix updating process in step S239 is omitted, and the wait-time setting process is performed in step S241. Details of the separating-matrix updating process in step S239, and the wait-time setting process in step S241 will be described later.

Through such processing, the thread control unit 112 can determine whether or not learning has ended in a thread in the "learning" state by referring to the learning end flag 168 of the corresponding thread. If the learning has ended, the thread control unit 112 updates the separating matrix W and sets the wait time, and also causes the state of the thread to transition from "learning" to "waiting" or "charging".

Figure 27:
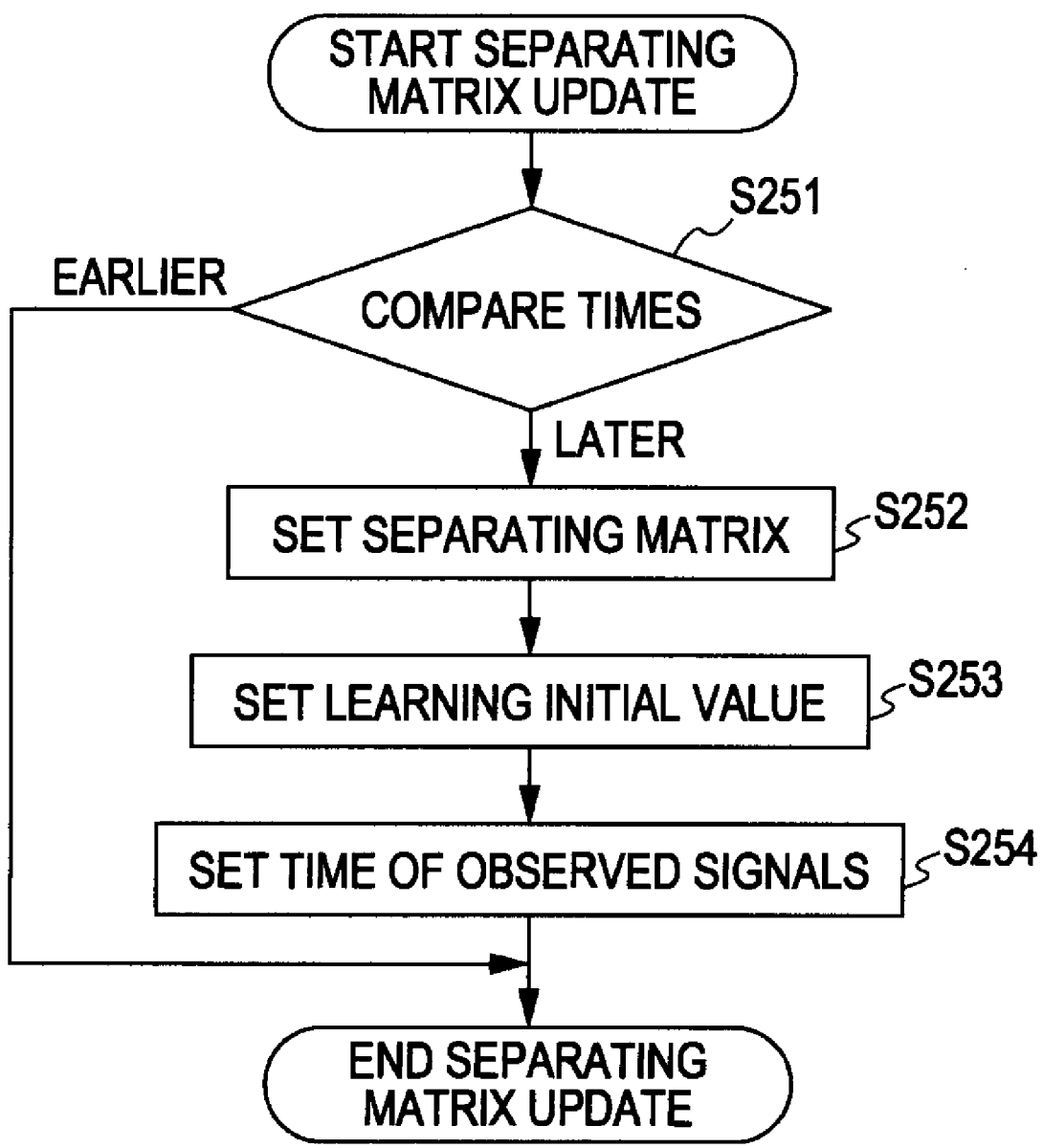
FIG. 27 is a diagram showing a flowchart illustrating a separating-matrix updating process that is executed in step S239 in the flowchart shown in FIG. 26.

Next, referring to the flowchart in FIG. 27, a description will be given of the separating-matrix updating process, which is executed in step S239 in the flowchart shown in FIG. 26. This is a process for reflecting a separating matrix found by learning on other modules.

In step S251, the thread control unit 112 determines whether or not the start timing of observed signals held in the observed-signal start/end timing holding unit 167 (see FIG. 16) of the thread is earlier than the charging start timing corresponding to the current separating matrix, which is held in the observed-signal-charging-timing-information holding unit 154 (see FIG. 15).

That is, as shown in FIG. 7, learning in Thread 1 and learning in Thread 2 partially overlap in time. In this drawing, a learning segment 77 ends earlier than a learning segment 78. However, for example, depending on the time necessary for each learning, cases may occur in which the learning segment 78 ends earlier than the learning segment 77.

In this regard, if the determination in step S251 is not executed, and a separating matrix derived from the thread in which learning has ended later is treated as the latest separating matrix, a separating matrix W2 derived from Thread 2 is overwritten by a separating matrix W1 derived from Thread 1 which is obtained by learning with observed signals acquired at the earlier timing. Accordingly, to ensure that a separating matrix obtained with observed signals acquired at the later timing is treated as the latest separating matrix, the start timing of observed signals held in the observed-signal start/end timing holding unit 167 is compared with the charging start timing corresponding to the current separating matrix which is held in the observed-signal-charging-timing-information holding unit 154.

If it is determined in step S201 that the start timing of observed signals is earlier than the charging start timing corresponding to the current separating matrix, in other words, if it is determined that the separating matrix W obtained as a result of learning in this thread has been learned on the basis of signals observed at an earlier timing than those corresponding to the separating matrix W being currently held in the observed-signal-charging-timing-information holding unit 154, the separating matrix obtained as a result of learning in this thread is not used, and thus the separating-matrix updating process ends.

If it is determined in step S251 that the start timing of observed signals is not earlier than the charging start timing corresponding to the current separating matrix, that is, if it is determined that the separating matrix W obtained as a result of learning in this thread has been learned on the basis of signals observed at a later timing than those corresponding to the separating matrix W being currently held in the observed-signal-charging-timing-information holding unit 154, in step S252, the thread control unit 112 acquires the separating matrix W obtained by learning in the corresponding thread, and supplies the separating matrix W to the separating-matrix holding unit 113 (see FIG. 12) and sets the separating matrix W.

In step S253, the thread control unit 112 sets the initial value of learning in each of threads held in the learning-initial-value holding unit 152.

Specifically, as the learning initial value, the thread control unit 112 may set a separating matrix W obtained by learning in the corresponding thread, or may set a value different from a separating matrix W which is computed by using the separating matrix W obtained by learning in the corresponding thread. For example, the value obtained after resealing is applied (value obtained after "post-processing" in step S320 in the flow in FIG. 32 described later) is substituted into the separating-matrix holding unit 113 (see FIG. 12), and the value prior to the application of resealing is substituted into the learning-initial-value holding unit 152. Other examples will be described in the section of modifications later.

In step S254, the thread control unit 112 sets timing information held in the observed-signal start/end timing holding unit 167 (see FIG. 16) of the corresponding thread, in the charging-timing-information holding unit 154 (see FIG. 15), and ends the separating-matrix updating process.

Through the process in step S254, an indication is provided regarding from observed signals in what time segment the separating matrix W being currently used, that is, the separating matrix W held in the separating-matrix holding unit 113 has been learned.

Through such processing, a separating matrix obtained from observed signals acquired at the later timing is set as the latest separating matrix.

Figure 28:
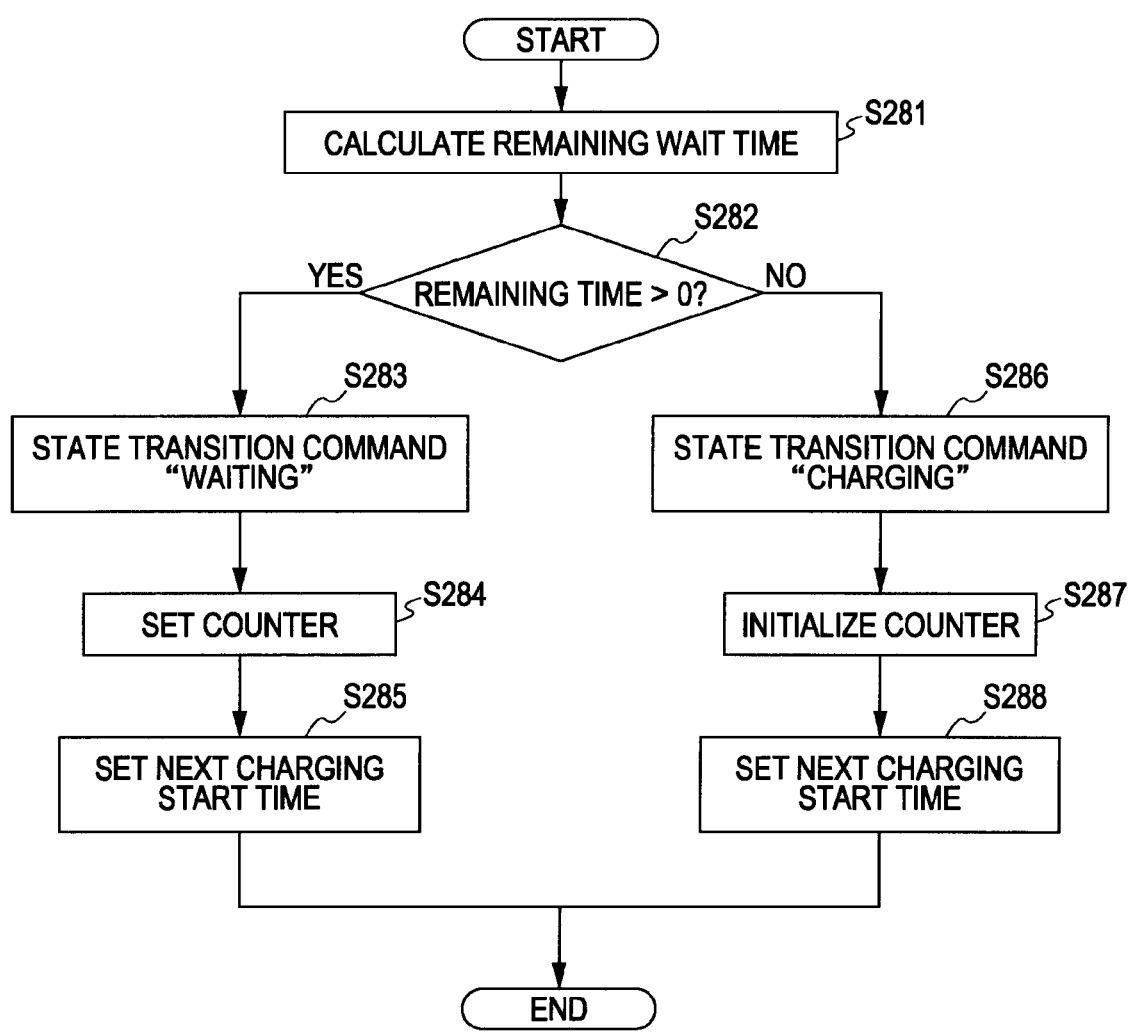
FIG. 28 is a diagram showing a flowchart illustrating a wait-time setting process that is executed in step S241 in the flowchart shown in FIG. 26.

Next, referring to the flowchart in FIG. 28, a description will be given of the wait-time setting process, which is executed in step S241 in the flowchart shown in FIG. 26.

In step S281, the thread control unit 112 calculates the remaining wait time.

Specifically, let rest represent the remaining wait time (number of frames), Ct represent the planned charging start timing (frame index or corresponding relative time) held in the planned-charging-start-timing-specifying-information holding unit 153 (see FIG. 15), Ft represent the current frame index held in the current-frame-index holding counter 151, and block_shift represent the block shift width. Then, the thread control unit 112 computes the remaining wait time rest as $$\text{rest}=Ct+\text{block\_shift}-Ft.$$

That is, since Ct+block_shift means the planned next charging start time, by subtracting Ft from this, the "remaining time until the planned next charging start time" is found.

In step S282, the thread control unit 112 determines whether or not the calculated remaining wait time rest is a positive value. If it is determined in step S282 that the calculated remaining wait time rest is not a positive value, that is, the calculated value is zero or a negative value, the process proceeds to step S286 described later.

If it is determined in step S282 that the calculated remaining wait time rest is a positive value, in step S283, the thread control unit 112 issues to the corresponding thread a state transition command for causing the state of the thread to transition to the "waiting" state.

In step S284, the thread control unit 112 sets the value of the counter 166 (see FIG. 16) of the corresponding thread to thread_len-rest. Thus, the "waiting" state is continued until the value of the counter reaches thread-len.

In step S285, the thread control unit 112 adds the value of block_shift to the value Ct held in the planned-charging-start-timing-specifying-information holding unit 153 (see FIG. 15), that is, sets the value of Ct+block_shift as the next charging start timing in the planned-charging-start-timing-specifying-information holding unit 153, and ends the remaining-wait-time calculating process.

If it is determined in step S282 that the calculated remaining wait time rest is not a positive value, that is, the calculated value is zero or a negative value, this means that charging has not started even through the planned charging start timing is passed, so it is necessary to start charging immediately. Accordingly, in step S286, the thread control unit 112 issues to the corresponding thread a state transition command for causing the state of the thread to transition to the "charging" state.

In step S287, the thread control unit 112 initializes the value of the counter (for example, sets the counter to 0).

In step S288, the thread control unit 112 sets the next charging start timing, that is, Ft indicating the current frame index, in the charging-start-timing-specifying-information holding unit 153, and ends the remaining-wait-time calculating process.

Through such processing, in accordance with the time necessary for the "learning state" in each thread, the time for which each thread is to be placed in the "waiting" state can be set.

According to an embodiment of the present invention, the thread control unit and each learning thread operate in parallel, and the learning thread is run on the basis of a flowchart different from that for the thread control unit. In the following, processing in the learning thread will be described with reference to the flowchart in FIG. 29.

The thread 111 is initialized in step S291. Then, in step S292, the thread 111 waits until an event occurs (blocks processing). (This "wait" is different from "waiting" which indicates one state of a learning thread). The event occurs when one of the following actions has been performed.

A state transition command has been issued.
Frame data has been transferred.
An end command has been issued.

The subsequent processing is branched in accordance with which event has occurred (step S293). That is, in accordance with the event inputted from the thread control unit 112, the subsequent process is branched.

If it is determined in step S293 that a state transition command has been inputted, the corresponding command processing is executed in step S294.

If it is determined in step S293 that an input of a frame data transfer event has been received, in step S295, the thread 111 acquires transfer data. Next, in step S296, the thread 111 charges the acquired frame data in the observed signal buffer 161 (see FIG. 16), returns to step S292, and waits for the next event.

The observed signal buffer 161 (see FIG. 16) has an array or stack structure, and observed signals are to be stored in a location of the same index as the counter.

If it is determined in step S293 that an end command has been inputted, in step S297, the thread 111 executes, for example, appropriate pre-termination processing such as freeing of the memory, and the process is ended.

Through such processing, processing is executed in each thread on the basis of control by the thread control unit 112.

Figure 29:
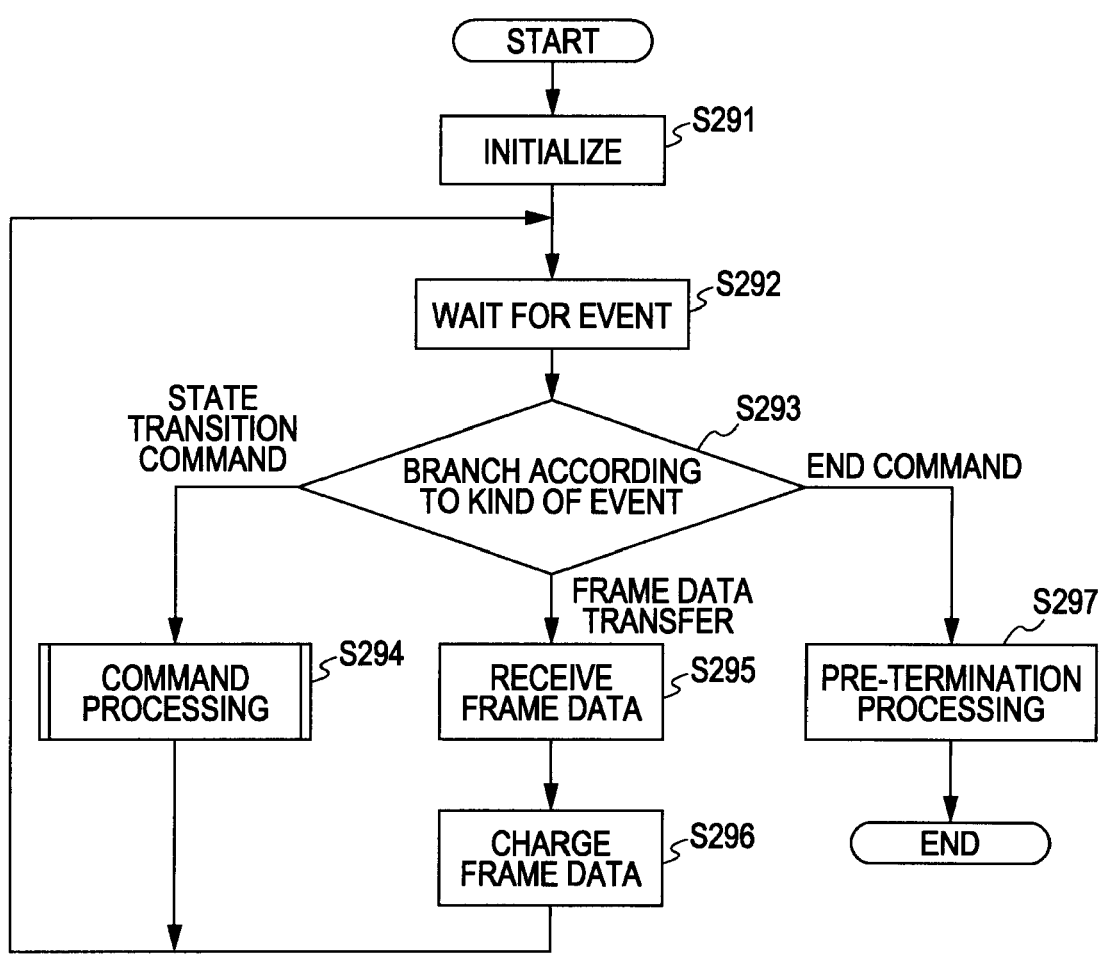
FIG. 29 is a diagram showing a flowchart illustrating processing in a learning thread.
Figure 30:
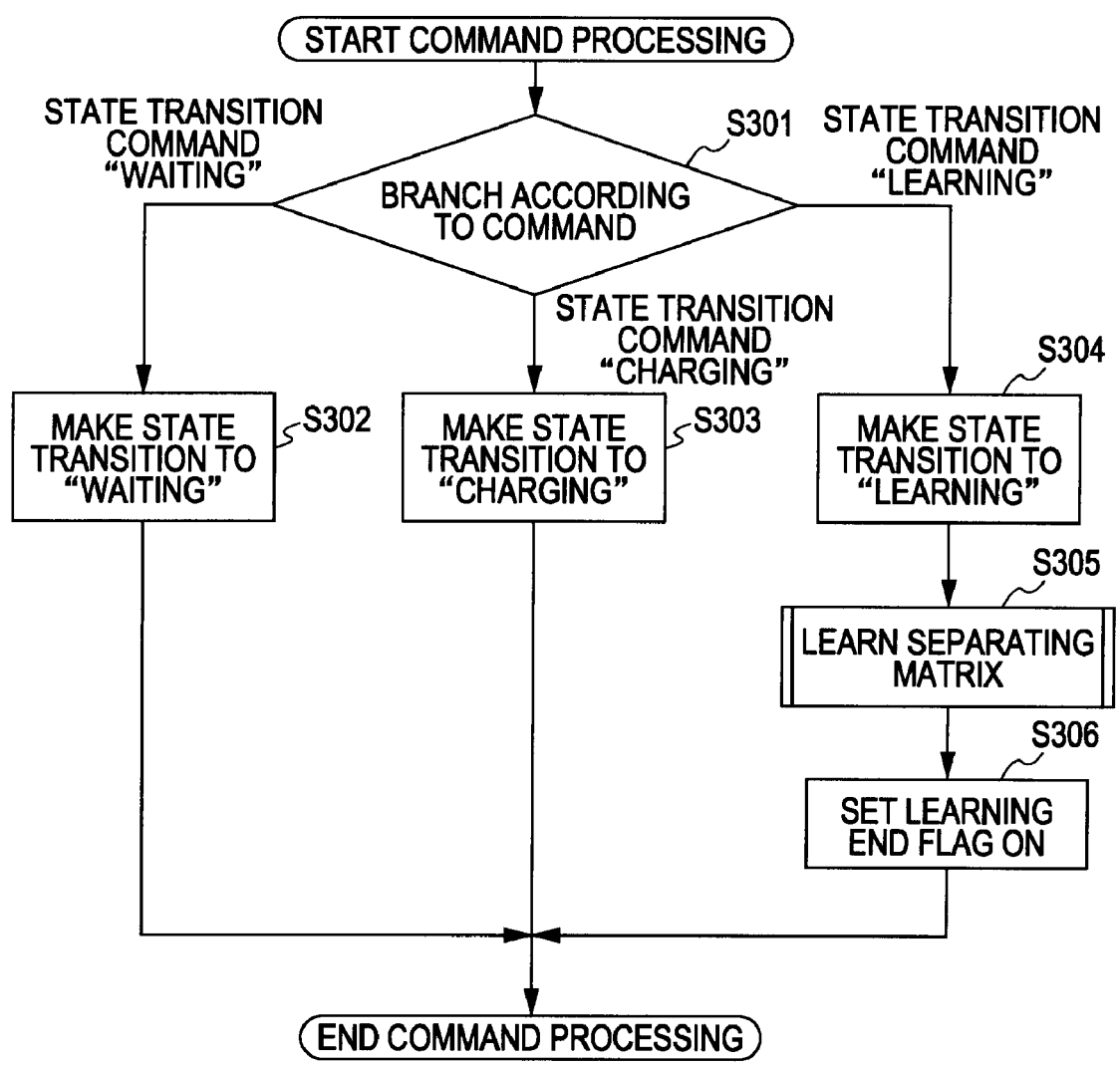
FIG. 30 is a diagram showing a flowchart illustrating command processing that is executed in step S294 in the flowchart shown in FIG. 29.

Next, referring to the flowchart in FIG. 30, a description will be given of the command processing which is executed in step S294 in the flowchart shown in FIG. 29.

In step S301, in accordance with a supplied state transition command, the thread 111 braches the subsequent processing. In the following description, a command instructing "transition to the XX state" will be expressed as "state transition command "XX"".

If, in step S301, the supplied state transition command is a "state transition command "waiting"" that instructs transition to the "waiting" state, in step S302, the thread 111 stores information indicating that the current state is "waiting" into the state storage unit 165 (see FIG. 16), that is, transitions in state to "waiting", and ends the command processing.

If, in step S301, the supplied state transition command is a "state transition command "charging"" that instructs transition to the "charging" state, in step S303, the thread 111 stores information indicating that the current state is "charging" into the state storage unit 165, that is, transitions in state to "charging", and ends the command processing.

If, in step S301, the supplied state transition command is a "state transition command "learning"" that instructs transition to the "learning" state, in step S304, the thread 111 stores information indicating that the current state is "learning" into the state storage unit 165, that is, transitions in state to "learning".

Further, in step S305, the thread 111 executes a separating-matrix learning process. Details of this process will be given later.

In step S306, to notify the thread control unit 112 of the end of learning, the thread 111 sets the learning end flag 1680N and ends the process. By setting the flag, the thread 111 notifies the thread control unit 112 to the effect that learning has just ended.

Through such processing, the state of each thread is made to transition on the basis of a state transition command supplied from the thread control unit 112.

Figure 31:
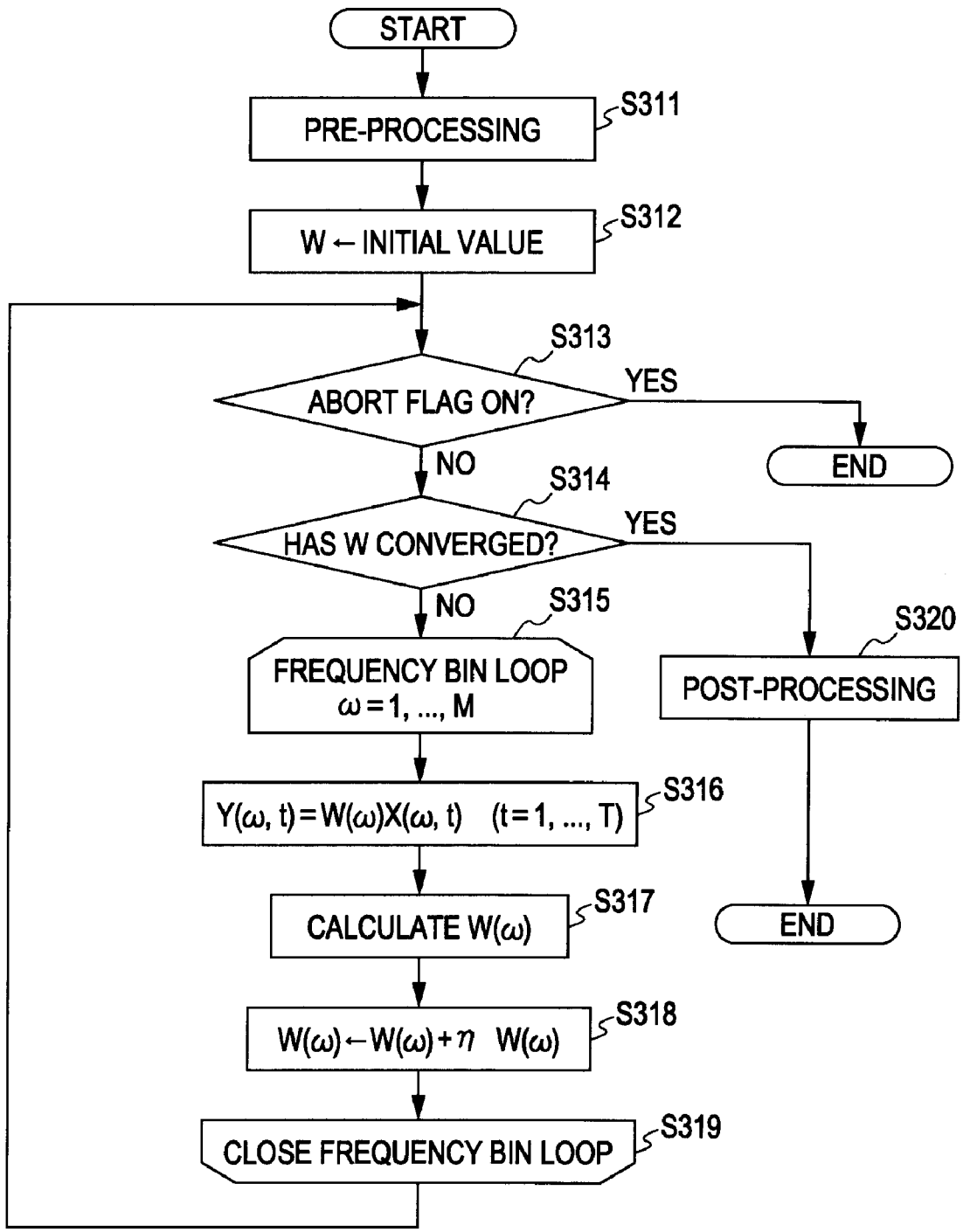
FIG. 31 is a diagram showing a flowchart illustrating an example of a separating-matrix learning process, which is an example of a process executed in step S305 in the flowchart shown in FIG. 30.

Next, referring to the flowchart in FIG. 31, a description will be given of an example of the separating-matrix learning process, which is an example of the process executed in step S305 in the flowchart shown in FIG. 30. This is a process of finding a separating matrix in batch, and is applicable to any algorithm in the form of batch processing. However, it is necessary to employ a scheme that is relatively permutation-free. In the following, a description will be given of an example that employs the configuration disclosed in Japanese Patent Application No. 2005-018822 "AUDIO SIGNAL SEPARATING APPARATUS/NOISE REMOVAL APPARATUS AND METHOD".

In step S311, as necessary, the learning computation unit 163 (see FIG. 16) of the thread 111 executes pre-processing on observed signals charged in the observed signal buffer 161.

Specifically, the learning computation unit 163 performs such processing as normalization or uncorrelation (or pre-whitening) on observed signals charged in the observed signal buffer 161. For example, when performing normalization, the learning computation unit 163 finds a standard deviation of observed signals with respect to each frequency bin within the observed signal buffer 161, and with the diagonal matrix formed by the inverse of the standard deviation defined as S, the learning computation unit 163 calculates X'=SX by Equation [9.1] below.

$$X'(t) = SX(t) \quad [9.1]$$

$$Y(t) = WX'(t) \quad [9.2]$$

$$Y'(t) = RY(t) = RWSX(t) = W'X(t) \quad [9.3]$$

$$\lambda_k(\omega) = \underset{\lambda_k(\omega)}{\operatorname{argmin}}\{E_t[|X'_k(\omega, t) - \lambda_k(\omega)Y_k(\omega, t)|^2]\} \quad [9.4]$$

$$= \frac{E_t[X'_k(\omega, t)\overline{Y_k(\omega, t)}]}{E_t[Y_k(\omega, t)\overline{Y_k(\omega, t)}]} \quad [9.5]$$

$$R = \operatorname{diag}([\lambda_1(1) \ldots \lambda_1(T) \mid \ldots \mid \lambda_n(1) \ldots \lambda_n(T)]) \quad [9.6]$$

X shown in the equation X'=SX denotes a matrix formed by observed signals of all the frames within the observed signal buffer 161. This is expressed as a matrix obtained by arranging X(t) shown in Equation [9.1] in the lateral direction with respect to t=1 to N, that is, X=[X(1), ..., X(T)] (T is the total number of frames, that is, the block length block_len). X that appears in the subsequent equations can also denote X' on which pre-processing has been performed.

Equation [9.2] is a relational expression of X', the separating matrix W, and the separated results Y.

The equations from Equation [9.3] and below will be described during description of a resealing process in the post-processing in step S320 described later.

In step S312, the learning computation unit 163 acquires, as the initial value of a separating matrix, a learning initial value W held in the learning-initial-value holding unit 152 of the thread control unit 112, from the thread control unit 112.

The processes from steps S313 to S319 represent a learning loop, and these processes are repeated until W converges or until the abort flag becomes ON. The abort flag is a flag that is set ON in step S236 in the flow of the learning-state process in FIG. 26 described above. The abort flag becomes ON when a learning started later ends earlier than a learning started earlier. If it is determined in step S313 that the abort flag is ON, the process is ended.

If it is determined in step S313 that the abort flag is OFF, the process proceeds to step S314. In step S314, the learning computation unit 163 determines whether or not the value of the separating matrix W has converged. Whether or not the value of the separating matrix W has converged is determined by using, for example, a matrix norm. ||W|| as the norm of the separating matrix W (the square sum of all the matrix elements), and ||ΔW|| as the norm of ΔW are calculated, and W is determined to have converged if the ratio between the two norms, ||ΔW||/||W||, is smaller than a predetermined value (for example, 1/1000). Alternatively, the determination may be simply made on the basis of whether or not the loop has been run a predetermined number of times (for example, 50 times).

If it is determined in step S314 that the value of the separating matrix W has converged, the process proceeds to step S320 described later, where post-processing is executed, and the process is ended. That is, the learning process loop is executed until the separating matrix W converges.

If it is determined in step S314 that the value of the separating matrix W has not converged (or if the number of times the loop is executed has not reached a predetermined value), the processing proceeds into the learning loop in steps S315 to S319. Learning is performed as a process of iterating Equations [4.1] to [4.3] described above for all frequency bins. That is, to find the separating matrix W, Equations [4.1] to [4.3] are iterated until the separating matrix W converges (or a predetermined number of times). This iteration is referred to as "learning". The separated results Y(t) are represented by Equation [4.4]

Step S316 corresponds to Equation [4.1].
Step S317 corresponds to Equation [4.2].
Step S318 corresponds to Equation [4.3].

Since Equations [4.1] to [4.3] are to be computed for each frequency bin, by running a loop with respect to frequency bins in steps S315 and S319, ΔW is found for all frequency bins.

After the above loop process ends, the process returns to step S313 to perform the determination with regard to the abort flag, and the determination of the convergence of the separating matrix in step S314. The process is ended if the abort flag is ON. If convergence of the separating matrix is confirmed in step S314 (or a specified number of loops has been reached), the process proceeds to step S320.

In step S320, the following processes are executed as post-processing.

(1) Making the separating matrix correspond to the observed signals prior to normalization.

(2) Adjusting the balance between frequency bins (resealing).

First, a description will be given of the process of (1) making the separating matrix correspond to the observed signals prior to normalization.

In a case where normalization has been performed as pre-processing, the separating matrix W found by the above-described processes (steps S315 to S319 in FIG. 31) is not equivalent to that obtained by separating the observed signals X prior to normalization, but is a separating matrix obtained by separating the observed signals X' obtained after normalization. Accordingly, the separating matrix W found by the above-described processes is corrected so as to be transformed into one equivalent to that obtained by separating the observed signals X prior to normalization. Specifically, by using the matrix S applied at the time of normalization, a correction may be performed such that W←Ws.

Next, a description will be given of the process of (2) adjusting the balance between frequency bins (resealing).

Depending on the ICA algorithm, the balance (scale) between frequency bins of the separated results Y differs from the expected one of the source signals in some cases. In such cases, the scale of frequency bins is corrected in post-processing. Thus correction is referred to as resealing.

Rescaling is performed by finding a correction matrix R, which is contained in Equation [9.3] indicated as an expanded form of Equation [9.1] described above with reference to the pre-processing (step S311) such as normalization on the observed signals X, by using Equation [9.6], and then multiplying the separating matrix W by the correction matrix R (diag(·) in Equation [9.6] denotes a diagonal matrix with a given vector on its diagonal). That is, W←RW is performed. It should be noted, however, that $\lambda_k(\omega)$ in Equation [9.6] is a value that makes the value in brackets of [arg min] on the right-hand side of Equation [9.4] minimum, which is specifically calculated by Equation [9.5]. ($E_t[\ ]$ denotes the mean over all frames within the block.)

The above two corrections can be summarized as in Equation [9.3]. Thus, as post-processing combining both the corrections, a correction W←RWS may be performed.

With this processing, the separating-matrix learning process ends (28-11).

In step S317, while Equation [4.2] is used as an equation based on the natural gradient method, alternatively, it is also possible to use Equation [4.13] representing a learning rule based on an algorithm called "Equi-variant Adaptive Separation via Independence" (EASI). An equation of EASI algorithm has a form that combines the gradient method and uncorrelation, and characteristically, converges faster than Equation [4.2] that is based on the natural gradient method. For details about the EASI algorithm itself, reference should be made to the section "12. 5 Equi-variant Adaptive Separation via Independence" in "Explanation of Independent Component Analysis" (Tokyo Denki University Press) or the like.

Although three terms containing $E_t[\ ]$ appear in Equation [4.13], the complexity can be reduced by the following equation transformations. $E_t[Y(\omega, t)Y(\omega, t)^H]$ as the first term can be transformed as Equation [4.14]. $E_t[X(\omega, t)X(\omega, t)^H]$ in Equation [4.14] is calculated only once in the beginning (for example, calculated in step S311) since it is constant within the loop, and within the loop, it suffices to perform only an operation of multiplying $E_t[X(\omega, t)X(\omega, t)^H]$ from left and right with W(ω) and W(ω)$^H$. On the other hand, the third term $E_t[Y(\omega, t)\phi(Y(t))^H]$ can be transformed as Equation [4.15]. This indicates that the third term can be also obtained by performing the Hermitian transpose after calculating the second term.

In addition, an EASI algorithm has a characteristic such that $E_t[Y(\omega, t)Y(\omega, t)^H]=1$ holds upon convergence. That is, $E_t[|Y_k(\omega, t)|^2]=1$ holds for orthogonal elements of $E_t[Y(\omega, t)Y(\omega, t)^H]$, and 0 for other elements. By exploiting this property, when the scale of W(ω) is adjusted within the loop so as to satisfy $E_t[|Y_k(\omega, t)|^2]=1$, the convergence speed can be made faster. Specifically, after executing step S316, the operation of Equation [4.16] is performed with respect to Y(ω, t), and the operation of Equation [4.17] is performed with respect to W(ω). It should be noted that diag( ) denotes an orthogonal matrix with its diagonal components given in parentheses. By performing these operations, $E_t[Y((\omega, t)Y(\omega, t)^H]=1$ comes to hold within a small number of loops.

Next, a description will be given of the sound source direction estimating process executed in step S109 in the flowchart shown in FIG. 19, with reference to the flowchart in FIGS. 32 and 33. This sound source direction estimating process is executed in the sound source direction estimating unit 125 shown in FIG. 12.

As described above, in an embodiment of the present invention, a process is performed in which, in a segment containing the current time, cross-covariance matrices are calculated between observed signals and the separated results, and the sound source direction is calculated by using the cross-covariance matrices instead of a separating matrix. The cross-covariance matrices $\Sigma_{XY}(\omega)$ are represented by Equation [6.1] described above.

Figure 32:
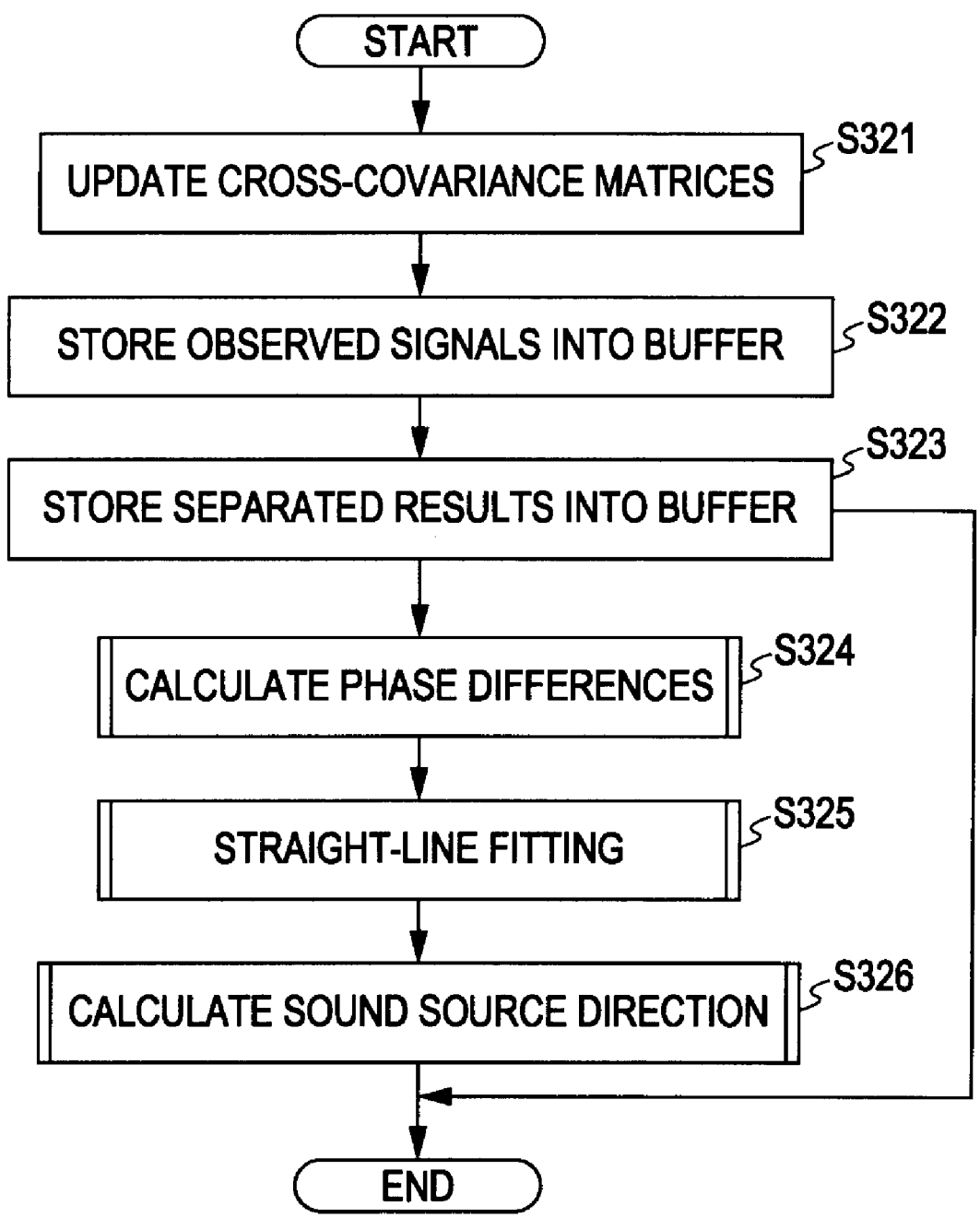
FIG. 32 is a diagram showing a flowchart illustrating a sound source direction estimating process that is executed in step S109 in the flowchart shown in FIG. 19.

The flowchart shown in FIG. 32 corresponds to the process in FIG. 13 described above. That is, the flowchart represents a process flow in a case when cross-covariance matrices are calculated from the observed signals X and the separated results Y (Equation [6.1]).

Figure 33:
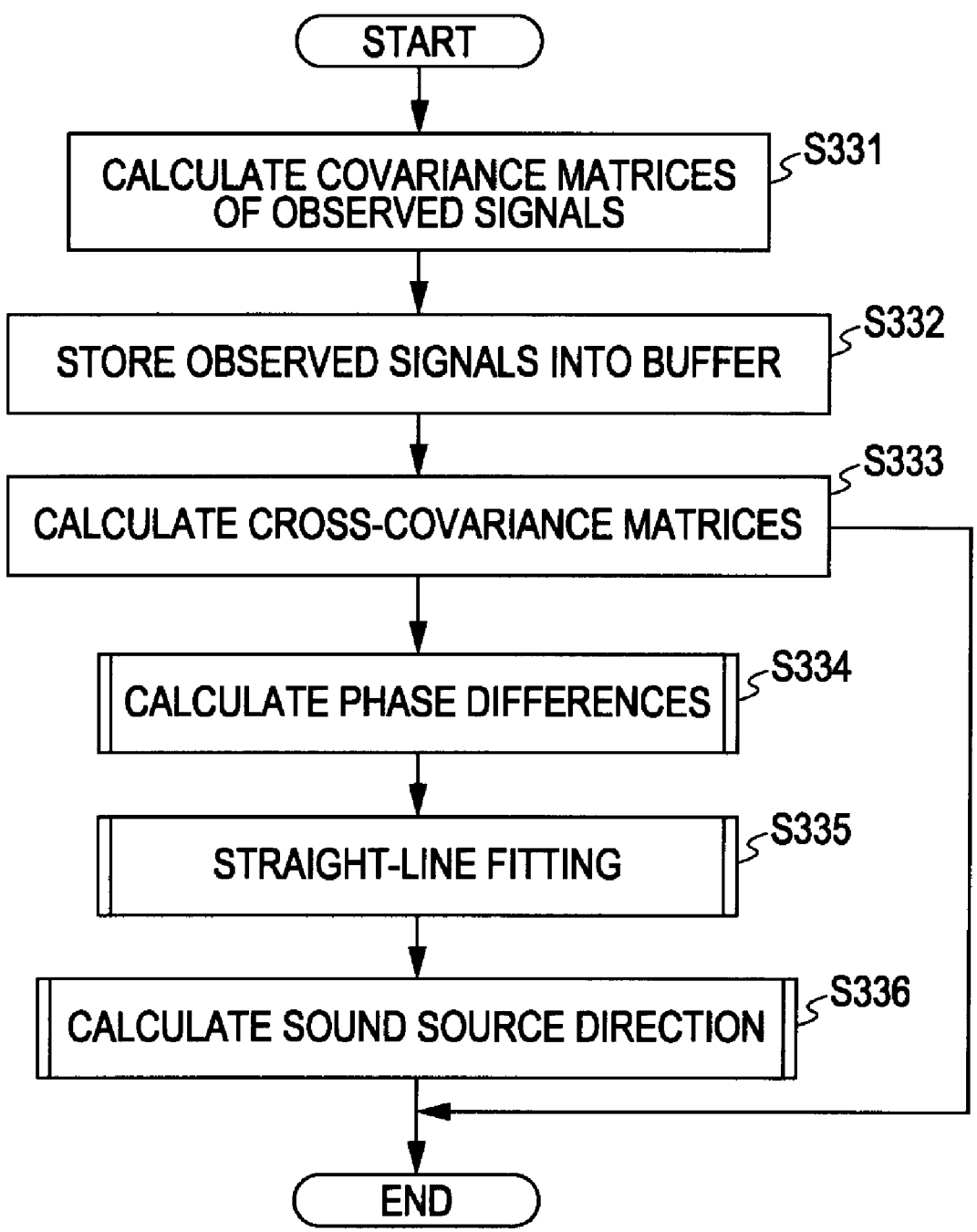
FIG. 33 is a diagram showing a flowchart illustrating a sound source direction estimating process that is executed in step S109 in the flowchart shown in FIG. 19.

The flowchart shown in FIG. 33 corresponds to the process in FIG. 14 described above. That is, the flowchart represents a process flow in a case when cross-covariance matrices are calculated from observed signals X and the separating matrix W (Equation [6.5]).

First, referring to the flowchart in FIG. 32, a description will be given of a sound source direction estimating process sequence in the case of employing a scheme that calculates cross-covariance matrices from observed signals and the separated results. This process represents a process sequence corresponding to the configuration described above with reference to FIG. 13.

First, in step S321, the cross-covariance matrices between observed signals and the separated results are updated. Specifically, by using the following four vectors of observed signals X(ω, t) received from the Fourier transform unit 126 (see FIG. 12), separated results Y(ω, t) received from the separating unit 127, observed signals X(ω, t–L) received from the observed signal buffer 133 (see FIG. 13), and separated results Y(ω, t–L) received from the separated result buffer 134, cross-covariance matrices $\Sigma_{XY}(\omega)$ are calculated by Equation [6.10] mentioned above. This process is performed for all frequency bins (ω=1, ..., M).

Next, in step S322, observed signals X(t) are stored into the observed signal buffer 133 (see FIG. 13). At that time, X(t) is written over an area in which X(t–L) has been stored. Next, in step S323, likewise, the separated results are stored into the separated result buffer 134.

Next, the following processes are performed:
phase difference calculation in step S324;
straight-line fitting process in step S325; and
sound source direction calculation in step S326.

While these processes from steps S324 to S326 may be performed on a frame by frame basis, depending on the intended application, the frequency of performing these processes may be once every several frames. When skipping these processes, the sound source direction estimating process is ended.

The phase difference calculation in step S324 is a process of generating the plot shown in FIGS. 10A and 10B with respect to all channels and all microphone pairs. Details of this process will be given later.

The straight-line fitting process in step S325 is a process of finding the best fitting straight line while unwrapping the phase angle at each point, with respect to the plot shown in FIGS. 10A and 10B, for example. Alternatively, as shown in FIGS. 11C and 11D, the straight-line fitting process is also a process of finding the best fitting cosine and sine curves with respect to the plot. Details of this process will be given later.

Figure 35:
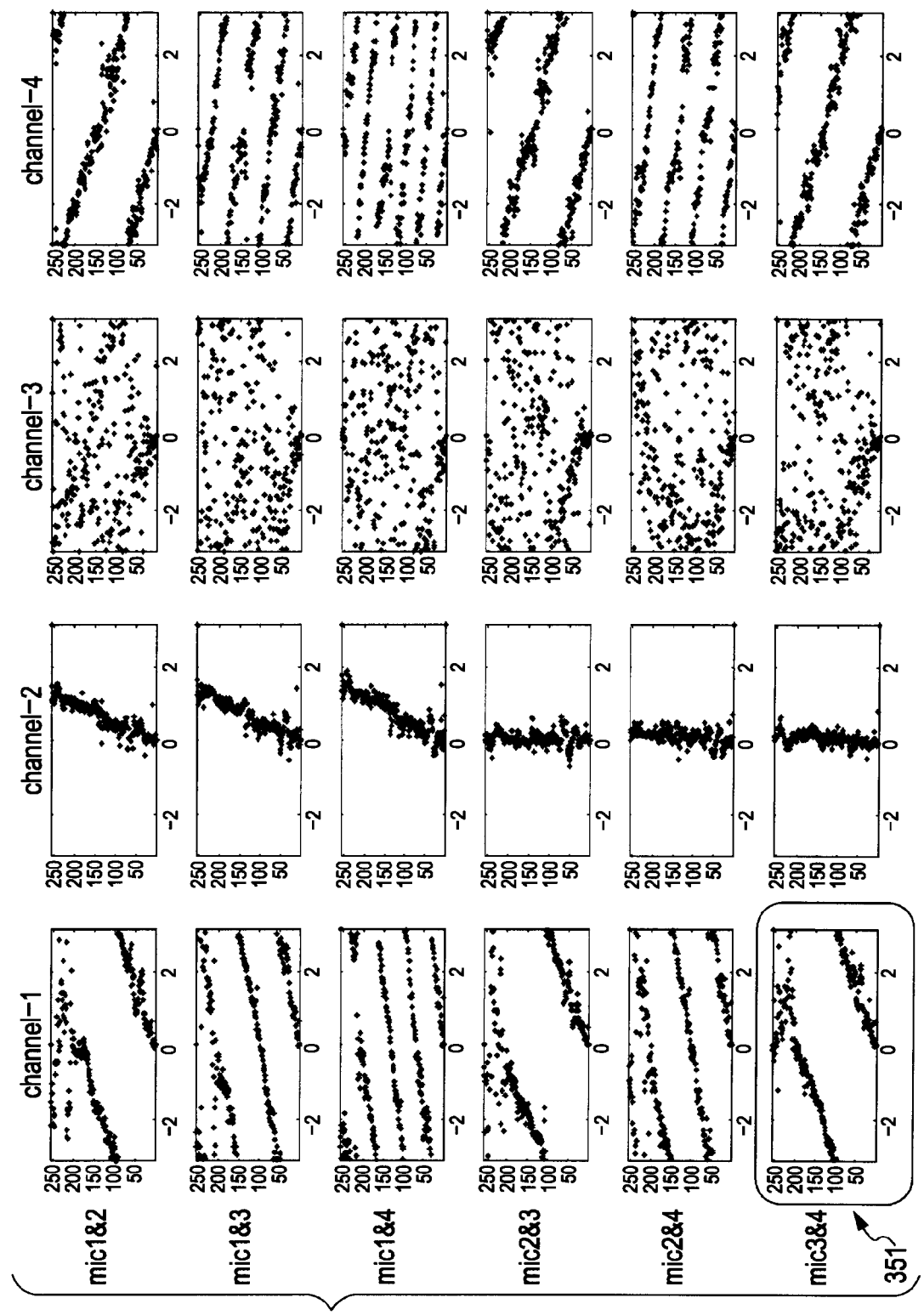
FIG. 35 is a diagram illustrating examples of data generated as a result of the processing of the flow shown in FIGS. 34A and 34B.
Figure 41:
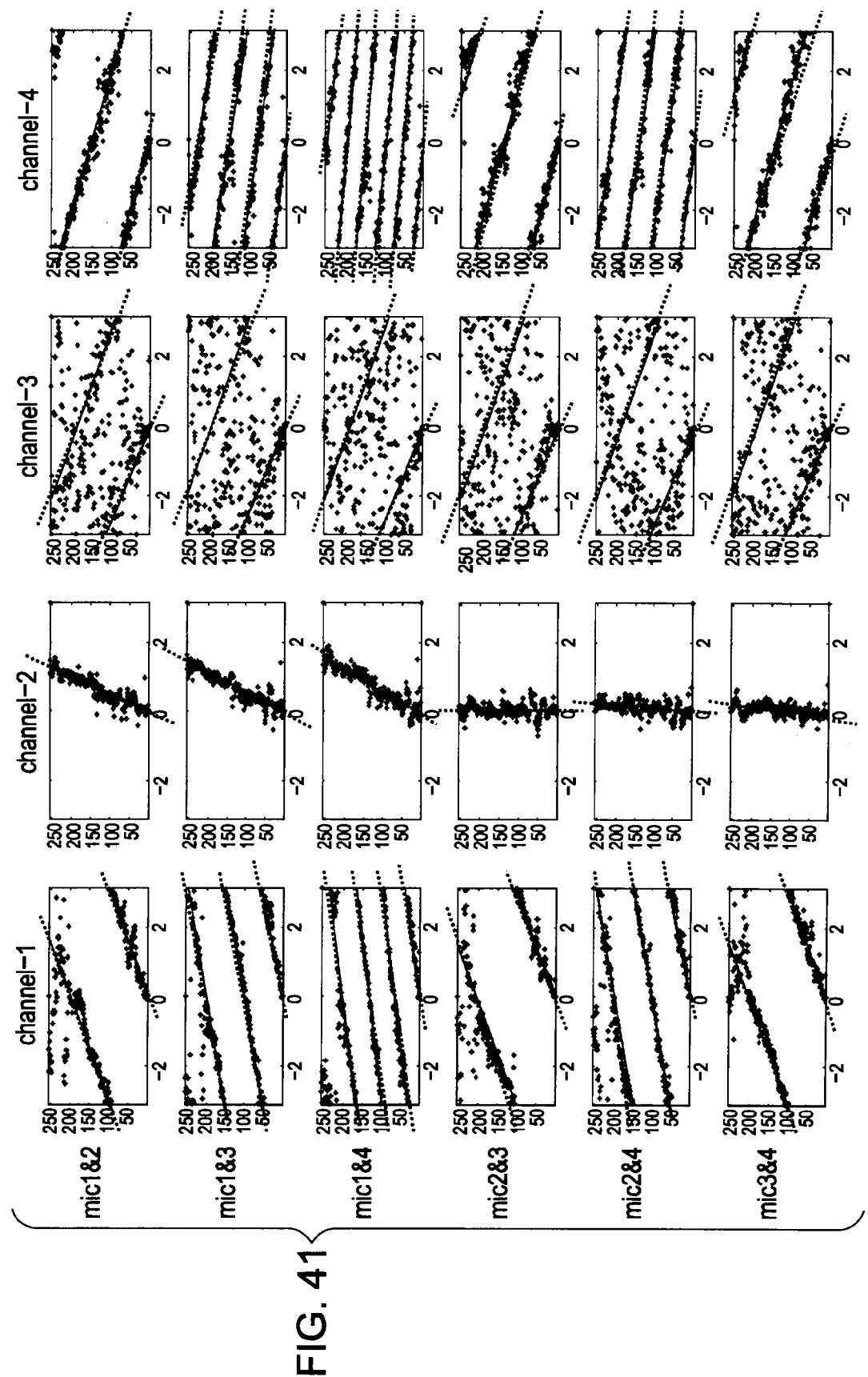
FIG. 41 is a diagram showing examples of the results of straight-line fitting performed by using the plot data shown in FIG. 35.

As a result of straight-line fitting, for example, straight lines shown in FIG. 41 are obtained from the plots of phase angle shown in FIG. 35. In FIG. 41, each straight line obtained as a result of straight-line fitting is indicated by a dotted line. In the drawing, for clearly indicating the straight lines, each straight line is depicted as extending off the left and right or the top and bottom of the plot diagram.

As a result of straight-line fitting, as the slope of the straight line, hat($K_{imk}$) in Equation [8.3] described above is estimated. Lastly, in step S327, the sound source direction for each sound source is calculated from hat($K_{imk}$). Details of this process will be also given later.

Next, another processing example of sound source direction estimating process will be described with reference to the flowchart in FIG. 33. The flow in FIG. 33 represent a scheme for calculating cross-covariance matrices from the covariance matrices of observed signals and the Hermitian transpose of a separating matrix. This process corresponds to the configuration in FIG. 14 described above.

First, in step S331, the covariance matrices of observed signals are updated. Specifically, covariance matrices $\Sigma_{XY}(\omega)$ are computed by the operation of Equation [6.11] mentioned above, by using observed signals X(ω, t) received from the Fourier transform unit 126 (see FIG. 12), and temporally preceding observed signals X(ω, t–L) extracted from the observed signal buffer 133 (see FIG. 13). This process is performed for all frequency bins (ω=1, ..., M).

Next, in step S332, observed signals X(t) are stored into the observed signal buffer 143 (see FIG. 14). At that time, X(t) is written over an area in which X(t–L) has been stored.

Next, in step S333, cross-covariance matrices are calculated. Specifically, cross-covariance matrices $\Sigma_{XY}(\omega)$ are computed by the operation of Equation [6.5] mentioned above, by using the covariance matrices $\Sigma_{XY}(\omega)$ updated in step S331, and the latest separating matrix W(ω) held in the separating-matrix holding unit 113 of the learning processing unit 110. This process is performed for all frequency bins (ω=1, ..., M).

Next, the following processes are performed:
phase difference calculation in step S334;
straight-line fitting process in step S335; and
sound source direction calculation in step S336.

While these processes from steps S334 to S336 may be performed on a frame by frame basis, depending on the intended application, the frequency of performing these processes may be once every several frames. When skipping these processes, the sound source direction estimating process is ended.

Next, referring to the flowchart in FIGS. 34A and 34B, a detailed description will be given of the "phase difference calculation" in step S324 in the flowchart in FIG. 32, and step S334 in the flowchart in FIG. 33.

In step S341, an area for storing the results is secured as necessary.

Steps S342 to S348 represent a loop with respect to frequency bin. While varying the frequency bin ω from 1 to M, steps S343 to S347 are repeated. (It should be noted, however, that when the system used is capable of parallel processing, parallel processing may be performed. The same applies to the channel loops or microphone pair loops in the following description).

Steps S343 to S347 represent a loop with respect to channels (estimated sound sources, that is, separated results). For example, if there are four channels, the loop is repeated for all the channels from channel-1 to channel-4.

Steps S344 to S346 represent a loop with respect to microphone pair. If the indexes of the two microphones are and m, the loop is executed n(n–1)/2 times from (i,m)=(1,2) to (i,m)=(n–1,n). This loop can be also expressed as a dual loop as in steps S351 to 354 shown in FIG. 34B.

Inside the loop, the ratio between the elements $\sigma_{ik}(\omega)$ and $\sigma_{mk}(\omega)$ of the cross-covariance matrices $\Sigma_{XY}$ is calculated by Equation [8.1] described above, and the calculated element ratio is stored into the area secured in step S341. As necessary, other than the element ratio, the phase angle of the element ratio is also calculated in accordance with Equation [8.9]. When these operations are performed with respect to all microphone pairs, all channels, and all frequency bins, the calculation of phase difference is completed.

Figure 34A:
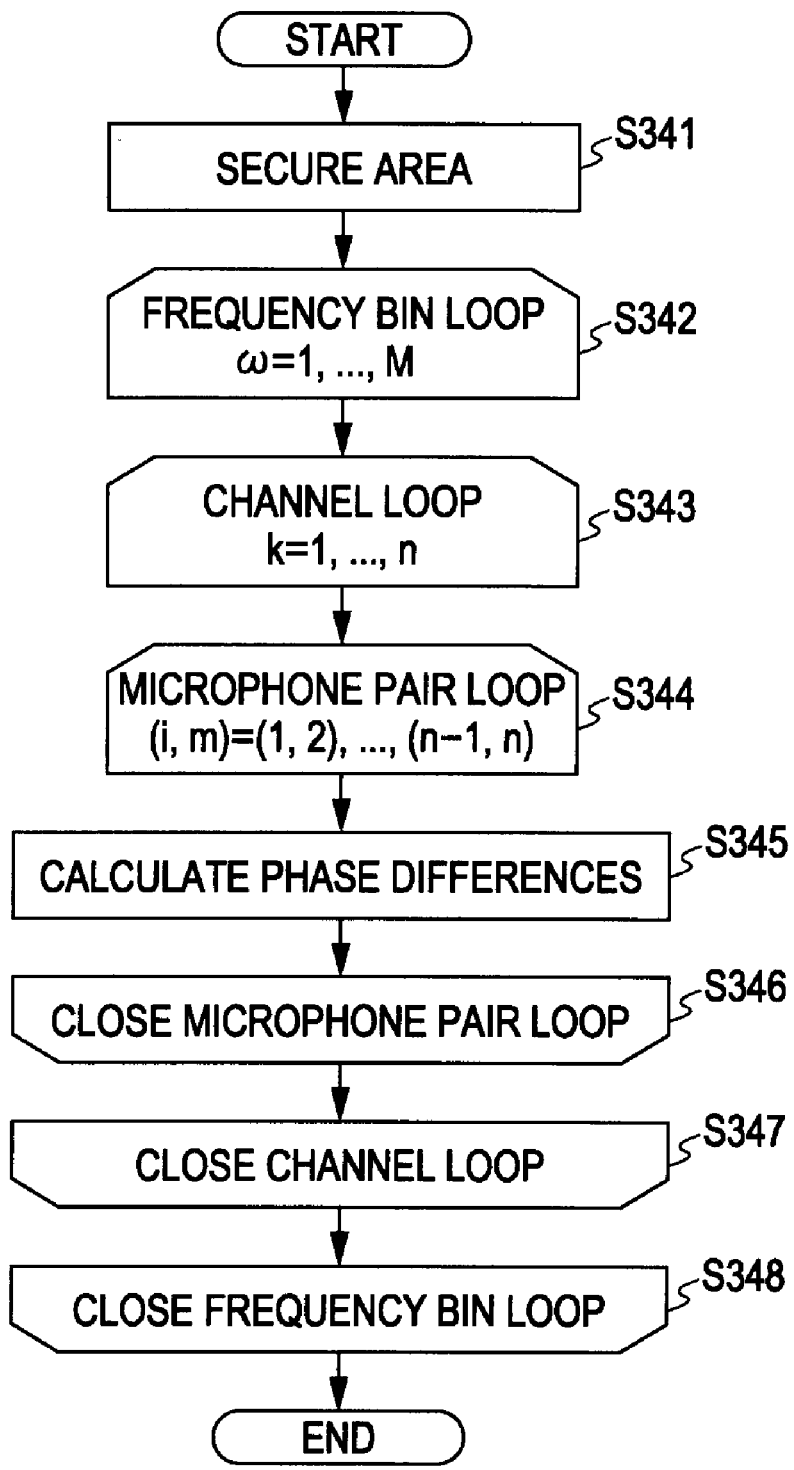
FIGS. 34A and 34B are diagrams respectively showing a flowchart illustrating the details of "phase difference calculation" in step S324 in the flowchart in FIG. 32, and step S334 in the flowchart in FIG. 33.
Figure 34B:
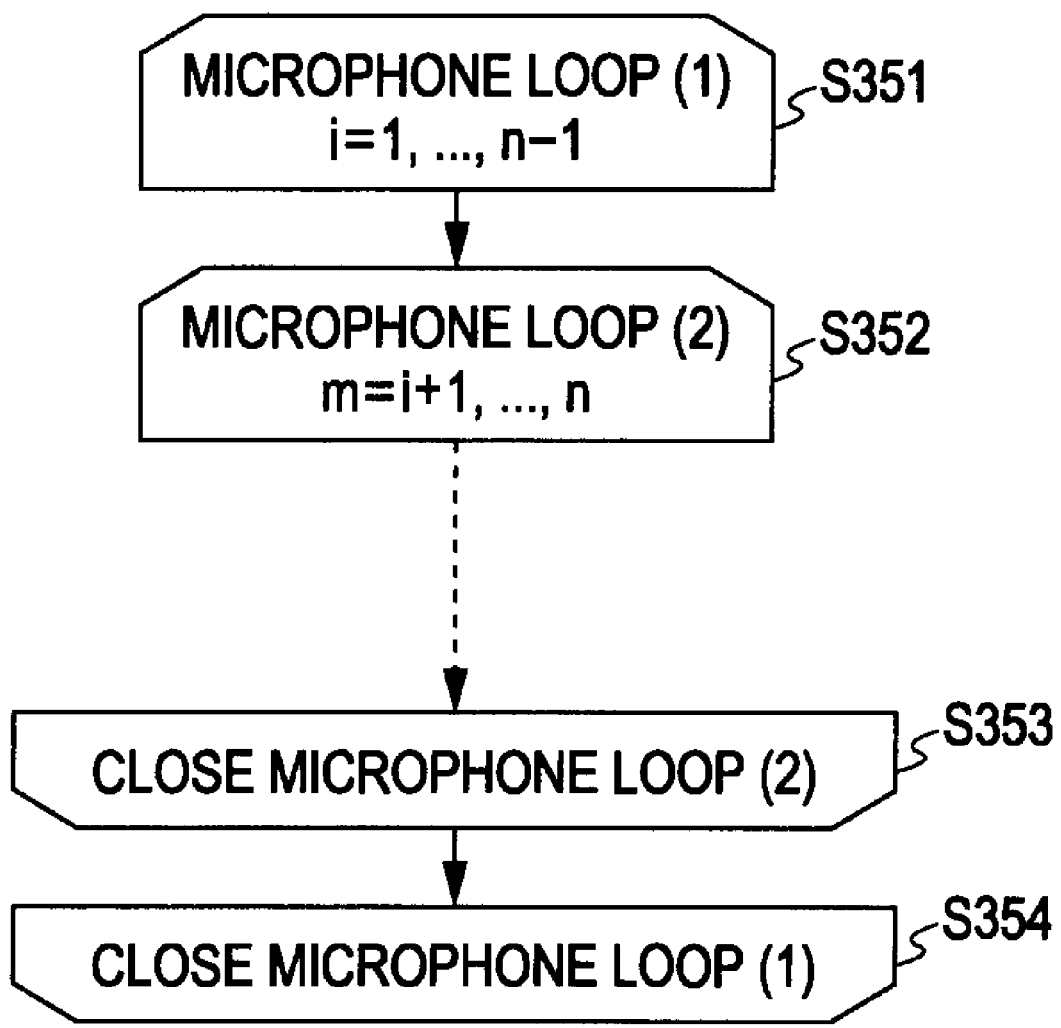

While the microphone pair loop is performed with respect to all microphone combinations in the flowchart in FIGS. 34A and 34B, alternatively, the microphone pair loop may be performed only with respect to limited microphone pairs. For example, the microphone pair loop may be performed only with respect to n–1 pairs of (i,m)=(1,2), (2,3), ..., (n–1,n), or n–1 pairs of (1,2), (1,3), ..., (1,n). If microphones with identified and unidentified positions or spacings are mixed among a plurality of microphones, the loop may be run only with respect to those pairs with identified inter-microphone distances. In the case of the "microphone pair loops" that appear in the flowcharts in the following description as well, the loop may be performed with respect to limited pairs.

The calculation of phase difference described in this flow is, for example, a process of generating the plot shown in FIGS. 10A and 10B with respect to all channels and all microphone pairs. For example, if the number of microphones is four, and the number of channels is four, then, as a result of the processing of the flow shown in FIGS. 34A and 34B, data shown in FIG. 35 is generated.

The data shown in FIG. 35 represents 24 diagrams in which plots for Channels 1 to 4 as a plurality of estimated sound sources with respect to six combinations of two microphones (Microphones 1 and 2, 1 and 3, 1 and 4, 2 and 3, 2 and 4, and 3 and 4) selected from four microphones, Microphones 1 to 4, are set. In these diagrams, phase angle is plotted with respect to $r_{imk}(\omega)$ calculated from cross-covariance matrices. The vertical axis indicates the frequency bin $\omega$, and the horizontal axis indicates the phase angle. Points are aligned substantially linearly. As described above with reference to FIGS. 10A and 10B, since the phase angle angle( ) can be identified only within a range of $2\pi$ (in this drawing, $-\pi$ to $\pi$), "jumpsT" of values exist between $-\pi$ and $\pi$.

Next, referring to the flowchart in FIG. 36, a detailed description will be given of the "straight-line fitting" in step S325 in the flowchart in FIG. 32, and step S335 in the flowchart in FIG. 33.

Figure 36:
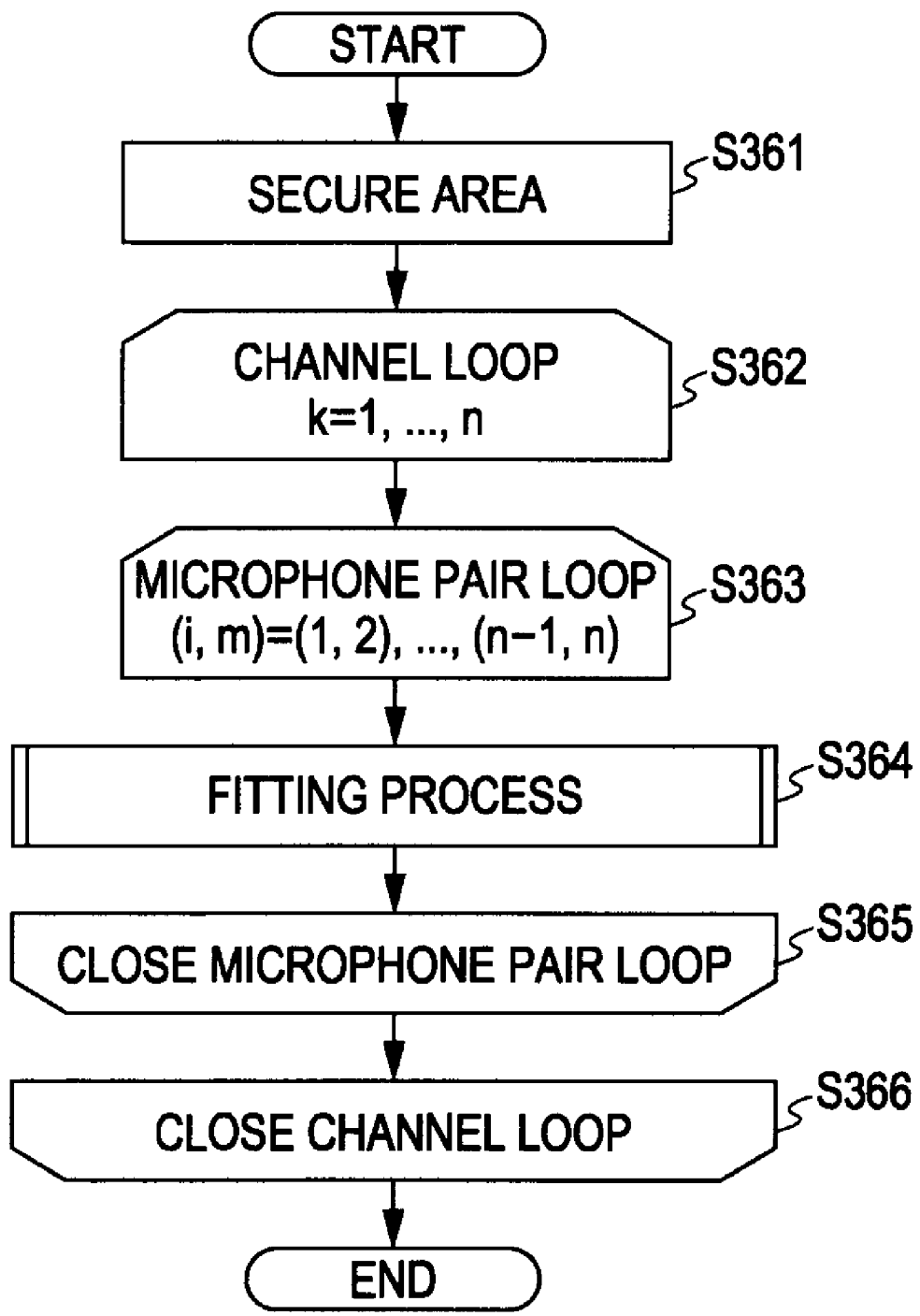
FIG. 36 is a diagram showing a flowchart illustrating the details of "straight-line fitting" in step S325 in the flowchart in FIG. 32, and step S335 in the flowchart in FIG. 33.

The flowchart shown in FIG. 36 is a schematic representation, and indicates that the fitting process in step S364 with respect to a single plot (for example, a single piece of plot data 351 shown in FIG. 35) is performed with respect to all microphone pairs (corresponding to the vertical direction in FIG. 35) in steps S363 to S365, and further with respect to all channels (corresponding to the horizontal direction in FIG. 35) in steps S362 to S366.

While various kinds of algorithm are conceivable as the algorithm for performing the fitting process in step S364, here, a description will be given of the following three kinds.

(1) Recursive Method
(2) Linear Search Method
(3) Hybrid Method

The following provides descriptions of the respective techniques.

(1) Recursive Method

The recursive method is a scheme in which a slope $K_{imk}$ is found while unwrapping the phase angle $\alpha_{imk}(\omega)$ expressed by Equation [8.9] mentioned above, in order from low frequency bins. Details of the recursion will be described with reference to FIGS. 37 and 38.

Figure 37:
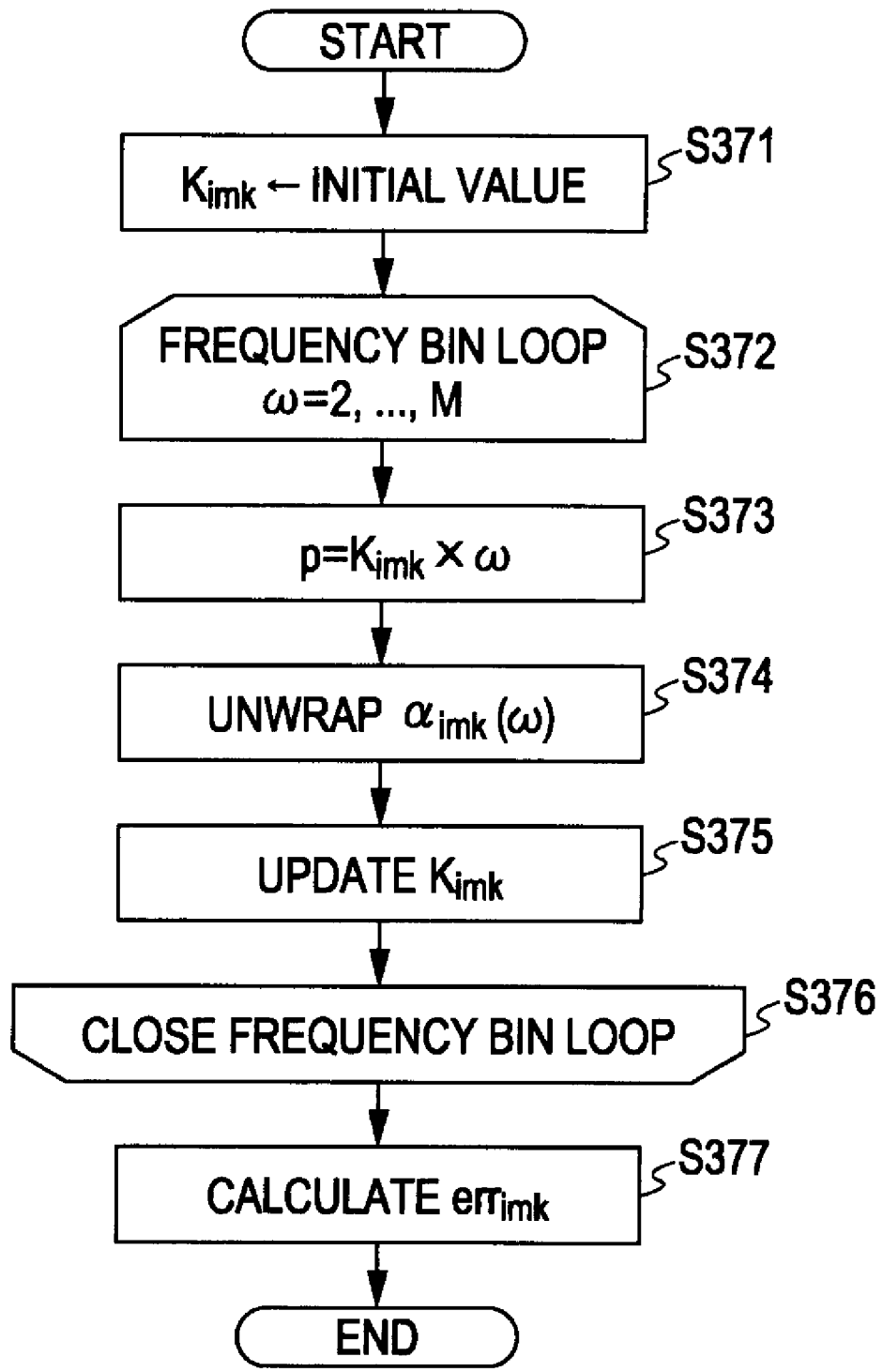
FIG. 37 is a diagram showing a flowchart illustrating the sequence of a (straight-line) fitting process performed by a recursive method.

FIG. 37 is a flowchart illustrating the sequence of a (straight-line) fitting process performed by the recursive method. In the flow shown in FIG. 37, $K_{imk}$ is a variable that stores not only the final slope but also a mid-process value of slope. In step S371, an appropriate initial value is substituted into the slope $K_{imk}$ in advance.

The initial value may be 0, which corresponds to a vertically oriented straight line in the case of FIGS. 10A and 10B and FIG. 35. If a slope obtained in the previous frame is saved, the slope may be used as well.

Steps S372 to S376 represent a frequency bin loop. However, since the phase angle at $\omega=1$ as a direct-current component is fixed as 0, the loop starts from $\omega=2$.

Steps S373 to S375 are a recursive process. That is, in a state with the value of $K_{imk}$ (value in the mid-processing stage) found by using phase angles in frequency bins 2 to $\omega-1$, the value of $K_{imk}$ is updated while unwrapping the phase angle in the $\omega$-th frequency bin.

Figure 38:
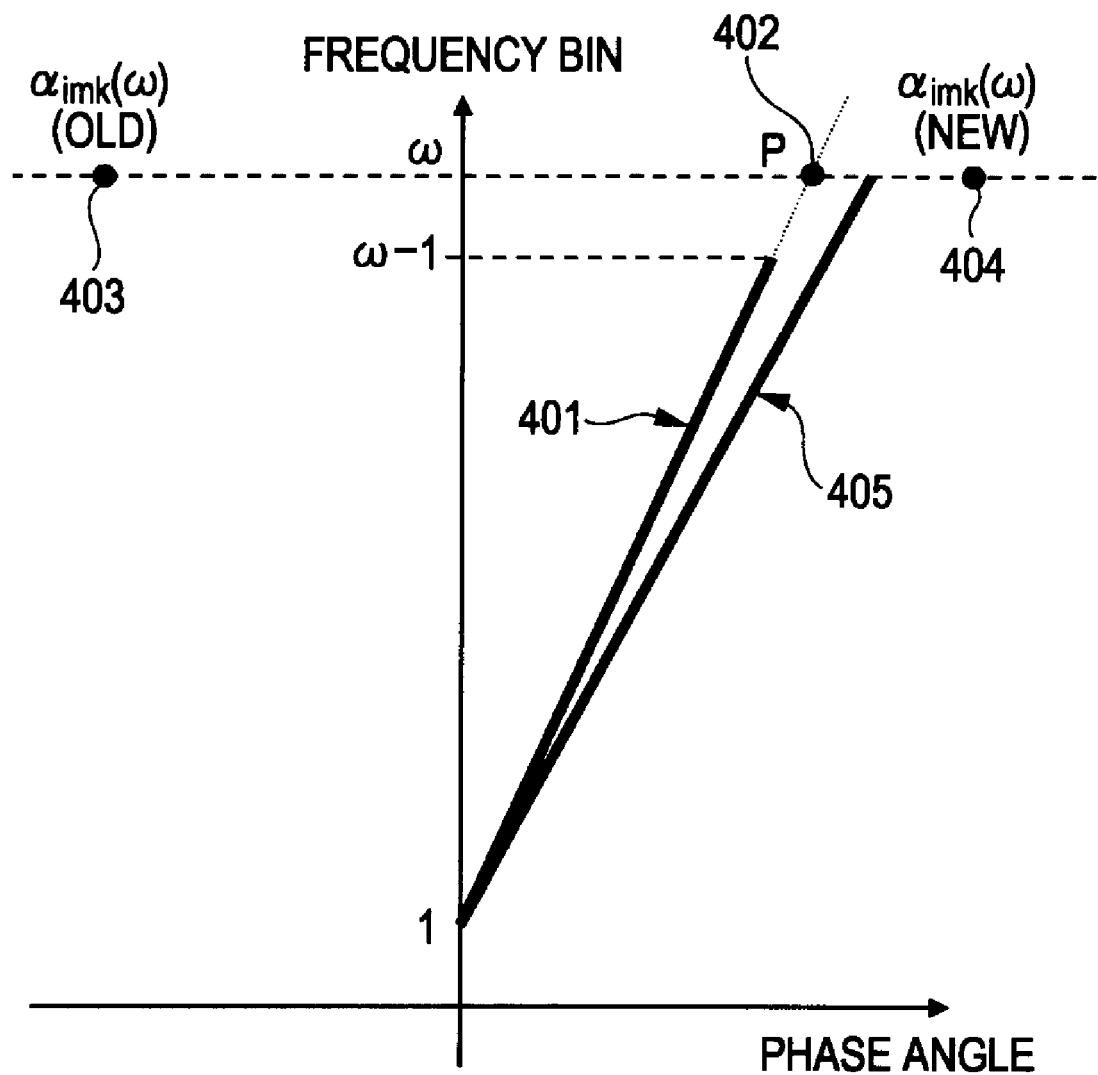
FIG. 38 is a diagram illustrating a (straight-line) fitting process based on a recursive method.

Step S373 means that a straight-line fitted through frequency bins 2 to $\omega-1$ (straight-line 401 in FIG. 38) is extended to the $\omega$-th frequency bin (point P402 in FIG. 38). The point to which the straight line is extended is indicated by an uppercase character P, and its phase angle is indicated by a lowercase character p.

The unwrap in step S374 is a transform process from FIG. 10A to FIG. 10B described above with reference to FIGS. 10A and 10B. That is, the unwrap is a process of adding $2N\pi$ (N is an integer) to the phase angle $\alpha_{imk}(\omega)$ at the frequency bin $\omega$ so that the phase angle becomes maximally close to the point P. Specifically, the operation of Equation [10.2] may be performed after finding the value of N that satisfies Equation [10.1] below.

$$N = \underset{N}{\mathrm{argmin}} |\alpha_{imk}(\omega) + 2N\pi - (\omega-1)K_{imk}| \qquad [10.1]$$

$$\alpha_{imk}(\omega) \leftarrow \alpha_{imk}(\omega) + 2N\pi \qquad [10.2]$$

$$K_{imk} \leftarrow \frac{1}{\omega-1}\left\{\sum_{f=2}^{\omega-1}\frac{\alpha_{imk}(f)}{f-1} + \frac{\alpha_{imk}(\omega)}{\omega-1}\right\} \qquad [10.3]$$

$$K_{imk} \leftarrow \frac{1}{\omega-1}\left\{(\omega-2)K_{imk} + \frac{\alpha_{imk}(\omega)}{\omega-1}\right\} \qquad [10.4]$$

$$K_{imk} \leftarrow \frac{1}{\omega+\beta}\left\{(\omega-1+\beta)K_{imk} + \frac{\alpha_{imk}(\omega)}{\omega-1}\right\} \qquad [10.5]$$

In FIG. 38, the phase angle $\alpha_{imk}(\omega)$ prior to unwrapping is indicated as a point [$\alpha_{imk}(\omega)$ (old)] 403, and the phase angle after unwrapping is indicated as a point[$\alpha_{imk}(\omega)$ (new)] 404.

Next, in step S375, the slope $K_{imk}$ is updated while reflecting the value of the phase angle $\alpha_{imk}(\omega)$ obtained after unwrapping (straight line 405 in FIG. 38). For this update, for example, one of Equations [10.3] to [10.5] mentioned above is used.

Equation [10.3] means calculating slopes respectively with respect to unwrapped phase angles $\alpha_{imk}(2)$ to $\alpha_{imk}(\omega)$, and then taking the mean. It should be noted, however, that if $\omega=2$, the portion of $\Sigma$ is 0.

By using the slope $K_{imk}$ prior to updating, the portion of $\Sigma$ in Equation [10.3] can be also approximated by $$(\omega-2) \times K_{imk}.$$

As a result, Equation [10.4] is obtained. Since the loop of sigma (total sum) is unnecessary in the implementation of Equation [10.4], the complexity of Equation [10.4] is less than that of Equation [10.3].

Both Equation [10.3] and Equation [10.4] have a characteristic in that the value of $K_{imk}$ varies greatly when $\omega$ is small, and $K_{imk}$ varies less as $\omega$ becomes larger. Therefore, the initial value substituted in step S371 is not much reflected on the final value of $K_{imk}$.

Accordingly, in cases where it is desired that the initial value be strongly reflected on the final value (for example, in a case where the recursive method is employed as a part of the hybrid scheme in (3), or a case where a slope found in the previous frame is used as the initial value), Equation [10.5] is used instead of Equation [10.4]. In Equation [10.5], $\beta$ is a value larger than 1. The larger the value of $\beta$, the less is the variation of the slope $K_{imk}$ from the initial value.

When steps S372 to S376 are repeated until $\omega=M$ (M is the total number of frequency bins), unwrap of phase angle is completed, and the value of the slope $K_{imk}$ at that time is the slope of the fitted straight line. The frequency bin loop may be aborted mid-process, in which case a corresponding reduction in complexity can be achieved. For example, in situations where it is clear that sound sources are all human speech, the loop may be run only within a frequency range corresponding to the frequency band of speech.

Upon exiting the loop, in step S377, the fitting error is calculated in accordance with Equation [8.5] mentioned above. This value is used for the sound source direction calculation in step S336 in the flow of FIG. 33 mentioned above or the like.

The recursive method has the following advantages.
1) The process completes in a maximum of M iterations.
2) The characteristic that "no "jumps" occur in phase angles at low frequency bins" is effectively utilized.

However, on the other hand, there is a possibility that straight-line fitting fails (a straight line is drawn along an irrelevant direction) in cases such as when there are many errors in phase angles at low frequency bins (there are many points that deviate from a straight line), or when the final value of slope deviates largely from the initial value.

(2) Linear Search Method

Next, a linear search which is another straight-line fitting algorithm will be described with reference to the flowchart shown in FIG. 39.

In this process, a fitting error is calculated by Equation [8.5] mentioned above while gradually varying the value of the slope $K_{imk}$ from a minimum value $K_{min}$ set in step S391 to a preset maximum value $K_{max}$, and the value of the slope $K_{imk}$ that makes the error minimum and that minimum value are found.

$K_{max}$ as the maximum value of the slope setting range is found by Equation [11.1] below.

$$K_{max} = \pi \frac{d}{M-1} \frac{F}{C} \qquad [11.1]$$

This value is equal to the phase difference in a frequency bin ω=2 in the case when sound arrives straight laterally from the side (θ=π/2) of a microphone pair. While the value of d may be made to coincide with the distance $d_{im}$ between a microphone i and a microphone m, the maximum value of inter-microphone distance may be commonly used. In addition, instead of using the inter-microphone distance itself, a slightly larger value (for example, a value multiplied by 1.1 times) may be used as well.

$K_{min}$ as the minimum value of the slope setting range may be set as $K_{min} = -K_{max}.$ This value corresponds to the phase difference in the case when sound arrives from the direction of θ=−π/2.

ΔK (see step S386) which is the increment of $K_{imk}$ is a relatively small positive value. For example, the following value is used.

$(K_{max} - K_{min})/1000$

First, in step S381, as the initial values of variables are set as follows.

Fitting error $err_{imk}$=infinity
Slope $K=K_{min}$

In step S382, it is checked whether or not K exceeds the maximum value ($K_{max}$), and the process is ended if K exceeds the maximum value. If K does not exceed the maximum value ($K_{max}$) in step S382, in step S383, a fitting error err detected at a set angle is computed. The fitting error is calculated by Equation [8.5] mentioned above.

In step S384, the computed fitting error err and the fitting error $err_{imk}$ that is held are compared against each other, and if the calculated fitting error err is larger than the held fitting error $err_{imk}$, the process proceeds to step S386, and the angle is updated.

If the calculated fitting error err is not larger than the held fitting error $err_{imk}$, the process proceeds to step S385, where the angle $K_{imk}$ as a variable is updated by the verified angle K, and the fitting error $err_{imk}$ is updated by the computed error err. Thereafter, the process proceeds to step S386, and the verified angle is updated. Further, the processes from step S382 onwards are repeated with respect to the updated angle K.

In this linear search method, there is a tradeoff between the complexity and the accuracy of the optimum solution. That is, although the accuracy of $K_{imk}$ improves as the value of ΔK becomes closer to 0, the complexity increases.

(3) Hybrid Method

Next, a description will be given of a straight-line fitting process based on the hybrid method that combines the recursive method and the linear search method. According to this hybrid process, first, a rough linear search is performed by using a relatively large value of ΔK, and then recursion is performed by using the proportionality factor obtained by the linear search as the initial value.

In the hybrid method, the fitting process in step S364 of the flow in FIG. 36 is roughly divided into two steps. First, the linear search described above with reference to FIG. 39 is performed, and then the recursion shown in the flow in FIG. 37 is performed by using the slope $K_{imk}$ found by the linear search as the initial value. Hereinbelow, a description will be given of how this hybrid method differs from executing the linear search method and the recursive method independently.

In the hybrid method, the value of the maximum value $K_{max}$ of the slope setting range is found by Equation [12.1] and Equation [12.2] below.

$$N = \text{floor}\left(d\frac{F}{C} + \frac{1}{2}\right) \qquad [12.1]$$

$$K_{max} = \frac{\pi N}{M-1} \qquad [12.2]$$

$$\Delta K = \frac{\pi}{M-1} \qquad [12.3]$$

$$K_{imk} \leftarrow \frac{1}{M}\left\{(M-1)K_{imk} + \frac{\alpha_{imk}(\omega)}{\omega-1}\right\} \qquad [12.4]$$

In Equation [12.1] above, floor( ) denotes dropping of decimals (flooring). Since dropping is done after adding ½, this is equivalent to rounding off the decimals of dF/C.

In the case of the following settings:
Maximum microphone spacing=0.15 [m],
Sampling frequency F=16000 [Hz], and
Sound velocity C=340 [m/s],
the solution is obtained as N=7.

Figure 39:
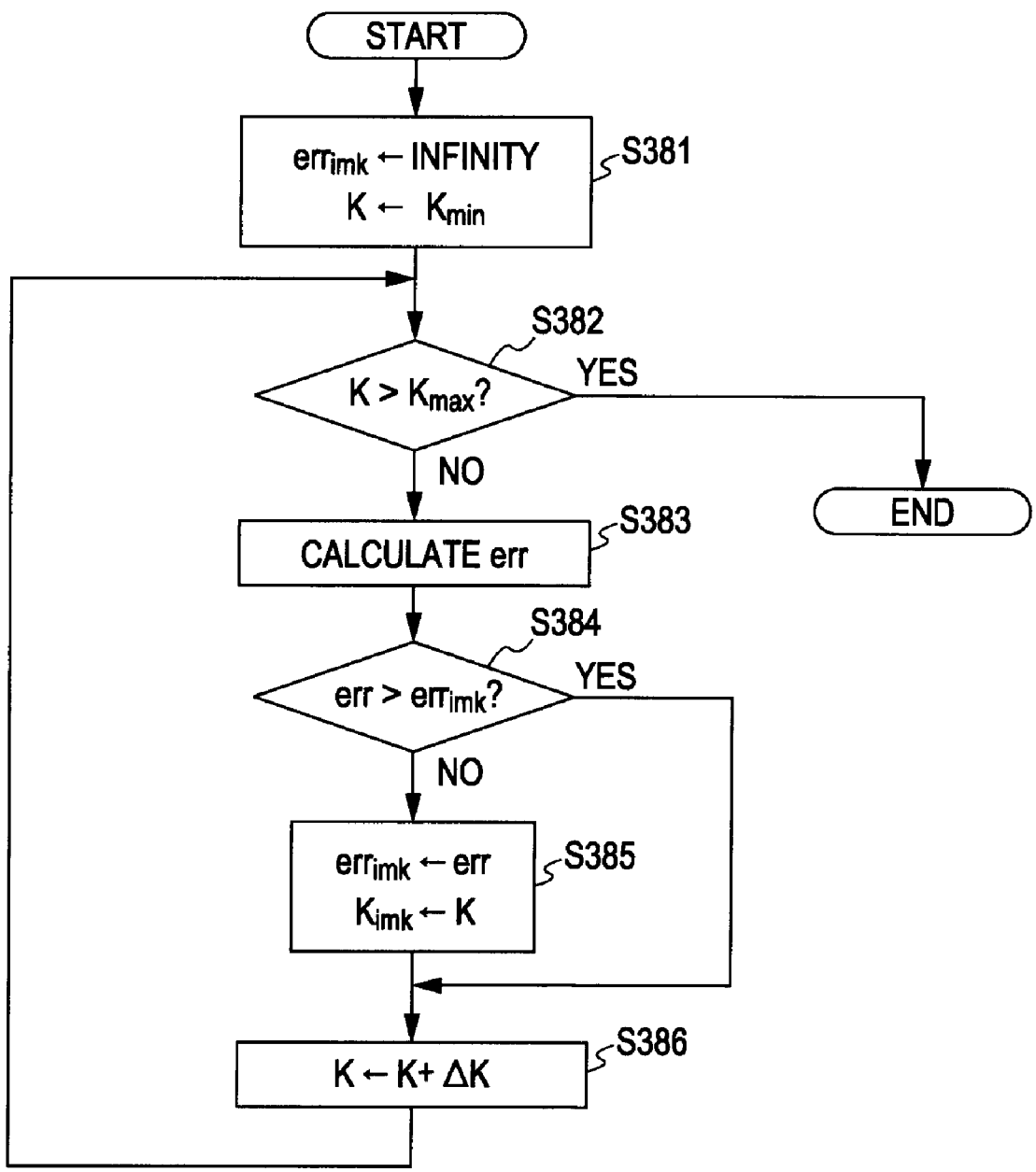
FIG. 39 is a diagram showing a flowchart illustrating the sequence of a (straight-line) fitting process performed by a linear search.

As for $K_{min}$, as in the case of (2) Linear search method described above, $K_{min}$ is set as $K_{min} = -K_{max}.$ Next, the increment of slope [ΔK] to be employed in step S396 in FIG. 39, which is described as the flow of the linear search method, is calculated by Equation [12.3] mentioned above. That is, the optimum value is searched for among 2N+1 kinds of slope including −πN/(M−1), −π(N−1)/(M−1), . . . , 0, . . . , π(N−1)/(M−1), and πN/(M−1).

Figure 40:
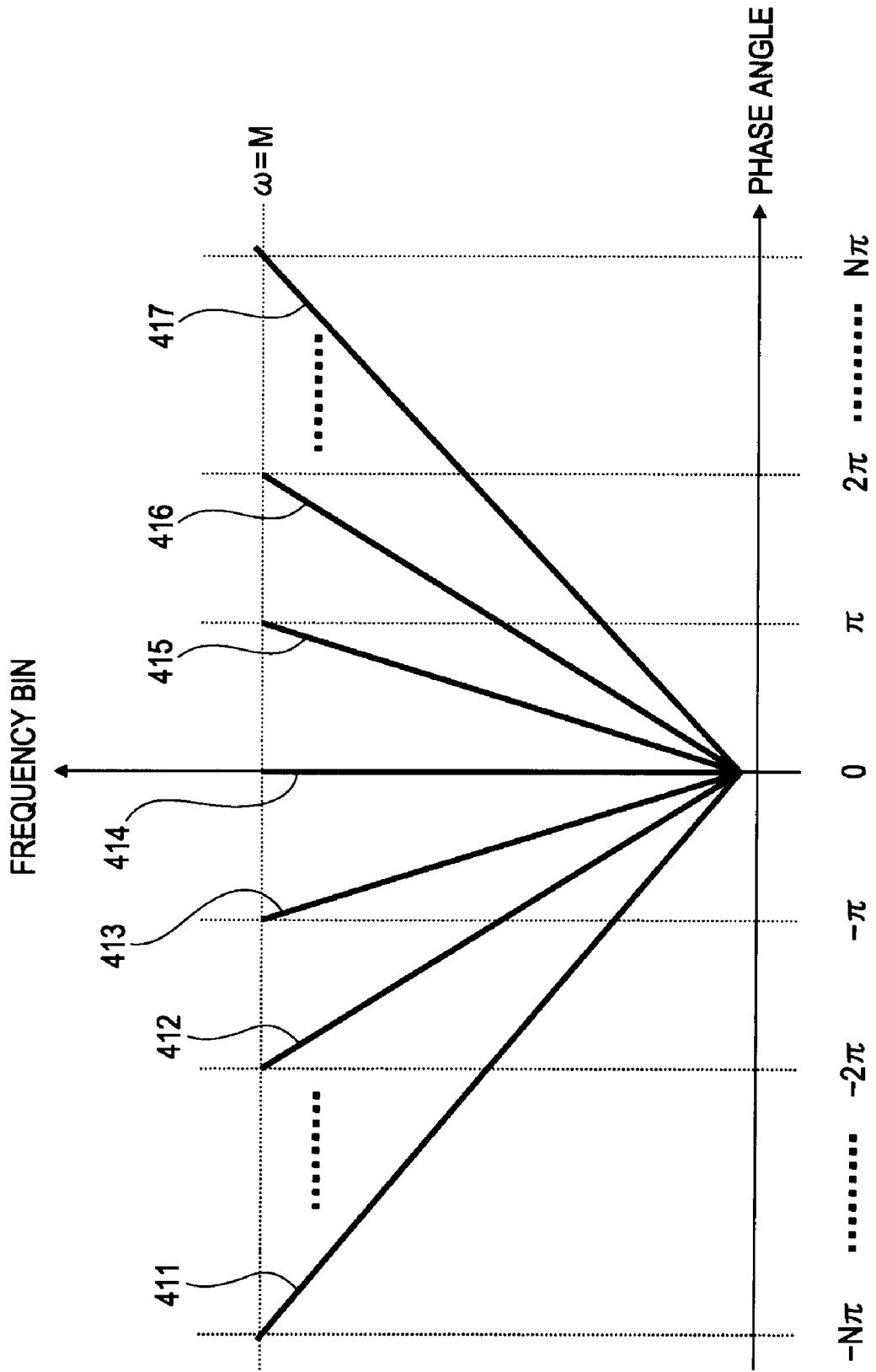
FIG. 40 is a diagram illustrating a (straight-line) fitting process based on a linear search.

For example, the 2N+1 kinds of slope to be set correspond to respective straight lines 411 to 417 shown in FIG. 40. The computing equation for the increment of slope is given as follows.

ΔK=π/(M−1)

This value is important. If ΔK is larger than this value, the subsequent recursion process may fail to find the true optimum value. If ΔK is smaller than this value, redundant processing occurs in the linear search. The reason for this is described below. Unwrapping of a phase difference plot is performed on the basis of Equation [10.1] and Equation [10.2]. Since N in Equation [10.1] is an integer, even if the value of the slope $K_{imk}$ changes within the range of $\pm \pi/(\omega-1)$, the value of N becomes the same, and the same unwrapped results are obtained. That is, even if the value of $K_{imk}$ is changed within a range smaller than $\pi/(M-1)$, only the same unwrapped results as those prior to the changing of the value can be obtained for all frequency bins. In other words, the value $\Delta K=\pi/(M-1)$ in the first-stage search is the minimum value necessary for producing a difference in unwrapped results in the second-stage search (recursion).

After setting the above-mentioned increment of slope [$\Delta K=\pi/(M-1)$], the linear search described above with reference to FIG. 39 is performed, and then the recursion shown in the flow of FIG. 37 is performed by using the slope $K_{imk}$ found by the linear search as the initial value.

In this recursion process, in step S371 shown in FIG. 37, by setting the optimum value found from among the 2N+1 kinds of slope mentioned above as the initial value [$K_{imk}$], the processes from step S372 onwards are executed.

In step S375, to prevent the value of $K_{imk}$ from deviating largely from the initial value, Equation [10.5] is used instead of Equation [10.3] and Equation [10.4] that are the computing equations for the slope [$K_{imk}$] mentioned above. It should be noted, however, that as the value of β in Equation [10.5], a value roughly equal to the number M of frequency bins is used. Alternatively, Equation [12.4] mentioned above may be used as well.

By such a straight-line fitting process based on the hybrid method that combines the recursive method and the linear search method, efficient and high-accuracy straight-like fitting is realized. The results of this straight-line fitting are shown in FIG. 41. FIG. 41 shows the results of straight-line fitting performed by using the plot data shown in FIG. 35 described above.

The data shown in FIG. 41 shows the results of straight-line fitting with respect to 24 diagrams, in which plots for Channels 1 to 4 as a plurality of estimated sound sources with respect to six combinations of two microphones (Microphones 1 and 2, 1 and 3, 1 and 4, 2 and 3, 2 and 4, and 3 and 4) selected from four microphones, Microphones 1 to 4, are set. Each plot is obtained by plotting phase angle with respect to $r_{imk}(\omega)$ calculated from cross-covariance matrices. The vertical axis indicates the frequency bin ω, and the horizontal axis indicates the phase angle. In FIG. 41, each straight line obtained as a result of straight-line fitting is indicated by a dotted line. In the drawing, for clearly indicating the straight lines, each straight line is depicted as extending off the left and right or the top and bottom of the plot diagram.

Next, with reference to the flowchart shown in FIG. 42, a description will be given of the sound source direction calculation in step S326 in the flowchart shown in FIG. 32, and the sound source direction calculation in step S336 in the flowchart shown in FIG. 33.

Figure 42:
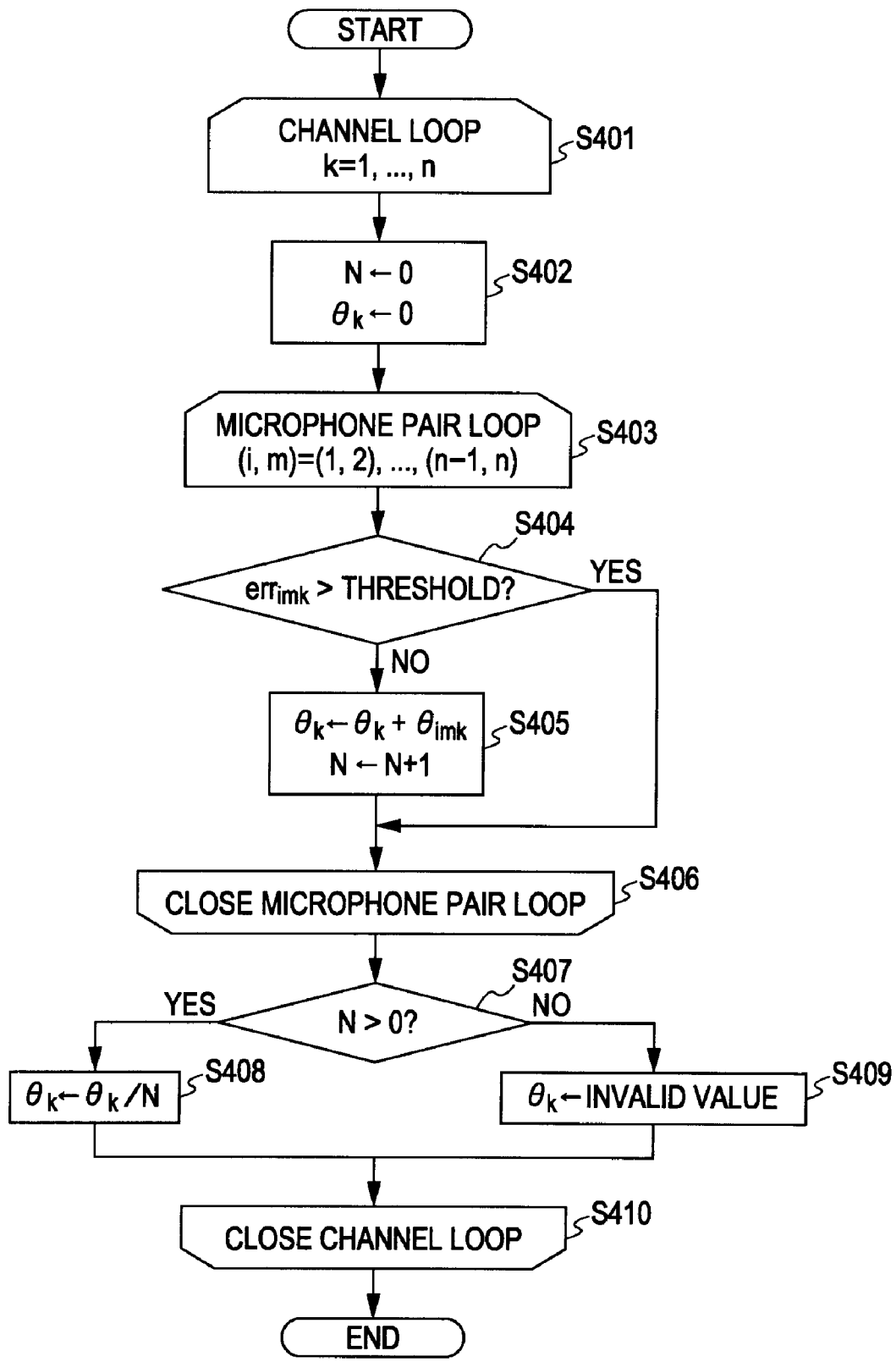
FIG. 42 is a diagram showing a flowchart illustrating sound source direction calculation in step S326 in the flowchart shown in FIG. 32, and sound source direction calculation in step S336 in the flowchart shown in FIG. 33.

The flowchart shown in FIG. 42 represents a process of summing up the values of the slope $K_{imk}$ found for individual microphone pairs to compute the sound source direction $\theta_k$. It should be noted, however, that the process is so designed that values obtained with respect to output channels not corresponding to any sound source, or with respect to microphone pairs in which straight-line fitting has failed are not reflected on the sound source direction.

Here, prior to the description of the process, a description will be given of "output channels not corresponding to any sound source" and "microphone pairs in which straight-line fitting has failed".

In a case where the number of simultaneously playing sound sources is smaller than the number of microphones, signals not corresponding to any sound source are outputted to some of output channels. (Specifically, sounds with only reverberation components are outputted.) Such output channels are easily distinguishable since the plot of phase angle does not lie on a straight line.

For example, FIG. 41 described above as showing the results of straight-line fitting shows plots and straight-line fitting results generated in the case where the number of microphones is four, and the number of channels (number of estimated sound sources) is four. However, as can be appreciated from the drawing, the plot data for Channel 3 contains many points that deviate from straight lines. This data indicates that this estimated sound source (Channel 3) does not actually exist. That is, this indicates that the results correspond to the case where the number of simultaneous sound sources is three.

That is, this column of channel-3 represents an output not corresponding to any sound source. Since it is meaningless to calculate the sound source direction for such an output channel, it is necessary to detect and discard such a channel. Also, if straight-line fitting has failed only with respect to a specific channel, a more accurate value should be obtained by removing the pair and then finding the mean of sound source directions.

In the calculation process flow for sound source direction shown in FIG. 42, the fitting error found by Equation [8.5] mentioned above is used so that pairs with large errors are not reflected on the sound source direction. Thus, values of sound source direction derived from channels not corresponding to any sound source, microphone pairs in which straight-line fitting has failed, and the like are excluded.

Steps S401 to S410 in the calculation process flow for sound source direction shown in FIG. 42 represent a channel loop, and indicates that the following process is performed with respect to each column (channel) in FIG. 41, for example.

In step S402, initial values are substituted into the following variables that store results:
N denoting a variable that stores the number of valid pairs; and
$\theta_k$ denoting a variable that stores the total sum or mean of sound source directions (angles).
Their initial values are both 0.

Steps S403 to S406 represent a microphone pair loop, and this means that processing is performed with respect to the six phase angle plots in each column of FIG. 41. That is, sound source directions are calculated from the respective six plots, and the calculated values are averaged.

The fitting error $err_{imk}$ in step S404 is a fitting error calculated with respect to the combination of a microphone pair i, m and a channel k in the fitting process in step S364 in FIG. 36 described above. This value is compared against a predetermined threshold, and if this values exceeds the threshold, the process of step S405 is skipped.

In the case where Equation [8.5] is used for the calculation of the fitting error $err_{imk}$, one of values from 0 to 4 (for example, 1) is set as the threshold. By appropriately setting the threshold, only those plots in which straight-line fitting has succeeded (in which points of phase difference are aligned in a substantially straight line from the beginning, and further a straight line that fits those points has been found appropriately) are reflected on the sound source direction, and the other plots (for example, the plots in the column of Channel 3 (channel-3) in FIG. 41) are not adopted.

If it is determined in step S404 that the value of fitting error $\text{err}_{imk}$ is equal to or less than the threshold, the process proceeds to step S405. In step S405, $\theta_{imk}$ is calculated on the basis of Equation [8.7], and the calculated value is added to $\theta_k$. In addition, the number N is incremented, that is, incremented by 1. In some cases, it is better to make the following correction, instead of applying Equation [8.7] as it is. A description will now be given in this regard.

In the operation of Equation [8.7], there are cases when the value in the parentheses of a sin exceeds the range of −1 to 1. In such cases, a sin is expanded as Equation [8.8] so that inputs exceeding the range can be handled. For example, for an input slightly exceeding 1, a value slightly exceeding $\pi/2$ is returned.

In cases where microphones are placed nonlinearly, the value of Equation [8.7] is corrected by an amount corresponding to the angle of a microphone pair. This correction of angle will be described with reference to FIG. 43.

Figure 43:
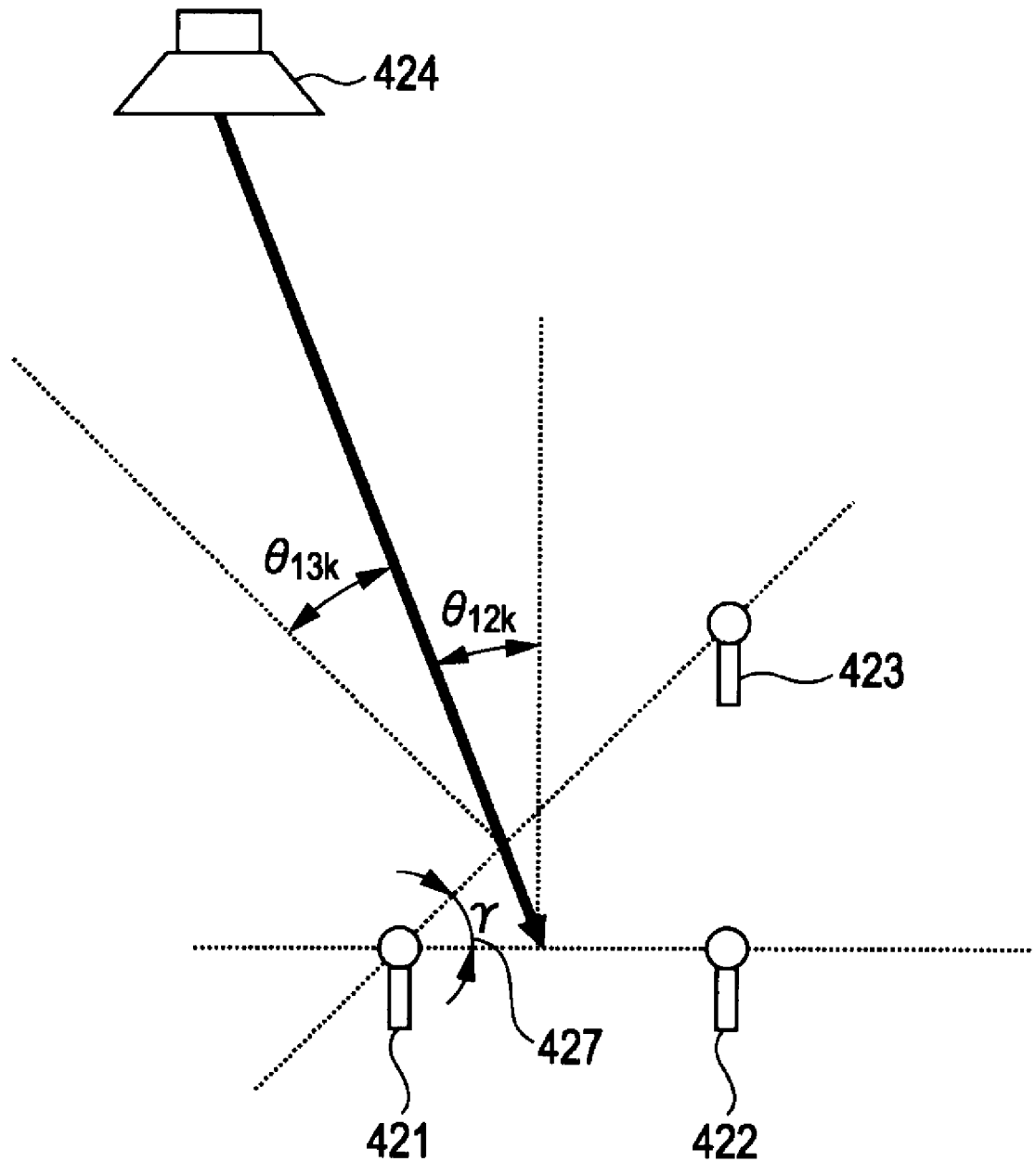
FIG. 43 is a diagram illustrating a processing example in which the value of Equation [8.7] is corrected by an amount corresponding to the angle of a microphone pair in a case where the placement of microphones is non-linear.

In FIG. 43, with the direction from Microphone 1 (421) to Microphone 2 (422) taken as the reference of angle, the direction from Microphone 1 to Microphone 3 (423) is defined as being rotated by $\gamma$ with respect to the reference (microphone-pair rotation angle 427). In this case, the microphone-pair rotation angle $\gamma$ is added to the value of $\theta_{13k}$ found by setting i=1 and m=3 in Equation [8.7] to adjust the reference of angle. That is, after finding $\theta_{13k}$ by Equation [8.7], the following correction $$\theta_{13k} = \theta_{13k} + \gamma$$

is performed, and the corrected value is added to $\theta_k$ in step S405.

After the processes of steps S404 and S405 have been performed with respect to all microphone pairs, the total sum of angles is stored in $\theta_k$. Accordingly, the total sum is converted into a mean by division by the number N (step S408). It should be noted, however, that when N is 0, a value indicating invalid is substituted into $\theta_k$.

For example, in the case of the column of Channel 3 (channel-3) in FIG. 41, all of the six plots are skipped, with the result that an invalid value is set for $\theta_3$. By performing steps S401 to S410 with respect to all channels, calculation of sound source direction is completed.

The foregoing completes the description of all the processes shown in the flowchart in FIG. 19.

[Modifications]

The results of "straight-line fitting" used in an embodiment of the present invention can be used for various applications other than sound source direction estimation. Here, the following three points will be described as modifications.

1. Frequency Masking
2. Reconstruction of Learning Initial Value
3. Case where Microphone Placement is not Linear

[1. Frequency Masking]

As one of sound source separation techniques, there is a method called frequency masking. This is a method in which, by exploiting the property that most kinds of sound are sparse in the time-frequency domain, masking is performed on non-target sound components to leave only the target sound. Combinations of Independent Component Analysis and frequency masking also exist, an example of which is the configuration disclosed in Japanese Unexamined Patent Application Publication No. 2007-219479.

Frequency masking includes a method called hard mask (setting non-target sound signals to 0) and a method called soft mask (weakening non-target sound signals in accordance with a given measure). The configuration disclosed in Japanese Unexamined Patent Application Publication No. 2007-219479 represents an example of hard mask. Although soft mask is inferior to hard mask in terms of the performance of removing sounds other than the target sound, soft mask can prevent problems resulting from loss of a specific frequency component (such as generation of musical noise or adverse influence on speech recognition) to some extent.

By exploiting the results of straight-line fitting described above, the coefficient of soft mask can be determined, allowing for further removal of sounds other than the target sound.

Figure 44:
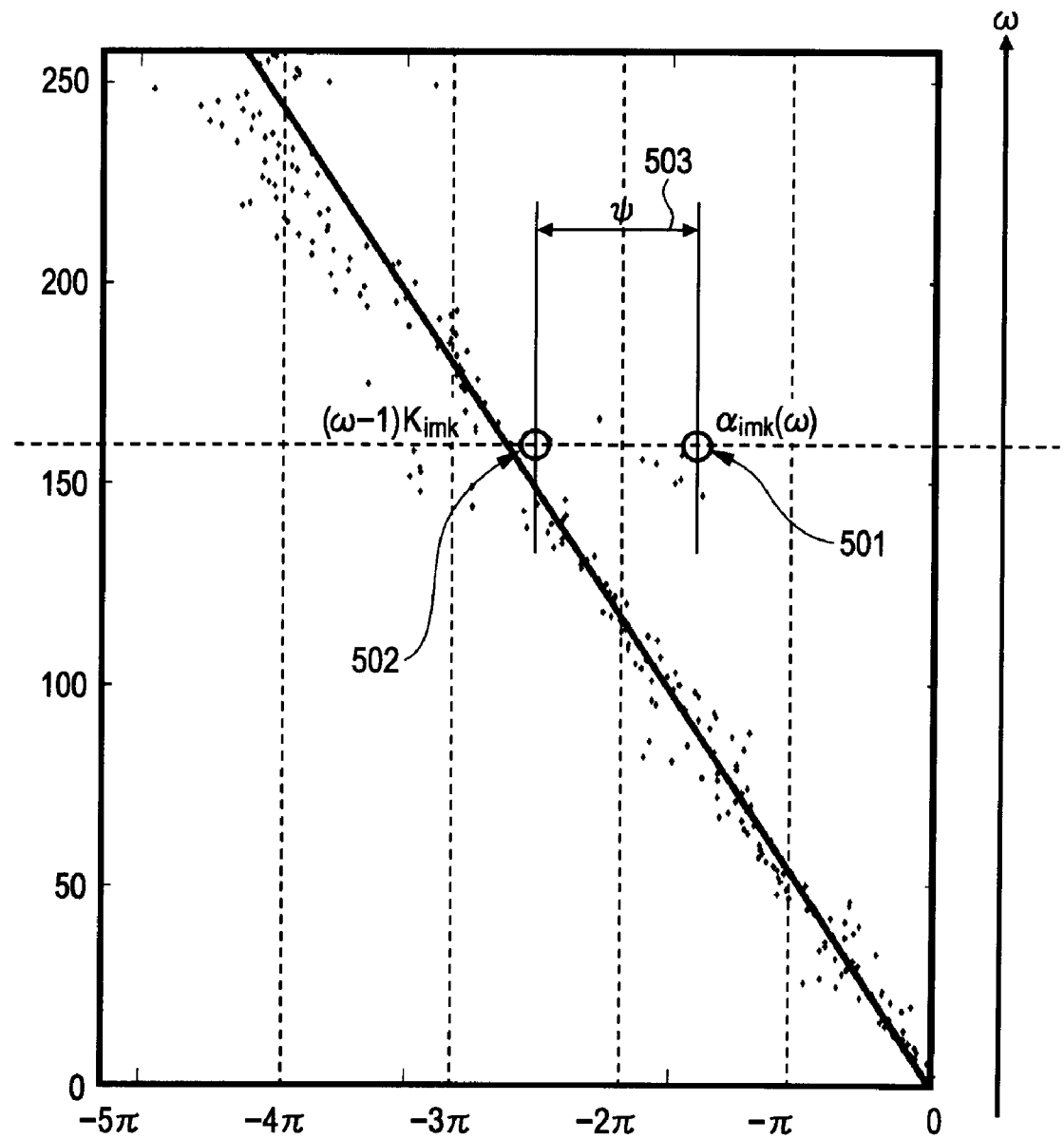
FIG. 44 is a diagram illustrating an example of the results of straight-line fitting for a given microphone pair for a given channel.

FIG. 44 shows the results of straight-line fitting for a given microphone pair for a given channel, and is the same diagram as that of the straight-line fitting results shown in FIG. 10B described above. The vertical axis indicates the frequency bin $\omega$, and the horizontal axis represents the phase angle. It can be seen that points are aligned in a substantially straight line. At the $\omega$-th frequency bin in this drawing, the phase angle is $\alpha_{imk}(\omega)$ 501, and a point on the straight line is $(\omega-1)K_{imk}$ 502. The phase difference between the two is represented as $\psi$ 503. If the absolute value of $\psi$ is large only at some frequency bin, it can be considered that there is a high probability that separation has failed at that frequency bin.

Accordingly, by suppressing a frequency component of the separated results in accordance with the absolute value of the phase difference $\psi$, the accuracy of separation can be improved.

Figure 45:
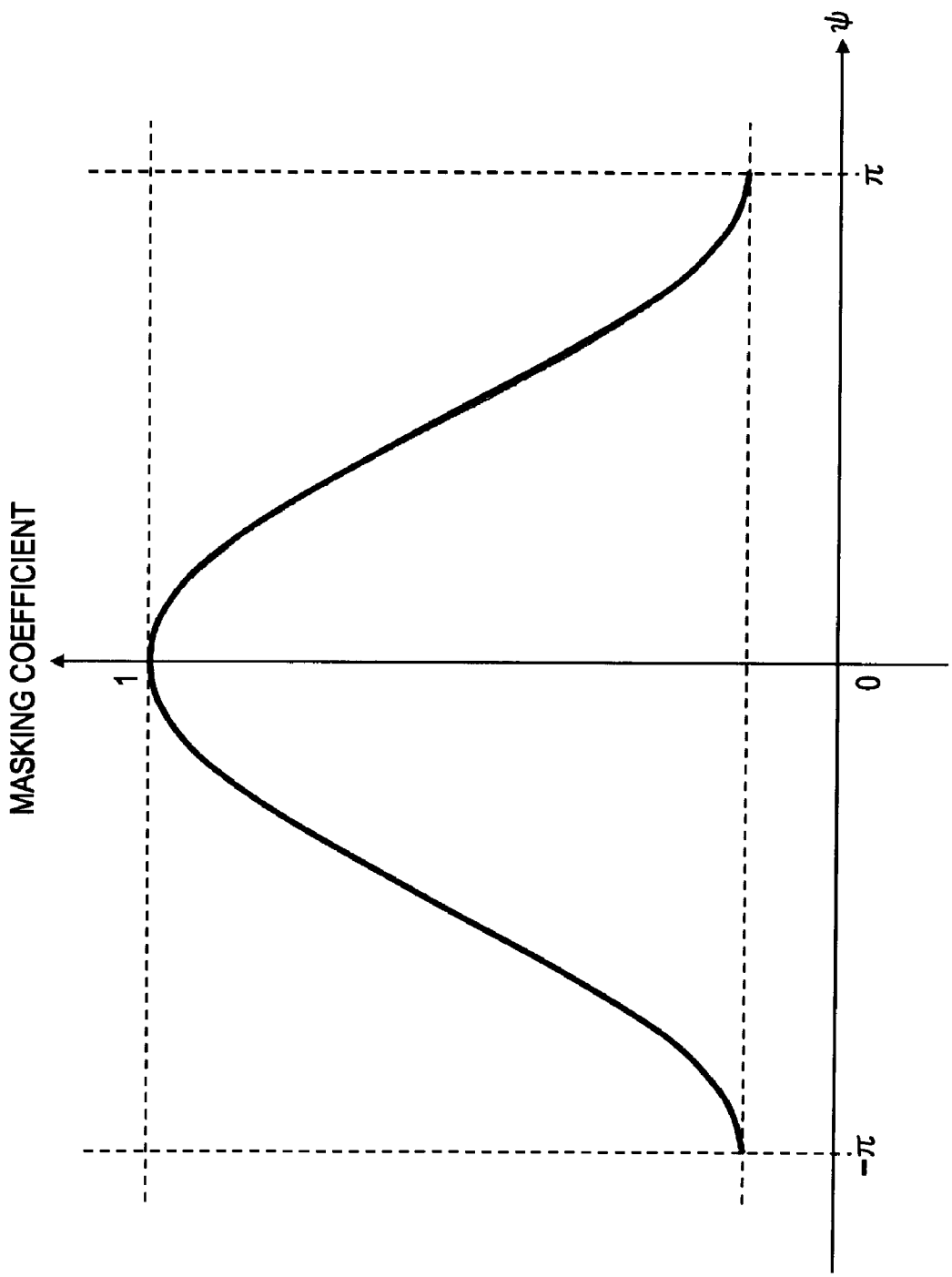
FIG. 45 is a diagram illustrating an example of a function applied to improve the accuracy of separation by suppressing a frequency component of the separated results in accordance with the absolute value of phase difference $\psi$.

Specifically, a function whose value becomes smaller as the absolute value of the phase difference $\psi$ becomes smaller as shown in FIG. 45 is prepared. For example, the function is represented as Equation [13.1] bellow.

$$g_{imk}(\omega) = h + (1-h)\cos^p \frac{\psi}{2} \qquad [13.1]$$

$$= h + (1-h)\cos^p \frac{\alpha_{imk}(\omega) - (\omega-1)K_{imk}}{2} \qquad [13.2]$$

$$= h + (1-h)\left\{\frac{\text{Re}[r_{imk}(\omega)\exp(-j(\omega-1)K_{imk})] + 1}{2}\right\}^{p/2} \qquad [13.3]$$

$$g_k(\omega) = \frac{n(n-1)}{2}\sum_{i=1}^{n-1}\sum_{m=i+1}^{n} g_{imk}(\omega) \qquad [13.4]$$

$$Y'_k(\omega, t) = g_k(\omega)Y_k(\omega, t) \qquad [13.5]$$

In this equation, h is a term for adjusting how much masking is to be applied, and takes a value not smaller than 0 and not larger than 1 (when h=1, this means that frequency masking is not performed). p takes a value not smaller than 0, and indicates the sharpness of mask. (FIG. 45 shows a case where p=2.) As the value of p is set larger, it is possible to represent a sharper mask, that is, a mask shaped so that the phase difference $\psi$ is suppressed steeply with increasing distance from 0. On the other hand, when p=0, this means that frequency masking is not performed.

In a case where straight-line fitting is performed by the recursive method (or the hybrid method), the value of Equation [13.1] can be calculated as Equation [13.2] by using unwrapped $\alpha_{imk}(\omega)$ and $(\psi-1)K_{imk}$. On the other hand, in a case where straight-line fitting is performed by the linear search method, this can be calculated by Equation [13.3] instead. (Re[ ] denotes an operation of extracting a real part from the complex number between brackets.)

With respect to the value obtained by Equation [13.1], a mean is taken over all microphone pairs (Equation [13.4]). Instead of taking a mean over all microphone pairs, a mean may be taken only over those microphone pairs for which straight-line fitting has succeeded. That is, as in the processing of steps S403 to S406 in the flowchart in FIG. 43, additions are performed only when the fitting error err$_{imk}$ is equal to or less than a threshold, and the resulting value is divided by the number of pairs after the end of loop.

Once the value of Equation [13.4] (or the mean taken over microphone pairs for which the fitting error err$_{imk}$ is equal to or less than a threshold) is found, the value is multiplied by the separated results Yk($\omega$, t) for the channel k, frequency bin $\omega$, and frame index t (Equation [13.5]), generating Y'k($\omega$, t) as the soft-masked results.

In the "inverse Fourier transform" in step S107 in the flow of FIG. 19 described above, by using Y'k($\omega$,t) as the soft-masked results instead of the separated results Yk($\omega$, t), a separated result waveform with soft-masking is generated. Then, in step S108 in the flow of FIG. 19, the separated result waveform with soft-masking is transmitted.

While in FIG. 45 and Equation [13.1] the mask value becomes minimum only when the phase difference $\psi = \pm \pi$, alternatively, it is also possible to use a mask such that its value is forcibly set to the minimum value when the phase difference $\psi$ deviates from a predetermined range. Specifically, $\psi_0$ that satisfies $0<\psi_0 \leq \pi$ is prepared, and when $-\psi_0 \leq \psi \leq \psi_0$, g$_{imk}$($\psi$) may be calculated by Equation [13.1], and otherwise g$_{imk}$($\psi$) may be set as g$_{imk}$($\psi$)=h.

As described above, the signal processing apparatus according to an embodiment of the present invention can be configured so as to execute frequency masking for suppressing the frequency component of the signal separation results which has phase angle data that deviates largely from a straight line, by using a proportionality constant (slope of a straight line) acquired as a result of the straight-line fitting process. This process enables a further improvement in signal separation performance.

[2. Reconstruction of Learning Initial Value]

In the description of FIG. 7 given above as the description of thread processing in the learning processing unit, as an initial value at the start of learning, the latest separating matrix (or the separating matrix prior to resealing) at that point is used as it is. For example, the separating matrix 72 generated by the first learning performed in Thread 1 shown in FIG. 7 is used as an initial value at the start of learning 75 in Thread 3. Likewise, the separating matrix generated in Thread 3 is used as an initial value at the start of learning in Thread 5. Through the intermediation of a plurality of learning threads, the degree of convergence is raised as indicated by Graph 1 in FIG. 8(a).

Instead of using a separating matrix as it is as an initial value, if a separating matrix is reconstructed from the results of straight-line fitting, the convergence speed can be made faster. A specific method for achieving this will be described below.

From the separating matrix W($\omega$), K$_{imk}$ as the straight-line fitting results are estimated through the process from Equation [6.5] to Equation [7.1] and Equation [8.1], and then Equation [8.3] described above. Therefore, by performing the reverse of this operation, the separating matrix can be calculated.

Equation [14.1] below is an equation for calculating an element corresponding to sign($\sigma_{ik}$($\omega$)) in Equation [8.1].

$$q_{ik}(\omega) = \frac{1}{n}\sum_{m=1}^{n} \text{sign}(\sigma_{mk}(\omega))\exp(j(\omega-1)K_{imk}) \quad [14.1]$$

$$K_{mik} = -K_{imk} \quad [14.2]$$

$$K_{iik} = 0 \quad [14.3]$$

$$Q(\omega) = \begin{bmatrix} q_{11}(\omega) & \cdots & q_{1n}(\omega) \\ \vdots & \ddots & \vdots \\ q_{n1}(\omega) & \cdots & q_{nn}(\omega) \end{bmatrix} \quad [14.4]$$

$$Q(\omega)\Sigma_{XX}(\omega)^{-1} = U(\omega) = \begin{bmatrix} U_{11}(\omega) & \cdots & U_{1n}(\omega) \\ \vdots & \ddots & \vdots \\ U_{n1}(\omega) & \cdots & U_{nn}(\omega) \end{bmatrix} \quad [14.5]$$

$$W_{init}(\omega) = \text{diag}\left[\sqrt{\frac{\sum_{i=1}^{n} W_{1i}(\omega)}{\sum_{i=1}^{n} U_{1i}(\omega)}}, \ldots, \sqrt{\frac{\sum_{i=1}^{n} W_{ni}(\omega)}{\sum_{i=1}^{n} U_{ni}(\omega)}}\right] U(\omega) \quad [14.6]$$

It should be noted, however, that the value of K$_{imk}$ when i$\geq$m is defined as in Equation [14.2] and Equation [14.3]. (For example, K$_{11k}$=0 and K$_{21k}$=-K$_{12k}$.)

While in Equation [14.1] a mean is taken over n terms, as in steps S403 to S406 in the flow shown in FIG. 43, a mean may be taken only over combinations of (i,m) for which the fitting error err$_{imk}$ becomes equal to or less than a threshold. (It should be noted, however, that err$_{mik}$=err$_{imk}$.) Alternatively, instead of taking a mean with respect to a plurality of m's, only a value with respect to a specific m may be used to reduce complexity. For example, using only m=1 means reconstructing the separating matrix by using only the phase difference between the first microphone and another microphone.

Next, as in Equation [14.4], a matrix Q($\omega$) with q$_{ik}$($\omega$) in Equation [14.1] as its elements is generated. Q($\omega$) is a matrix corresponding to the cross-covariance matrices $\Sigma_{XY}$($\omega$). To obtain W($\omega$) from Q($\omega$), the relation in Equation [6.5] mentioned above may be used, and Equation [14.5] is obtained as a result. Alternatively, the relation in Equation [6.8] may be used, or simply the inverse matrix of Q($\omega$) may be used.

The computation results of Equation [14.5] are given as U($\omega$), and this U($\omega$) is set as an initial value to serve as the learning initial value to be held in the learning-initial-value holding unit 152 of the thread control unit 112 shown in FIG. 15.

Instead of using U($\omega$) directly as an initial value, if a matrix whose scale is made closer to that of the matrix held in the learning-initial-value holding unit 152 is used, a further improvement in convergence speed can be expected. To this end, the operation of Equation [14.6] may be performed. In the equation, W$_{ik}$($\omega$) denotes individual elements of the learning initial value held in the learning-initial-value holding unit 152, and diag( ) denotes a diagonal matrix with the elements in parentheses located on its diagonal. Since U($\omega$) is multiplied from left with the diagonal matrix, this equation means that the scale of the columns of U($\omega$) is made to coincide with the scale of the columns of the learning initial value held in the learning-initial-value holding unit 152.

By applying this modification, the convergence speed is improved. For example, while in (a) Graph 1 in FIG. 8 transition stages 85c to 85f exist between when the state of the sound source changes and when the separating matrix converges again, there is a possibility that the number of these stages decreases.

As described above, the signal processing apparatus according to an embodiment of the present invention can be configured so as to generate a separating matrix by using a proportionality constant (slope of a straight line) obtained as a result of the straight-line fitting process, and use the generated separating matrix in the learning processing unit. This configuration makes it possible to fasten convergence in the learning process.

[3. Case where Microphone Placement is not Linear]

Next, a description will be given of a processing example in a case where microphones are not placed on the same straight line but are placed in a two-dimensional manner (on the same plane) or in a three-dimensional manner.

In the case where microphones are not placed on the same straight line but are placed in a two-dimensional manner (on the same plane) or in a three-dimensional manner, as the sound source direction, it is also possible to estimate a sound source direction vector instead of the angle θk. Hereinbelow, a description will be given of the principle and method involved.

Figure 46:
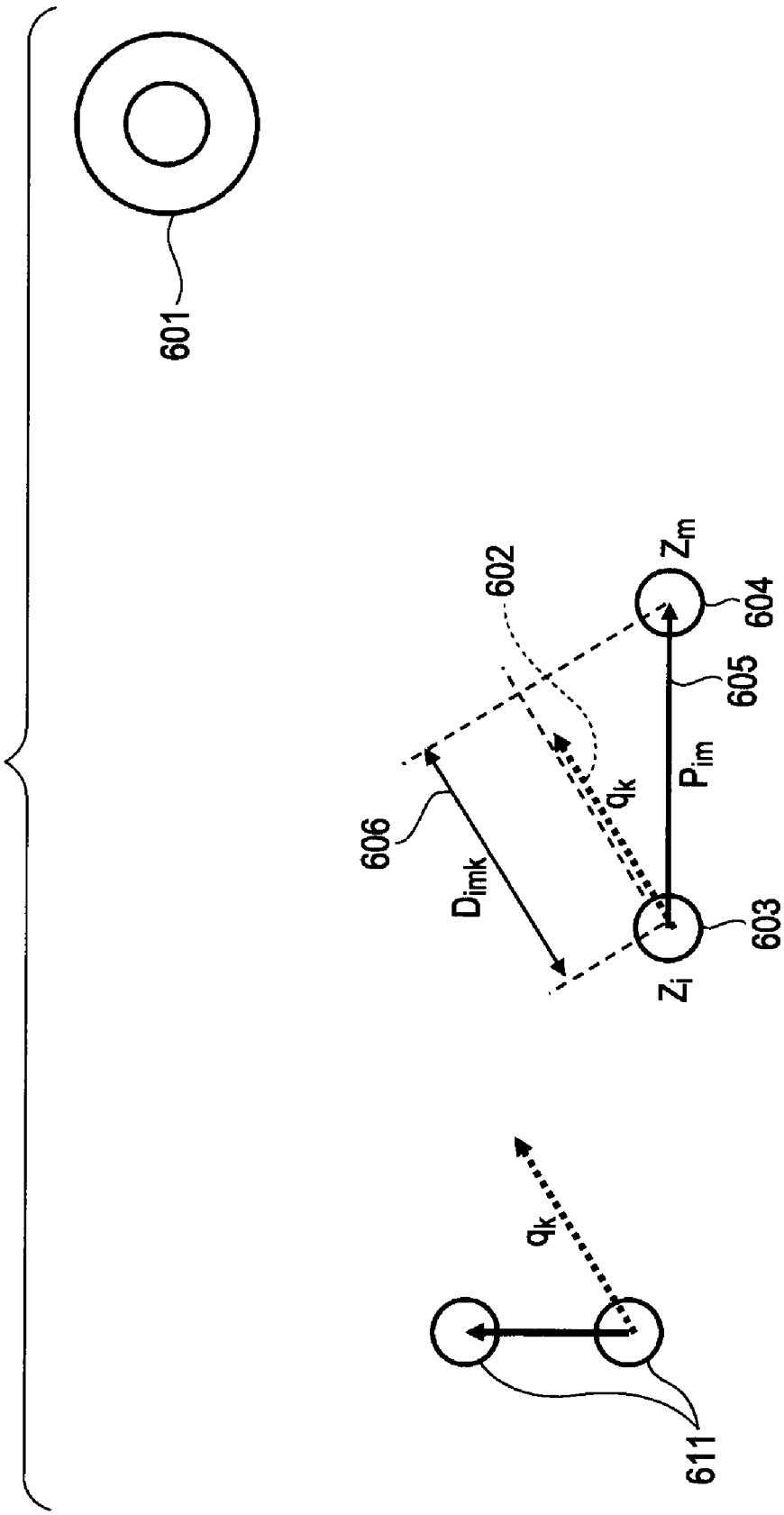
FIG. 46 is a diagram illustrating the relationship between one microphone pair and a sound source direction vector.

FIG. 46 is a diagram illustrating the relationship between one microphone pair and a sound source direction vector. A sound source 601 is a sound source corresponding to the k-th channel, and the direction of the sound source k as seen from each microphone pair is represented by a unit vector (vector whose length is 1) $q_k$ (sound source direction vector 602).

The sound source direction vector $q_k$ 602 is a three-dimensional column vector represented by Equation [15.1] below.

$$q_k = \begin{bmatrix} q_{kx} \\ q_{ky} \\ q_{kz} \end{bmatrix} \quad [15.1]$$

$$q_k^T q_k = 1 \quad [15.2]$$

$$p_{im} = z_m - z_i \quad [15.3]$$

$$D_{imk} = \frac{(M-1)C}{\pi F} K_{imk} \quad [15.4]$$

$$\frac{p_{im}^T}{|p_{im}|} q_k = \frac{D_{imk}}{|p_{im}|} \quad [15.5]$$

$$\hat{q}_k = \begin{bmatrix} \frac{p_{12}^T}{|p_{12}|} \\ \vdots \\ \frac{p_{n-1,n}^T}{|p_{n-1,n}|} \end{bmatrix}^+ \begin{bmatrix} \frac{D_{12k}}{|p_{12}|} \\ \vdots \\ \frac{D_{n-1,n,k}}{|p_{n-1,n}|} \end{bmatrix} \quad [15.6]$$

$$P_k = \begin{bmatrix} \frac{p_{12}}{|p_{12}|}, \dots, \frac{p_{n-1,n}}{|p_{n-1,1}|} \end{bmatrix} \quad [15.7]$$

$$D_k = \begin{bmatrix} \frac{D_{12k}}{|p_{12}|}, \dots, \frac{D_{n-1,n,k}}{|p_{n-1,1}|} \end{bmatrix} \quad [15.8]$$

$$\begin{bmatrix} P_k^T \\ q_k^T \end{bmatrix} q_k = \begin{bmatrix} D_k^T \\ 1 \end{bmatrix} \quad [15.9]$$

$$\hat{q}_k \leftarrow \begin{bmatrix} P_k^T \\ \hat{q}_k^T \end{bmatrix}^+ \begin{bmatrix} D_k^T \\ 1 \end{bmatrix} \quad [15.10]$$

$$\hat{q}_k \leftarrow \frac{\hat{q}_k}{|\hat{q}_k|} \quad [15.11]$$

Vectors that appear in FIG. 46 are all represented in the same form (three-dimensional column vectors). A path difference [$D_{imk}$] 606 shown in FIG. 46 is the difference between the distance from the sound source k to a microphone i 603, and the distance from the sound source k to a microphone m 604, and this is a quantity corresponding to the path difference d·sin θ shown in FIG. 1.

By representing the relationship between the path difference [$D_{imk}$] 606 and the direction vector $q_k$ 602, and the relationship between $D_{imk}$ and the straight-line fitting results $K_{imk}$ respectively by equations, $q_k$ can be estimated.

The relationship between the straight-line fitting results $K_{imk}$ and the phase difference $D_{imk}$ can be represented as Equation [15.4], where F denotes the sampling frequency, M denotes the number of frequency bins, and C denotes the sound velocity. This equation is equivalent to replacing the term $d_{im} \sin \theta_{imk}$ in Equation [8.4] by $D_{imk}$, further followed by transformation into a form "$D_{imk}=$".

On the other hand, if a plane wave is assumed, the path difference $D_{imk}$ can be considered as the projection of the vector of microphone-pair direction (vector pointing from the microphone i to the microphone m) to $q_k$. That is, if the microphone-pair direction is represented by a vector $p_{im}$ (a microphone-pair vector 605), the relationship between $D_{imk}$, $p_{im}$, and $q_k$ can be represented by Equation [15.5]. (The superscript T denotes the transpose of a vector or a matrix. Letting x,y be a column vector, $x^T y$ is the dot product of the vectors. Further, in Equation [15.5], the value of the dot product is normalized by the inter-microphone distance $|p_{im}|$.) The microphone vector $p_{im}$ is computed by Equation [15.3], with the position vectors (=coordinates) of the microphone i and microphone m represented as $z_i$ and $z_m$, respectively.

If a plane wave is assumed, it can be considered that $q_k$ is the same no matter from which microphone pair $q_k$ is viewed (For example, the sound source direction vector $q_k$ of another microphone pair 611 points in the same direction as the sound source direction vector 602). Thus, Equation [15.5] expressing a condition with respect to the sound source direction vector $q_k$ is obtained for the number of microphone pairs.

The value of $q_k$ that best approximates those plurality of conditional expressions may be set as an estimated value hat($q_k$) of sound source direction vector.

As a method of finding such hat($q_k$), Japanese Patent No. 3881367 proposes an operation corresponding to Equation [15.6]. It should be noted that the superscript "+" attached to the first term on the right-hand side of this equation denotes the pseudo-inverse matrix (more precisely, the Moore-Penrose generalized inverse matrix). In addition, the first term on the right-hand side is a matrix (whose number of rows equals the number of microphone pairs and whose number of columns equals 3) generated by vertically listing $$p_{im}^T/|p_{im}|$$

with respect to all microphone pairs. Likewise, the second term on the right-hand side is a column vector generated by vertically listing $$D_{imk}/|p_{im}|$$

with respect to all microphone pairs. (It should be noted, however, that since the purpose of the sound source direction vector computation in Japanese Patent No. 3881367 is elimination of permutations, the operation corresponding to Equation [15.6] is performed for each frequency bin. In addition, the quantity corresponding to the path difference $D_{imk}$ is computed not from the slope of a straight line but from the inverse matrix of a separating matrix for each frequency bin.)

However, the constraint that $q_k$ be a unit vector (Equation [15.2]) is not reflected on Equation [15.6] derived by using the Moore-Penrose generalized inverse matrix. Therefore, there are cases where the computed direction differs from that corresponding to the optimum hat($q_k$) estimated by taking also the constraint of Equation [15.2] into account.

Accordingly, in an embodiment of the present invention, an optimum sound source direction vector is estimated by using an iterative algorithm based on the fixed-point method. Prior to the description of the algorithm, the principle involved will be described.

In addition to Equation [15.5] that is a constraint condition of the sound source direction vector $q_k$ for each microphone pair, when the condition that $q_k$ is a unit vector (Equation [15.2]) is also represented by a single equation, this can be written as Equation [15.9].

In the equation, $P_k$ and $D_k$ are a matrix and a vector represented by Equation [15.7] and Equation [15.8], respectively.

$P_k$ is a matrix generated by horizontally arranging vectors $p_{im}$ of individual microphone pairs after normalizing their length to 1. All microphone-pair vectors may not necessarily be listed, and microphone pairs with large straight-line fitting error $err_{imk}$ may be omitted. Depending on the relationship between the microphone-pair direction and the sound source direction, there may be cases where it is not possible to compute the slope of a straight line with very high accuracy. Microphone pairs in such a positional relationship may be also excluded (further details in this regard will be given later).

Likewise, $D_k$ is a vector generated by horizontally arranging the path differences $D_{imk}$ with respect to individual microphone pairs after normalization by the microphone spacing. As in the case of $P_k$, for $D_k$ as well, microphone pairs with large fitting error $err_{imk}$ may be excluded.

Letting $N_k$ be the number of microphone pairs adopted for $P_k$ and $D_k$, the first term on the left-hand side of Equation [15.9] is a $(N_k+1)\times 3$ matrix (of a form "the number of vertical elements×the number of horizontal elements"), and the right-hand side is a vector of which the number of vertical elements is $N_k+1$.

The fixed-point method is a method of preparing an equation obtained by transforming Equation [15.9] into a form "$q_k=$" (Equation [15.10]), and repeating updates of $q_k$ on the basis of this equation. As the updates are repeated, $q_k$ eventually converges to a value that best approximates Equation [15.9]. In should be noted, however, that according to an embodiment of the present invention, to ensure that the condition of Equation [15.2] be reflected more strongly, Equation [15.10] and Equation [15.11] are alternately repeated.

Figure 47:
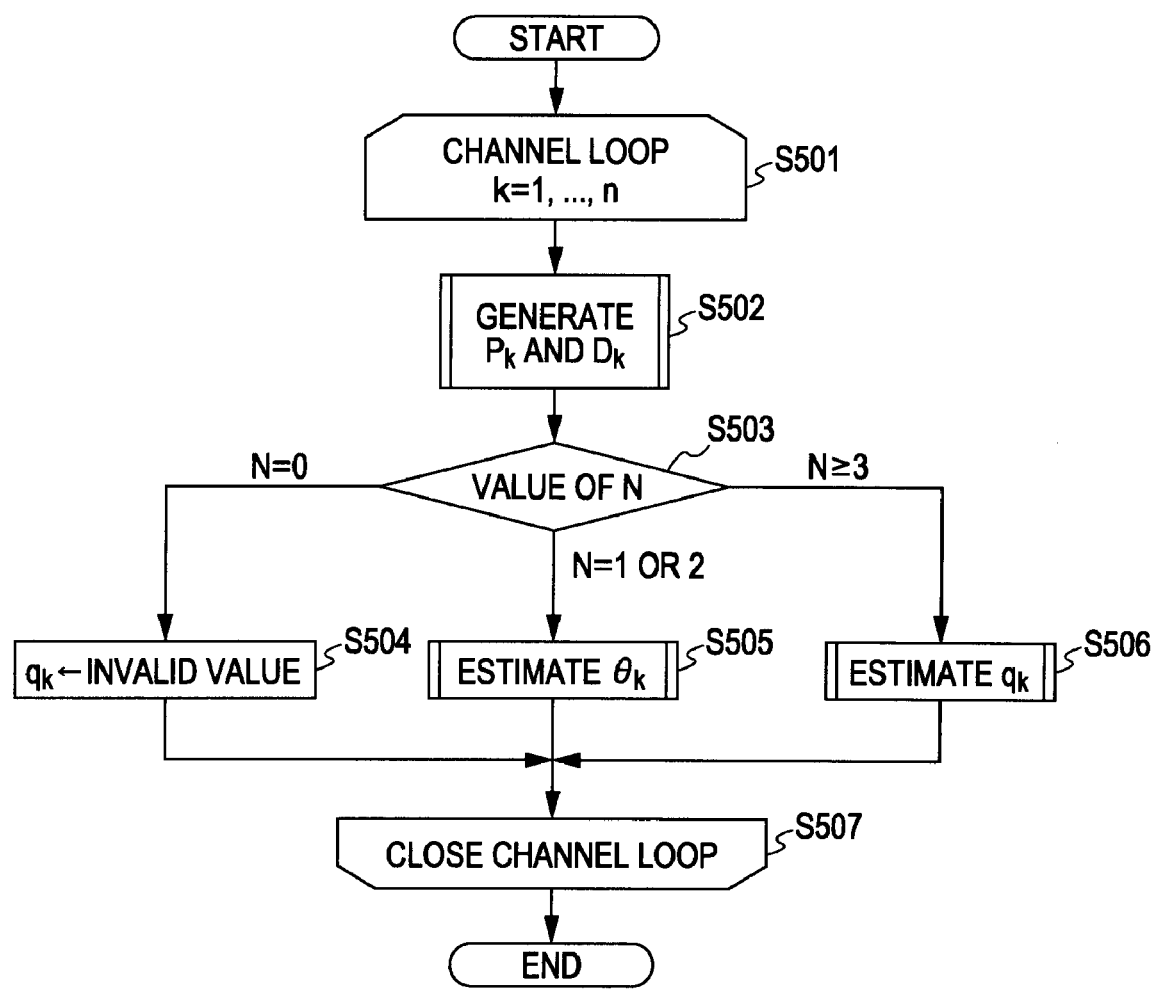
FIG. 47 is a diagram showing a flowchart illustrating the outlines of a sound source direction vector estimation algorithm.

The flowchart shown in FIG. 47 illustrates the outlines of a sound source direction vector estimation algorithm. Steps S501 to S507 represent a loop with respect to the channel, and is the same as the "channel loop" in the flow in FIG. 42.

In step S502, $P_k$ in Equation [15.7] and $D_k$ in Equation [15.8] are generated. That is, a matrix $[P_k]$ generated by horizontally arranging the vectors $p_{im}$ of individual microphone pairs after normalizing their length to 1, and a vector $[D_k]$ generated by horizontally arranging the path differences $D_{imk}$ with respect to individual microphone pairs after normalization by the microphone spacing, are generated. Further details will be given later.

After $P_k$ and $D_k$ are generated, "the number of adopted microphone pairs" has been substituted into the variable $N_k$.

As in the process described above with reference to the flow in FIG. 42, if straight-line fitting has failed, no such microphone pair is reflected on $P_k$ or $D_k$. In addition, since the sound source direction vector $q_k$ is a three-dimensional vector, it is necessary that $N_k$ be 3 or more in order to estimate the sound source direction vector $q_k$. Accordingly, in step S503, the process is branched in three ways in accordance with the value of "the number of adopted microphone pairs" $N_k$.

If "the number of adopted microphone pairs" $N_k=0$, the process proceeds to step S504. In this case, since this presumably means either that direction estimation has failed, or that the channel does not correspond to any sound source, so a value indicating "invalid" is substituted into the sound source direction vector $q_k$.

When $N_k \geq 3$, the process proceeds to step S506, in which the sound source direction vector $q_k$ is estimated on the basis of the fixed-point method. Further details will be given later.

If $0 < N_k < 3$, it is not possible to estimate the sound source direction vector $q_k$ that is a three-dimensional vector, but $\theta_k$ as the angle of sound source direction can be estimated. Accordingly, in that case, the process proceeds to step S505, in which $\theta_k$ is computed by the method according to the process flow in FIG. 42 described above.

Next, details of the generation process for $P_k$ in Equation [15.7] and $D_k$ in Equation [15.8] in step S502, that is, the process for generating:

a matrix $[P_k]$ generated by horizontally arranging the vectors $p_{im}$ of individual microphone pairs after normalizing their length to 1; and a vector $[D_k]$ generated by horizontally arranging the path differences $D_{imk}$ with respect to individual microphone pairs after normalization by the microphone spacing, will be described with reference to the flow shown in FIG. 48.

In step S511, an initial value setting is performed such that the variable $N_k$ indicating the number of microphone pairs reflected on $P_k$ and $D_k$ is set to 0.

Steps S512 to S517 represent a loop with respect to microphone pair, and this loop is the same as the "microphone pair loop" in the flow in FIG. 42. Step S513 is the same process as that of step S404 in the flow in FIG. 42, in which the process is branched in accordance with whether or not the fitting error $err_{imk}$ corresponding to the channel k and the microphone pair (i,m) exceeds a predetermined threshold.

If the fitting error $err_{imk}$ exceeds the threshold, the subsequent steps S514 to S516 are skipped. If the fitting error $err_{imk}$ is below the threshold, after adding $p_{im}$ and $D_{imk}$ to $P_k$ and $D_k$, respectively (steps S514 and S515), in step S516, $N_k$ is incremented by 1.

Step S514 is a process of adding $p_{im}$ as a new column to $P_k$ at that time, on the right side of $P_k$. In substantially the same manner, step S515 is a process of adding $D_{imk}$ as a new element to $D_k$ at that time, on the right side of $D_k$.

By executing a loop of steps S513 to S516 a number of times equal to the number of microphones, finally, a state is attained in which $P_k$ and $D_k$ have been generated, and the number of the horizontal elements of $P_k$ and $D_k$ has been substituted into $N_k$.

Figure 49:
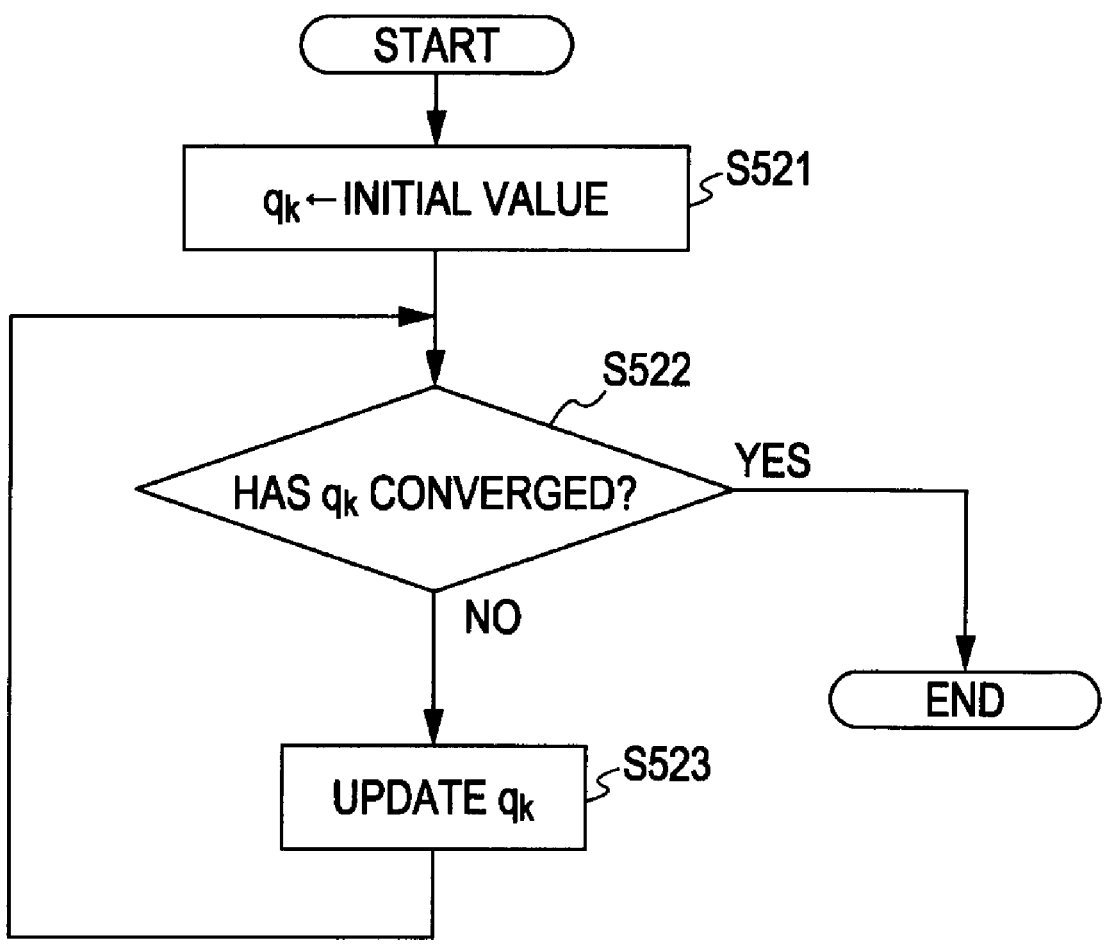
FIG. 49 is a diagram showing a flowchart illustrating "estimation of $q_k$" in step S506 in the flowchart shown in FIG. 47.

Next, a description will be given of the "estimation of $q_k$" in step S506 in the flowchart shown in FIG. 47, with reference to the flow shown in FIG. 49.

Figure 50:
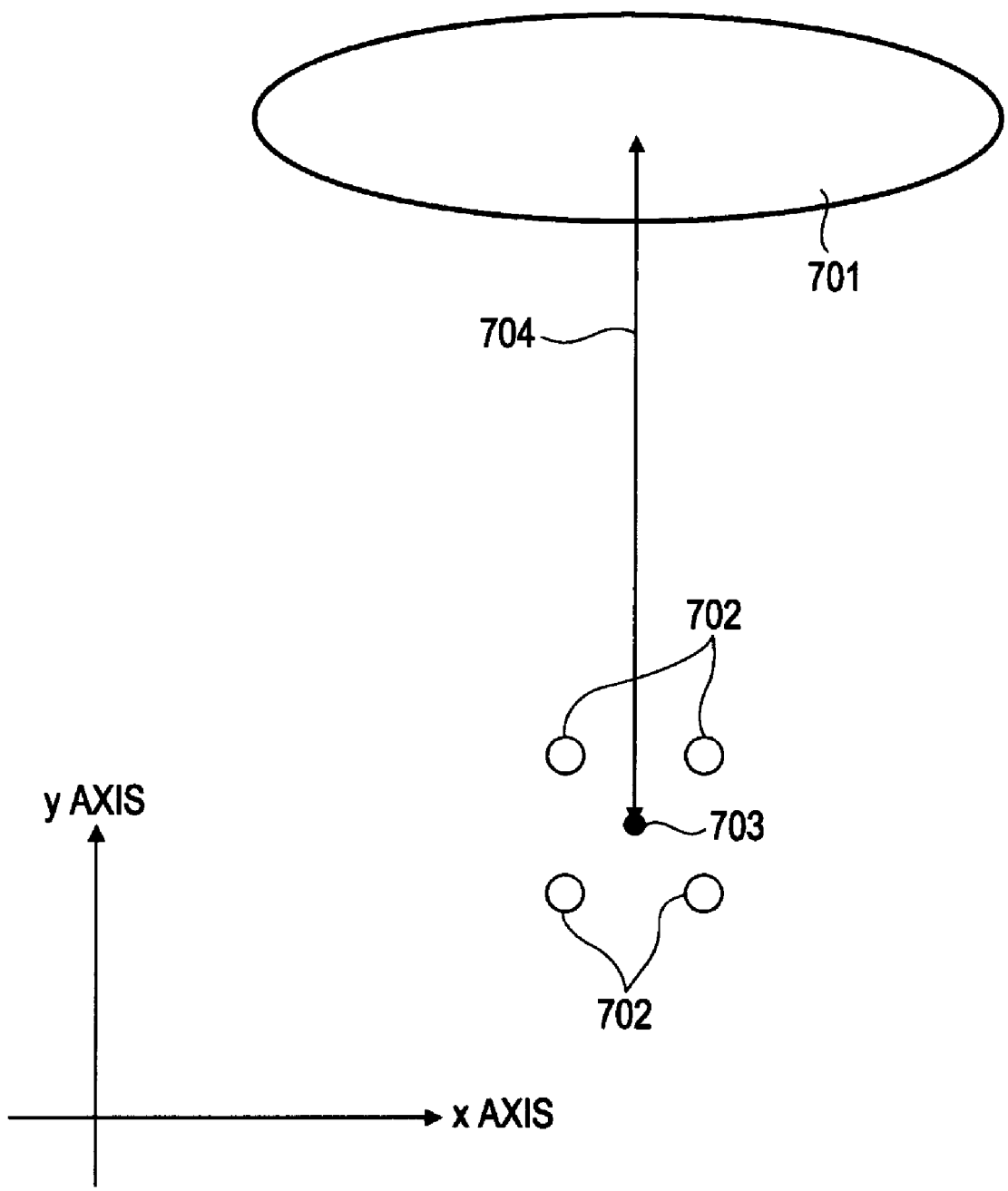
FIG. 50 is a diagram illustrating a process in which, in a case where the direction in which sound sources are present can be localized to some extent, the direction is reflected on an initial value.

In step S521, an initial value of sound source direction vector is substituted into $q_k$. There is a method of using the previous estimated value of $q_k$ as the initial value. Alternatively, in a case where the direction in which sound sources are present can be localized to some extent, the direction can be reflected on the initial value. For example, in a case where, as shown in FIG. 50, it is found in advance that a range 701 in which the sound sources are likely to be present is located at a position at roughly a distance L in the y-axis direction as viewed from the center of gravity 703 of all of microphones 702, that is, at a distance L 704 between the center of gravity of the microphones and the sound sources shown in the drawing, and further, at roughly a height H in the z-axis direction (direction perpendicular to the xy plane) as viewed from the center of gravity 703 of microphones, after $[0,L,H]^T$ is substituted as $q_k$, its length may be normalized to 1 by Equation [15.11].

In a case where the direction of objects that are likely to become sound sources can be predicted from a modality other than sound, a sensor, or the like, such as a camera image, an ultrasonic sensor, or an infrared ray sensor, a direction found by such units may be set as an initial value of $q_k$.

Next, the process of "updating $q_k$" in step S523 is repeated until $q_k$ converges, and if it is determined that $q_k$ has converged ("Yes" in step S522), the process is ended. To determine whether or not $q_k$ has converged, the previous updated value may be saved in a variable $q'_k$ in advance, and it may be determined whether or not the difference $|q_k - q'_k|$ from the current update results has become smaller than a given value (for example, 0.00001). Alternatively, a loop of the process may be simply executed a predetermined number of times, for example, 5 times or 10 times.

The "updating of $q_k$" in step S523 is to execute Equation [15.11] after executing Equation [15.10]. By alternately iterating Equation [15.10] and Equation [15.11], $q_k$ eventually converges to a value that best approximates Equation [15.8].

Figure 48:
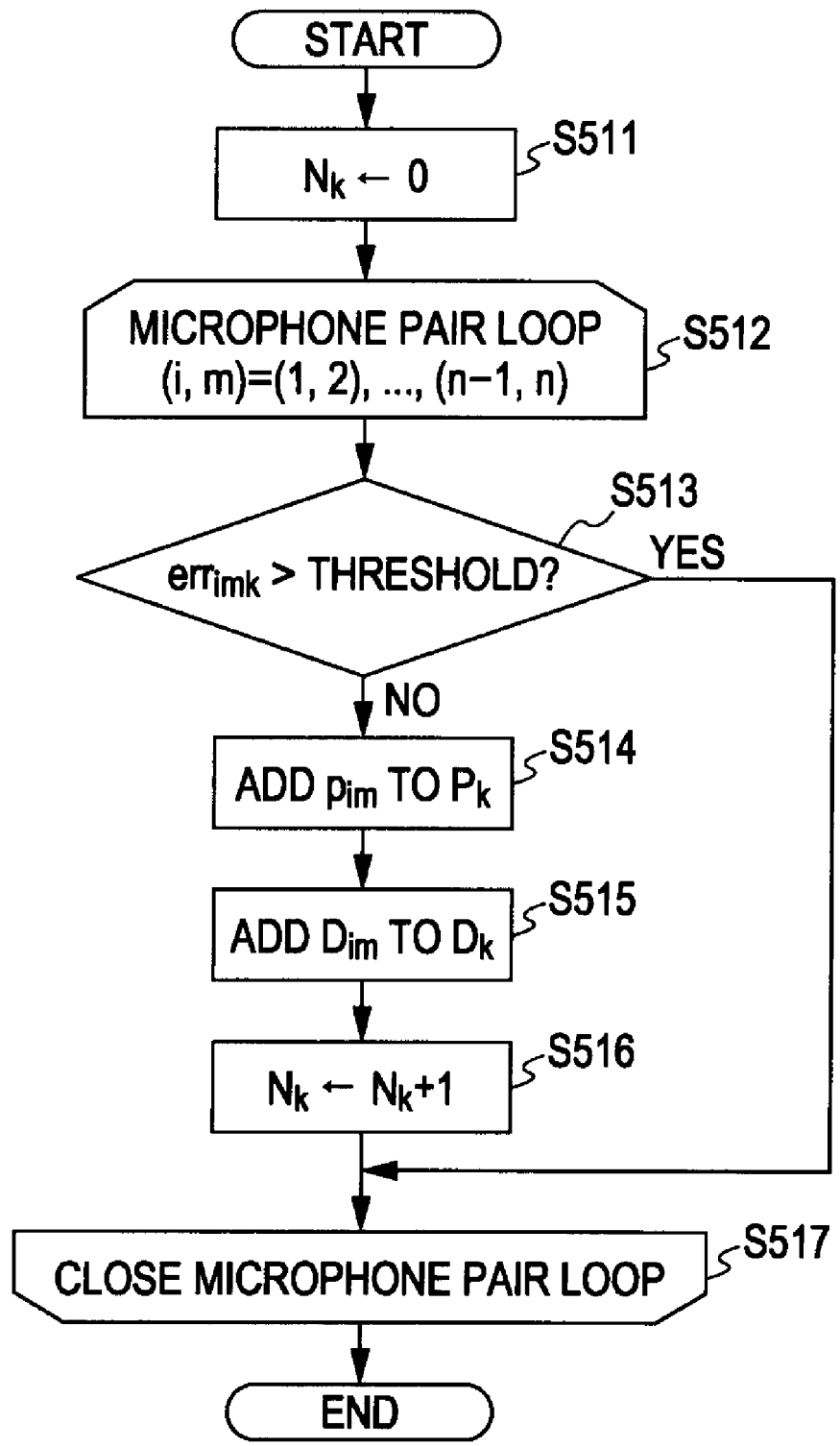
FIG. 48 is a diagram showing a flowchart illustrating a generation process for a matrix $[P_k]$, which is generated by horizontally arranging the vectors $p_{im}$ of individual microphone pairs after normalizing their length to 1, and a vector $[D_k]$, which is generated by horizontally arranging phase differences $D_{imk}$ with respect to individual microphone pairs after normalization by the microphone spacing.

In step S513 in FIG. 48, microphone pair selection is performed in accordance with the value of the fitting error $err_{imk}$. In addition to this condition, a conditional branch may be added such that if the value of $K_{imk}$ exceeds a predetermined threshold, use of the corresponding microphone pair is denied. In the following, the reason for and method of this conditional branch will be described.

For a microphone pair, there are directions in which the slope $K_{imk}$ can be estimated with high resolution and directions in which the slope $K_{imk}$ can be estimated only with low resolution. Referring to FIG. 1, while the sound source direction can be computed with high resolution when the angle $\theta$ is close to 0, the sound source direction can be computed only with low resolution when $\theta$ is close to $\pm\pi$ radian ($\pm 90°$). Thus, in a case where microphone pairs disposed in various positional relationships with respect to the sound sources exist, rather than computing the sound source direction by using all microphone pairs, the accuracy of direction estimation is increased by selecting microphone pairs considered to be estimating the sound source direction with high resolution, and computing the sound source direction between those microphone pairs.

The specific method of selecting a microphone pair is as follows. For a sound source located within what angle range the corresponding microphone pair is adopted for direction detection is determined in advance, and the upper limit of this range is set as $\theta_{max}$. For example, in FIG. 1, if the microphone pair is to be adopted when the angle $\theta$ of the sound source direction falls within the range of $-\frac{2}{3}\pi$ ($-60°$) to $+\frac{2}{3}\pi$ ($+60°$), the upper limit is set as $\theta_{max} = \frac{2}{3}\pi$. Next, the straight-line slope corresponding to the maximum value of angle is calculated by Equation [16.1] below.

$$K_{max\_im} = \pi \frac{1}{M-1} \frac{F}{C} d_{im} \sin\theta_{max} \quad [16.1]$$

$$|K_{imk}| > K_{max\_im} \quad [16.2]$$

This is an equation in which the estimated sound source angle hat ($\theta_{imk}$) in Equation [8.4] is replaced by $\theta_{max}$. The maximum value of slope computed by this equation is set as $K_{max\_im}$. The value of $K_{max\_im}$ is determined for each microphone pair, and can be calculated in advance.

Whether or not a sound source direction exceeds a predetermined range for a given microphone pair can be determined on the basis of whether or not the absolute value of $K_{imk}$ exceeds $K_{max\_im}$ (Equation [16.2]). That is, instead of making the determination "$err_{imk}$>threshold" in step S513 in FIG. 43, it is determined whether or not "$err_{imk}$>threshold or $|K_{imk}|>K_{max\_im}$", and if the condition is satisfied, the process may be caused to branch to the right (the use of that microphone pair is denied), and if the condition is not satisfied, the process may be branched down.

The present invention has been described above in detail with reference to specific embodiments. However, it is obvious that a person skilled in the art can make various modifications to and substitutions for the embodiments without departing from the scope of the present invention. That is, the present invention has been disclosed by way of examples, and should not be construed restrictively. The scope of the present invention should be determined with reference to the appended claims.

The series of processes described in this specification can be executed by hardware, software, or a composite configuration of both. If the series of processes is to be executed by software, the series of processes can be executed by installing a program recording the process sequence into a memory in a computer embedded in dedicated hardware, or by installing the program into a general purpose computer capable of executing various processes. For example, the program can be pre-recorded on a recording medium. Other than being installed into a computer from a recording medium, the program can be received via a network such as the LAN (Local Area Network) or the Internet, and installed into a built-in recording medium such as a hard disk.

The various processes described in this specification may be executed not only time sequentially in the order as they appear in the description but may be executed in parallel or independently depending on the throughput of the device executing the processes. In addition, the term system as used in this specification refers to a logical assembly of a plurality of devices, and is not limited to one in which the constituent devices are located within the same housing.

The present application contains subject matter related to that disclosed in Japanese Priority Patent Application JP 2008-153483 filed in the Japan Patent Office on Jun. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
   a learning processing unit that identifies a separating matrix for separating mixed signals using a learning process that applies Independent Component Analysis (ICA) to observed signals including the mixed signals, the separated mixed signals comprising outputs from a plurality of sound sources;
   a separation processing unit that applies the separating matrix to the observed signals to separate the mixed signals and generate separated signals corresponding to each of the sound sources; and
   a sound source direction estimating unit that computes a sound source direction of each of the separated signals generated in the separation processing unit,
   wherein the sound source direction estimating unit calculates cross-covariance matrices between the observed signals and the separated signals in corresponding time segments in time-frequency domain, computes phase differences between elements of the cross-covariance matrices, and computes a sound source direction corresponding to each of the separated signals by applying the computed phase differences.

2. The signal processing apparatus according to claim 1, wherein:
the separation processing unit executes a short-time Fourier transform (STFT) on the mixed signals in which outputs from a plurality of sound sources are mixed, to generate observed signal spectrograms in time-frequency domain, and applies the separating matrix to the observed signal spectrograms to generate separated signal spectrograms in time-frequency domain; and
the sound source direction estimating unit calculates cross-covariance matrices between the observed signal spectrograms and the separated signal spectrograms in corresponding time segments in time-frequency domain, computes phase differences between elements of the cross-covariance matrices, and compute a sound source direction corresponding to each of the separated signals by applying the computed phase differences.

3. The signal processing apparatus according to claim 1, wherein the sound source direction estimating unit computes covariance matrices of the observed signals in time-frequency domain, and computes the cross-covariance matrices between the observed signals and the separated signals by applying the computed cross-covariance matrices, and Hermitian transpose matrices of the separating matrices computed by the learning processing unit.

4. The signal processing apparatus according to claim 1, wherein the sound source direction estimating unit computes, in a process of computing the phase differences, phase differences corresponding to a pair of microphones that are signal input devices put at different positions, individually with respect to each of the sound sources.

5. The signal processing apparatus according to claim 1, wherein:
the learning processing unit applies a permutation-free scheme to the observed signals to identify the separation matrix; and
the sound source direction estimating unit executes a straight-line fitting process which computes a proportionality constant between a phase angle and a frequency, by using information on the phase differences between the elements of the cross-covariance matrices, and computes a sound source direction corresponding to each of the separated signals by using the proportionality constant.

6. The signal processing apparatus according to claim 5, wherein the sound source direction estimating unit computes the proportionality constant by executing a recursive method as the straight-line fitting process, the recursive method including executing an unwrap process of correspondence information between the phase angle and the frequency in order from the lowest frequency to perform an updating process of the proportionality constant.

7. The signal processing apparatus according to claim 5, wherein the sound source direction estimating unit computes the proportionality constant by executing a linear search method as the straight-line fitting process, the linear search method including gradually changing a value of the proportionality constant from preset minimum to maximum values, calculating an error with respect to the information on the phase differences, and selecting a proportionality constant with small error.

8. The signal processing apparatus according to claim 5, wherein the sound source direction estimating unit computes the proportionality constant by executing, as the straight-line fitting process, (i) a linear search method that includes gradually changing a value of the proportionality constant from preset minimum to maximum values, calculating an error with respect to the information on the phase differences, and selecting a proportionality constant with small error, and (ii) a recursive method that includes executing, by using the proportionality constant obtained by the linear search method as an initial value, an unwrap process of correspondence information between the phase angle and the frequency in order from the lowest frequency to perform an updating process of the proportionality constant.

9. The signal processing apparatus according to claim 5, wherein the sound source direction estimating unit computes a plurality of proportionality constants (slopes of straight lines) corresponding to each pair of microphones that are signal input devices put at different positions, selects pieces of data with small fitting error from the computed plurality of proportionality constants (slopes of straight lines), and computes a mean of the selected pieces of data to compute a final value of the proportionality constant.

10. The signal processing apparatus according to claim 5, wherein the signal processing apparatus further executes, by using the proportionality constant acquired as a result of the straight-line fitting process, frequency masking which suppresses a frequency component of signal separation results which has phase angle data that deviates largely from the straight line.

11. The signal processing apparatus according to claim 5, wherein the signal processing apparatus further generates the separating matrix by using the proportionality constant acquired as a result of the straight-line fitting process, and uses the generated separating matrix in the learning processing unit.

12. The signal processing apparatus according to claim 1, wherein the sound source direction estimating unit computes a matrix [Pk] generated by horizontally arranging vectors [pim] connecting microphones within individual pairs of microphones after normalizing their length to 0, and a vector [Dk] generated by horizontally arranging path differences [Dimk] with respect to the individual pairs of microphones after normalization by microphone spacing, and computes an angle of a sound source direction, or a vector indicating a sound source direction as seen from each of the pairs of microphones, by applying the computed matrix [Pk] and the computed vector [Dk].

13. A signal processing method, comprising:
identifying a separating matrix for separating mixed signals using a learning process that applies Independent Component Analysis (ICA) to observed signals including the mixed signals, the separated mixed signals comprising outputs from a plurality of sound sources;
applying the separating matrix to the observed signals to separate the mixed signals and generate separated signals corresponding to each of the sound sources; and
computing a sound source direction of each of the generated separated signals,
wherein the computing of a sound source direction includes calculating cross-covariance matrices between the observed signals and the separated signals in corresponding time segments in time-frequency domain, computing phase differences between elements of the cross-covariance matrices, and computing a sound source direction corresponding to each of the separated signals by applying the computed phase differences.

14. A non-transitory computer-readable storage medium for causing a signal processing apparatus to execute signal processing, the signal processing comprising the steps of:

identifying a separating matrix for separating mixed signals using a learning process that applies Independent Component Analysis (ICA) to observed signals including the mixed signals, the separated mixed signals comprising outputs from a plurality of sound sources;

applying the separating matrix to the observed signals to separate the mixed signals and generate separated signals corresponding to each of the sound sources; and computing a sound source direction of each of the generated separated signals, wherein the computing of a sound source direction includes calculating cross-covariance matrices between the observed signals and the separated signals in corresponding time segments in time-frequency domain, computing phase differences between elements of the cross-covariance matrices, and computing a sound source direction corresponding to each of the separated signals by applying the computed phase differences.

* * * * *